United States Patent
Fernando

(10) Patent No.: US 11,721,980 B2
(45) Date of Patent: Aug. 8, 2023

(54) POWER GENERATION SYSTEM EMPLOYING POWER AMPLIFYING THERMO-MECHANICAL INVERTER TECHNOLOGY

(71) Applicant: Kalindha Rashmi LLC, Beavercreek, OH (US)

(72) Inventor: Kamal Prithiviraj Fernando, Beavercreek, OH (US)

(73) Assignee: Kalindha Rashmi LLC, Beavercreek, OH (US)

( * ) Notice: Subject to any disclaimer, the term of this patent is extended or adjusted under 35 U.S.C. 154(b) by 0 days.

(21) Appl. No.: 17/987,600

(22) Filed: Nov. 15, 2022

(65) Prior Publication Data
US 2023/0155388 A1  May 18, 2023

Related U.S. Application Data

(63) Continuation of application No. PCT/US2022/049865, filed on Nov. 14, 2022.
(Continued)

(51) Int. Cl.
  *H02J 3/38* (2006.01)
  *H02S 10/12* (2014.01)
  (Continued)

(52) U.S. Cl.
  CPC ............ *H02J 3/381* (2013.01); *H02K 7/1823* (2013.01); *H02S 10/12* (2014.12); *H02S 10/20* (2014.12);
  (Continued)

(58) Field of Classification Search
  CPC ... H02J 2300/24; H02J 2300/30; H02S 10/12; H02S 10/20; H02K 7/1823; F24S 23/00; F22B 1/003; F22D 1/18
  See application file for complete search history.

(56) References Cited

U.S. PATENT DOCUMENTS

| 4,718,233 A | 1/1988 | Barrett |
| 5,413,879 A | 5/1995 | Domeracki et al. |
| (Continued) | | |

FOREIGN PATENT DOCUMENTS

| WO | 2000/028191 A2 | 5/2000 |
| WO | 2016/193510 A1 | 12/2016 |
| WO | 2018/044477 A1 | 3/2018 |

OTHER PUBLICATIONS

Ty Neises: "Supercritical Carbon Dioxide Power Cycle Design and Configuration Optimization to Minimize Levelized Cost of Energy of Molten Salt Power Towers Operating at 650° C.", Draft-Manuscript (ver 2), Solar Energy.
(Continued)

*Primary Examiner* — Robert L Deberadinis
(74) *Attorney, Agent, or Firm* — The Law Office of Patrick F. O'Reilly III, LLC

(57) ABSTRACT

Modern thermal power plants based on classical thermodynamic power cycles suffer from an upper bound efficiency restriction imposed by the Carnot principle. This disclosure teaches how to break away from the classical thermodynamics paradigm in configuring a thermal power plant so that its efficiency will not be restricted by the Carnot principle. The power generation system described herein makes a path for the next generation of low-to-moderate temperature thermal power plants to run at significantly higher efficiencies powered by renewable energy. This disclosure also reveals novel high-performance power schemes with integrated fuel cell technology, driven by a variety of fuels such as hydrogen, ammonia, syngas, methane and natural gas, leading toward low-to-zero emission power generation for the future.

33 Claims, 26 Drawing Sheets

Related U.S. Application Data

(60) Provisional application No. 63/424,374, filed on Nov. 10, 2022, provisional application No. 63/279,662, filed on Nov. 15, 2021.

(51) Int. Cl.
| | |
|---|---|
| *H02S 10/20* | (2014.01) |
| *H02K 7/18* | (2006.01) |
| *F22B 1/00* | (2006.01) |
| *F22D 1/18* | (2006.01) |
| *F24S 23/00* | (2018.01) |

(52) U.S. Cl.
CPC ............... *F22B 1/003* (2013.01); *F22D 1/18* (2013.01); *F24S 23/00* (2018.05); *H02J 2300/24* (2020.01); *H02J 2300/28* (2020.01); *H02J 2300/30* (2020.01)

(56) References Cited

U.S. PATENT DOCUMENTS

| | | | |
|---|---|---|---|
| 5,473,899 | A | 12/1995 | Viteri |
| 5,590,528 | A | 1/1997 | Viteri |
| 6,064,122 | A | 5/2000 | Mcconnell |
| 6,796,123 | B2 | 9/2004 | Lasker |
| 6,938,422 | B2 | 9/2005 | Thorn |
| 7,007,453 | B2 | 3/2006 | Maisotsenko et al. |
| 7,043,917 | B2 | 5/2006 | Paul |
| 7,078,825 | B2 | 7/2006 | Ebrahim et al. |
| 7,566,992 | B2 | 7/2009 | Althaus |
| 7,595,124 | B2 | 9/2009 | Varatharajan et al. |
| 7,851,935 | B2 | 12/2010 | Tsao |
| 7,954,330 | B2 | 6/2011 | Althaus |
| 8,039,984 | B2 | 10/2011 | Ridnik et al. |
| 8,132,412 | B2 | 3/2012 | Bennett |
| 8,613,186 | B2 | 12/2013 | Koganezawa et al. |
| 8,661,778 | B2 | 3/2014 | Bronicki et al. |
| 9,228,494 | B2 | 1/2016 | Facchinetti et al. |
| 9,273,610 | B2 | 3/2016 | Fingleton et al. |
| 9,316,121 | B2 | 4/2016 | Davidson et al. |
| 9,482,450 | B2 | 11/2016 | Hugenroth |
| 9,500,185 | B2 | 11/2016 | Al-Sulaiman |
| 9,520,757 | B2 | 12/2016 | Hino et al. |
| 9,644,502 | B2 | 5/2017 | Peter et al. |
| 9,816,437 | B2 | 11/2017 | del Omo |
| 10,082,045 | B2 | 9/2018 | Larochelle et al. |
| 10,193,383 | B2 | 1/2019 | Hino et al. |
| 10,233,833 | B2 | 3/2019 | Apte et al. |
| 10,315,495 | B2 | 6/2019 | Vehr et al. |
| 10,400,636 | B2 | 9/2019 | Kim et al. |
| 10,422,250 | B2 | 9/2019 | Laughlin et al. |
| 10,436,074 | B2 | 10/2019 | Hinders et al. |
| 10,612,821 | B1 | 4/2020 | Fernando |
| 10,774,741 | B2 | 9/2020 | Sennoun |
| 11,221,161 | B1 | 1/2022 | Fernando |
| 2001/0025478 | A1 | 10/2001 | Fineblum |
| 2005/0086938 | A1 | 4/2005 | Thorn |
| 2007/0255459 | A1 | 11/2007 | Althaus |
| 2010/0295306 | A1 | 11/2010 | Ridnik et al. |
| 2012/0222423 | A1 | 9/2012 | Mercangoez et al. |
| 2015/0260463 | A1 | 9/2015 | Loughlin et al. |
| 2015/0337737 | A1 | 11/2015 | Fingleton et al. |
| 2016/0047361 | A1 | 2/2016 | Al-Sulaiman |
| 2016/0298500 | A1 | 10/2016 | Peter et al. |
| 2019/0221697 | A1 | 7/2019 | Cho |
| 2020/0355169 | A1 | 11/2020 | Amoux |

OTHER PUBLICATIONS

Harvey, S.P.; Richter, H.J.: "Gas Turbine Cycles With Solid Oxide Fuel Cells Part I: Improved Gas Turbine Power Plant Efficiency by Use of Recycled Exhaust Gases and Fuel Cell Technology", Journal of Energy Resources Technology, ASME, vol. 116, Dec. 1994, p. 305-311.

Harvey, S.P.; Richter, H.J.: "Gas Turbine Cycles With Solid Oxide Fuel Cells Part II: A Detailed Study of a Gas Turbine Cycle With an Integrated Internal Reforming Solid Oxide Fuel Ceil", Journal of Energy Resources Technology, ASME, vol. 116, Dec. 1994, p. 312-318.

Veyo: "Westinghouse Fuel Cell Combined Cycle Systems", paper No. DOE/MC/28055-97/C0772 (contract: DE-FC21-91MC28055, Fuel Cells '96 Review Meeting, Morgantown, West Virginia, Aug. 20-21, 1996.

Bevc, F.P. et al.: "Solid Oxide Fuel Cell Combined Cycles", International Gas Turbine and Aeroengine Congress & Exhibition (96-GT-447), ASME, Birmingham, UK, Jun. 10-13, 1996.

Massardo, A.F.; Lubelli, F.: "Internal Reforming Solid Oxide Fuel Cell-Gas Turbine Combined Cycles (IRSOFC-GT) Part A: Cell Model and Cycle Thermodynamic Analysis", International Gas Turbine & Aeroengine Congress & Exhibition (98-GT-577) ASME, Stockholm, Sweden, Jun. 2-5, 1998.

Lundberg, W.L. et al.: "Pressurized Solid Oxide Fuel Cell-Gas Turbine Power System", Final Repoart, Contractos: Rolls-Royce Allison/Siemens Westinghouse Power Corporation SOFC Power Generation, U.S. Department of Energy, Nov. 30, 1999.

Stefano Campanari: "Full Load and Part-Load Performance Prediction for Integrated SOFC and Microturbine Systems", International Gas Turbine and Aeroentgine Congress/Exhibition, Indianapolis, Indiana, June 7-10, 1999.

Botros, K.K. et al.: "Thermodynamic Assessment of Hybrid PSOFC/GT Systems For Mechanical/Electric Power Generation", Internantional Pipeline Conference, AME 2000, vol. 2, p. 1289-1299.

Massardo, A.F. et al.: "Internal Reforming Solid Oxide Fuel Cell Gas Turbine Combined Cycles (IRSOFC-GT)—Part II: Exergy and Thermoeconomic Analyses", Journal of Engineering for Gas Turbines and Power, ASME, vol. 125, Jan. 2003, p. 67-74.

Yaofan Yi et al.: "Analysis and optimization of a solid oxide fuel cell and intercooled gas turbine (SOFC-ICGT) hybrid cycle". Journal of Power Sources, 132, (2004), p. 77-85.

Denver F. Cheddie: "Integration of A Solid Oxide Fuel Cell into A 10 MW Gas Turbine Power Plant", Energies, 3 (2010), p. 754-769.

Mohamed Gadalla et al.: "Thermodynamic Modeling and Energy analysis of a SOFC-PEMFC combination in a Gas Turbine Cycle", Proceedings of the ASME 2010 Eighth International Fuel Cell Science, Engineering and Technology Conference (FuelCell-2010), Jun. 14-16, 2010, Brooklyn, New York, USA, p. 1-12.

Al-Dabbas, M.A.: "A Performance Analysis of Solar Chimney Thermal Power Systems", Thermal Science, vol. 15, No. 3 (2011), p. 619-642.

Yoshinori Kobayashi et al. : "Extremely High-efficiency Thermal Power System-Solid Oxide Fuel Cell (SOFC) Triple Combined-cycle System", Mitsubishi Heavy Industries Technical Review, vol. 48 No 3, Sep. 2011.

Penyarat Chinda et al.: "The hybrid solid oxide fuel cell (SOFC) and gas turbine (GT) systems steady state modeling", International Journal of Hydrogen Energy, Elsevier, 37 (2012), p. 9237-9248.

Amel Dhahri: "A Review of solar Chimney Power Generation Technology", International Journal of Engineering and Advanced Technology vol. 2 Issue-3, Feb. 2013.

Yousri Welaya: "Thermodynamic analysis of a combined gas turbine power plant with a solid oxide fuel cell for marine applications", Int. J. Nav. Archit. Ocean Eng. vol. 5, (2013), p. 529-545.

Dustin McLarty et al.: "Fuel cell-gas turbine hybrid system design part 1: Steady state performance", Journal of Power Sources, Elsevier, 257 (2014), p. 412-420.

"Supercritical Carbon Dioxide Brayton Cycle", Chapter 4—Advancing Clean Electric Power Technologies, Quadrennial Technology Review 2015, US Department of Energy, Jul. 21, 2015.

Zhao, H.B. et al.: "Performance Analysis of Combined Cycle System Driven by Solid Oxide Fuel Cell", International Conference of Electrical, Automation and Mechanical Engineering (EAME 2015), Phuket, Thailand, Jul. 26-27, 2015.

Penyarat Saisirirata: "The Solid Oxide Fuel Cell (SOFC) and Gas Turbine (GT) Hybrid System Numerical Model", Energy Procedia, 2015 International Conference on Alternative Energy in Developing Countries and Emerging Economies, 79 (2015 ), p. 845-850.

(56) References Cited

OTHER PUBLICATIONS

Aaron McClung: "Comparison of Supercritical Carbon Dioxide Cycles for Oxy-Combustion", Proceedings of ASME Turbo Expo 2015: Turbine Technical Conference and Exposition (GT2015), Montréal, Canada, Jun. 15-19, 2015.
Mohammad H. Ahmadi et al.: "Energy and Exergy Analyses of a Solid Oxide Fuel Cell-Gas Turbine-Organic Rankine Cycle Power Plant with Liquefied Natural Gas as Heat Sink", Entropy, 20 (2018), p. 484.
Danylo Oryshchyn et al.: "Fuel Utilization Effects on System Efficiency in Solid Oxide Fuel Cell Gas Turbine Hybrid Systems", Applied Energy, 228 (2018), p. 1953-1965.
Liuchen Liu et al.: "Supercritical Carbon Dioxide(s-CO2) Power Cycle for Waste Heat Recovery: A Review from Thermodynamic Perspective", Processes 2020, 8, 1461.
Fabrizio Reale et al.: "Micro Gas Turbine Integrated With a Supercritical CO2 Brayton Cycle Turbine: Layout Comparison and Thermodynamic Analysis", Proceedings of ASME Turbo Expo 2020 GT2020)—Turbomachinery Technical Conference and Exposition, Virtual-Online, Sep. 21-25, 2020.
X. S. Lao et al.: "Performance Analysis of SOFC/GT Combined Cycle System with Preheater Arranged after the Turbine", IOP Conf. Series: Earth and Environmental Science 701 (2021) 012047.
Amirhossein Hasanzadeh et al.: "Stand-alone gas turbine and hybrid MCFC and SOFC-gas turbine systems: Comparative life cycle cost, environmental, and energy assessments", Energy Reports 7 (2021), p. 4659-4680.
Shanglong Huang et al.: "Coupling impacts of SOFC operating temperature and fuel utilization on system net efficiency in natural gas hybrid SOFC/GT system", Case Studies in Thermal Engineering, Elsevier, 31 (2022), p. 101868.
Le Roux, W.G. et al.: "Solar tracking for a parabolic dish used in a solar thermal Brayton cycle", Conference Paper, Nov. 2012, https://www.researchgate.net/publication/304775092.
International Search Report Form PCT/ISA/210, Application No. PCT/US2022/049865, dated May 5, 2023, 2 pages.
Written Opinion of the International Searching Authority, PCT Form 237, Application No. PCT/US2022/049865, dated May 5, 2023, 3 pages.

POWER GENERATION SYSTEM EMPLOYING POWER AMPLIFYING THERMO-MECHANICAL INVERTER TECHNOLOGY

CROSS-REFERENCE TO RELATED APPLICATIONS

This patent application claims priority to U.S. Provisional Patent Application No. 63/424,374, entitled "Power Generation System Employing Power Amplifying Thermo-Mechanical Inverter Technology", filed on Nov. 10, 2022, and additionally claims priority to U.S. Provisional Patent Application No. 63/279,662, entitled "Power Generation System Employing Power Amplifying Thermo-Mechanical Inverter Technology", filed on Nov. 15, 2021, all of the disclosures of which are herein expressly incorporated by reference in their entireties.

This patent application also is a continuation of International Patent Application Ser. No. PCT/US2022/049865, entitled "Power Generation System Employing Power Amplifying Thermo-Mechanical Inverter Technology", filed on Nov. 14, 2022, the disclosure of which is hereby incorporated by reference as if set forth in its entirety herein.

TECHNICAL FIELD

The devices and methods described here relates to a high-efficient thermal power plant powered by the low-to-medium grade heat (300-600° C.) and renewable energy technologies such as photovoltaic (PV) and/or hydrogen fuel cells. The system described herein also can be seen as a thermo-mechanical inverter with a power-amplification which converts DC-electric power generated in a renewable energy field to AC-electric power that is fed to the main power-grid. The new inverter paradigm eliminates many issues related to conventional inertia-less electronic inverters, thus making the voltage and frequency control of the main power grid more economical.

BACKGROUND

Over the past century, humans have increased the concentration of $CO_2$ in the atmosphere from 280 to more than 380 parts per million by volume, and it is growing faster every day. As the concentration of $CO_2$ has risen, so has the average temperature of the planet. Over the past century, the average surface temperature of Earth has increased by about 0.74° C. If $CO_2$ emissions continue to occur without restraint, the temperatures are expected to rise by an additional 3.4° C. by the end of this century. Climate change of that magnitude would likely have serious consequences for life on Earth.

The electric power generation sector is the major source of the total global $CO_2$ emissions, accounting for approximately 40% worldwide, followed by transportation, industry, and other sectors. The bottom line is that thermal power plants that rely on fossil fuels like coal, natural gas, and other petroleum resources to generate electricity overshadow other sources in the electricity market. Thermal power plants account for in excess of 80% of total power generation in most countries. For instance, thermal generating sources produce 82% of the total electricity in the United States, 84.3% in Australia, and 90% in emerging markets like India.

In spite of many technological advances in solar, wind, wave power generation, and hydrogen-related technologies, the principal hurdle to eliminate $CO_2$ emission is that thus far no equivalent (or better) technology has emerged, in terms of energy conversion efficiency, than the combustion-based thermal power plants, which run on fossil fuels for large-scale electric power generation. The main reason being that the modern thermal power plants based on the classical thermodynamic power cycles have an upper-bound restriction on the energy conversion efficiency imposed by the Carnot principle, which is determined by the highest operating temperature of the cycle. In essence, to achieve high heat-to-power conversion efficiency, the cycle has to consume heat at the highest possible temperature and burning fossil fuel makes it easier to achieve the required high temperatures, thereby enabling the power plants to attain the required high thermal efficiencies.

Currently all the major large-scale power stations are facilitated by steam turbine plants that run on Rankine cycle, gas power plants that run on Brayton cycle, solar photovoltaic (PV) power plants, wind turbine plants, and hydro power plants. Of these, steam turbine and gas turbine power plants, which are extensively used throughout the world, need fossil fuels as the source of energy.

Among the leading renewable resources, solar PV technology has had substantial growth in the past two decades, with the deployment rate of solar PV having an annual growth rate of 44% during 2000-2016. Similar to solar PV cells, which produce DC electricity, hydrogen fuel cells also can be identified as an alternative form of DC power generators.

In essence, to eliminate burning fossil fuels to generate electricity, the world is moving towards DC-electric power generation using PV-arrays, hydrogen fuel cell technology, and wind-turbines. However, this new paradigm poses new problems. For example, flywheels of rotary generators store an immense amount of kinetic energy. When a large contingency event occurs such as a large power generator goes off-line, the remaining online generators try to accommodate the imbalance between supply and demand due to the drop in generation by converting their inertial kinetic energy into real power generation. This process, termed inertial response, slows the generators and results in a drop in grid frequency. Inertial response provides time for the remaining online generators to detect changes in frequency and initiate their primary frequency response (PFR). As generator output from PFR increases, the net imbalance reaches zero and the frequency decline stops. Eventually, the PFR schemes of online generators restore the power grid frequency to the desired value.

Evidently, moving from conventional electro-magnetic-mechanical AC electricity generators with large inertia to inertia-less DC electricity generators such as inverter-connected PV and hydrogen fuel cell technologies reduces the system inertia, thus eliminating the inertial response, hence drastically impacting the power grid stability.

SUMMARY OF THE INVENTION

This disclosure describes a power generation system using Power Amplifying Thermo-Mechanical Inverter (PATMI) technology, which is a power plant that converts DC electricity to AC electricity (see FIG. 1) while amplifying the power output, thus delivering more power to the grid than a conventional inverter does. However, the power amplification requires extra power to be fed to the device to keep in par with the principle of conservation of energy.

As FIG. 1 shows, the power amplification can be achieved by feeding the PATMI with low-grade thermal energy. Thus, the PATMI is essentially a thermal power generation scheme. The studies carried out by the inventor show that PATMI technology gives rise to a family of thermo-mechanical power schemes with considerably high efficiencies compared to conventional thermal power schemes, especially at low to medium temperature range (300-600° C.).

In accordance with one or more embodiments of the present invention, there is provided a power generation system that includes a first subsystem, the first subsystem including one or more mechanical work-consuming components, and the one or more mechanical work-consuming components including at least one compressor or one pump; a second subsystem, the second subsystem including one or more components that output mechanical work, and the one or more components that output mechanical work including at least one expander; a third subsystem, the third subsystem including one or more heat-consuming components, and the one or more heat-consuming components including at least one heat exchanger with an external thermal feed to the power generation system; and a fourth subsystem, the fourth subsystem including one or more heat sinks in the power generation system which dissipate heat to the surroundings, the one or more heat sinks including a single heat sink or flue gas outlet. In these one or more embodiments, the first, second, third, and fourth subsystems are configured to interact with each other by exchanging matter from one or more working fluids and by exchanging heat, such that the first, second, third, and fourth subsystems cooperate to maximize energy conversion efficiency. Also, in these one or more embodiments, when the power generation system is in operation for a particular finite time period, the first subsystem consumes $W_{in}$ quantity of mechanical work from one or more external sources, the third subsystem consumes Q quantity of heat from one or more external sources, while the second subsystem outputs $W_{out}$ quantity of mechanical work, such that the energy conversion efficiency of the power generation system is given by: $W_{out}/(W_{in}+Q)$.

THE ESSENCE AND MERITS OF THE INVENTION

A modern thermal power plant, despite its configurational complexity and sophistication, comprises of subsystems that fall into four basic categories: (A) subsystems that consume mechanical power such as compressors and/or fluid pumps; (B) subsystems that consume heat such as heating conduits, heat exchangers, heat regenerators, boilers, superheaters, and/or combustion chambers; (C) subsystems that deliver mechanical power such as reciprocating or rotary (turbine) expanders which in turn drive conventional multi-phase AC electric power generators; and finally, (D) subsystems that dissipate heat to the surroundings such as air-cooled and/or water-cooled heat exchangers and exhaust gas flues.

Assume a scenario where the power plant runs at steady state for a given time period during which the subsystem (A) consumes a total of $W_{in}$ mechanical energy and the subsystem (C) delivers a total of $W_{out}$ mechanical energy to drive the AC-electric power generators, while the subsystem (B) consumes a total of $Q_{in}$ heat energy from external heat sources. Then in accordance with the conventional power plant configuration, since all power consuming devices ($W_{in}$) are driven by the power produced by the power plant ($W_{out}$), the net power output of the power plant is $W_{net}=(W_{out}-W_{in})$, thus the efficiency of the conventional power plant is given by:

$$\eta_{conv}=(W_{out}-W_{in})/Q_{in}$$

However, if one takes an unconventional approach and decides to drive the subsystem (A) completely independent of the rest of the power plant by providing $W_{in}$ by any other external means, then this new configuration will have an efficiency given by:

$$\eta_{new}=W_{out}/(Q_{in}+W_{in})$$

Firstly, it can be shown by a simple algebraic manipulation that $\eta_{new} > \eta_{conv}$, as long as $(W_{out}-W_{in}) < Q_{in}$, which is assured by the second law of thermodynamics. Secondly, one could assess the magnitude of the efficiency improvement $\Delta\eta = \eta_{new} - \eta_{conv}$ and show that it can be expressed as:

$$\Delta\eta = \alpha[1-\eta_{conv}] \text{ where } \alpha=[W_{in}/(Q_{in}+W_{in})]$$

Thus, it is evident that the efficiency improvement $\Delta\eta$ is controlled by two factors. The first factor, $\alpha$ is the mechanical energy input as a fraction of the total energy (heat and mechanical energy) input. The second factor is $[1-\eta_{conv}]$ can be seen as room for improvement of the conventional efficiency to the perfect efficiency of unity. The equation for $\Delta\eta$ indicates that in order to get a significant efficiency improvement both factors need to be of considerable magnitudes.

For example, suppose, the modification is applied to a steam power plant or an ORC power plant, which runs on the Rankine power cycle, or a power plant run on the Kalina cycle; in these cases $W_{in}$ represents mainly the pump work, which is highly insignificant in magnitude compared to the heat input $Q_{in}$, thus $\Delta\eta$ improvement will not be of any significance due to the very low value of a. On the other hand, if the modification is applied to a gas turbine plant that runs on the Brayton power cycle, assuming the maximum temperature of the cycle is around 900~1000° C., $\eta_{conv}$ will be around 30~35% and ca will be in the range 0.35~0.5. In this case, the expected efficiency improvement $\Delta\eta$ will be 23~35% (augmented), thus achieving a substantial efficiency improvement which falls in the range 53-70%.

Further, the PATMI technology can be adapted to the trending supercritical carbon dioxide ($sCO_2$) family of power plants. For example, in 2011, *Sandia National Laboratories* published[1] a design for a 100 MWe $sCO_2$ cycle power plant driven by a nuclear reactor as the heat source. This plant, which is of the Split-Flow Recompression type (see Illustrative Embodiment 9(b) for details), consists of two sets of compressors, a single turbine, and operates between the pressures 7 MPa and 20 MPa, with a peak operating temperature of 650° C. The main-compressor and the re-compressor are designed to share the total flow rate at 60%:40% ratio while consuming 10.1 MW and 21.0 MW respectively, and the turbine outputs 131.1 MW mechanical power, while the heat consumption amounts to 200 MW. Thus, the power plant produces a net power output of 100 MWe at an efficiency of 50%. If one were to implement the PATMI technology to this power plant, by driving the compressors using (for example) hydrogen fuel cell technology, the power output of the plant would be increased by ~30%, and the efficiency will show a moderate improvement of 6.7% (augmented). This marginal improvement of the efficiency is not surprising as the controlling factors of $\Delta\eta$, $\alpha$ and the $(1-\eta_{conv})$ are 0.135 and 50% respectively.

1. *Mechanical Engineering* magazine p. 60 No. 2, V. 143 February/March 2021; Sandia National Laboratories Report SAND 2011-2525, May The power cycles which adopt the PATMI technology are fed with multiple forms of energy such as thermal energy and DC-electricity, the latter to drive the compressors. In such situations, how does one do an apples-to-apples comparison of the real efficiency gains. For this purpose, let's define the tangible efficiency, meaning that the efficiency is expressed in terms of a single tangible fuel as if all energy forms that fed to the power plant have been obtained from this single fuel. Consider the tangible fuel is hydrogen; the hydrogen burns at 98% efficiency to provide heat for both cycles; and the hydrogen fuel cell efficiency is 60% for the PATMI cycle when the compressors are driven by the DC-electricity generated by fuel cells.

In order to demonstrate the true merits of this invention, let us look at the estimated but realistic performance of two versions of the Brayton-PATMI cycle power plants. The first Brayton version is a conventional Brayton cycle with an adiabatic turbine and multi-stage compressors with intercooling. The second Brayton cycle version is an unconventional Brayton version with an isothermal turbine and multi-stage compressors with intercooling. To distinguish the two versions the latter version is called Brayton-isoTT-PATMI cycle (isoTT means iso-thermal-turbine).

The conventional Brayton example considered here is a 1 MWe Brayton power plant comprised of three compression stages (with 0.8 isentropic efficiency) with intercooling, one turbine stage (with 0.9 isentropic efficiency), a heat input device (with hydrogen combustion efficiency of 98%), and a regenerator (with 0.85 heat transfer effectiveness) with no temperature-imposed limits on regeneration.

FIG. 2 shows the estimated data in graphical form for a range of maximum temperatures (300-900° C.) and for three distinct pressure ratios (PR=4, 8, 12). On the left, the energy conversion efficiency of Brayton-PATMI cycle estimates are compared with the efficiencies of conventional Brayton and the Carnot cycles; and on the right, the tangible efficiency of Brayton-PATMI estimates are compared to the conventional Brayton cycle and Carnot efficiency.

As shown in the FIG. 2, the Brayton-PATMI version shows a significant improvement of the energy conversion efficiency over the conventional Brayton cycle for the whole temperature range and for all pressure ratios. Further, the efficiency of the PATMI version seems less sensitive to temperature compared to the efficiency of the conventional cycle. The most remarkable observation one can make is that the most significant efficiency improvement seems to occur in the low to moderate temperature range. The conclusion is that the PATMI technology enables the creation of highly efficient power plants that can operate at low to moderate maximum cycle temperatures.

FIG. 3 shows a similar example for a 1 MWe Brayton-isoTT-PATMI power plant. This power plant comprises of three compression stages (with 0.8 isentropic efficiency with 0.9 effective intercoolers), one quasi-isothermal turbine stage (hydrogen is injected into the turbine), a heat input device to compensate the imperfect regeneration process (with hydrogen combustion efficiency of 98%), and a regenerator (with 0.9 heat transfer effectiveness). The estimated data in graphical form is shown in FIG. 3 for a range of maximum temperatures (300-900° C.) and for two pressure ratios (PR=4 and 8). On the left, the energy conversion efficiency of Brayton-isoTT-PATMI cycle estimates are compared with the efficiencies of Brayton-isoTT and the Carnot cycles; and on the right, the tangible efficiency of Brayton-isoTT-PATMI estimates are compared to the Brayton-isoTT and Carnot cycle.

As FIG. 3 shows the Brayton-isoTT-PATMI seems to beat the Carnot efficiency restriction, especially at the lower temperature range (below 400° C.). Similar to Brayton-PATMI power scheme, Brayton-isoTT-PATMI power scheme also shows a remarkable efficiency improvement especially in the low-to-moderate temperature range (300-600° C.). Again, the conclusion is that the PATMI technology enables the power plants to operate at low-to-medium temperatures and still perform at significantly high efficiencies.

BRIEF DESCRIPTION OF THE FIGURES

The following diagrams are included in this disclosure.

DETAILED DESCRIPTION OF EMBODIMENTS

This disclosure describes a way in which the PATMI technology can be adopted to design superior power plants, whose performance is not be hindered by the classical thermodynamic paradigm, eliminating the restrictions imposed by the Carnot principle on their energy conversion efficiencies.

The concepts introduced in this disclosure will apply to any thermal power plant as long as it is comprised of the three major subsystems, namely the mechanical power consuming subsystem, the mechanical power delivering subsystem, and the heat consuming subsystem. Despite how these three subsystems are connected to interact by exchanging matter and heat among them, as long as the mechanical power is not exchanged between the power consuming subsystem and the power delivering subsystem, the PATMI technology can be realized. Through the embodiments presented in the following sections, this disclosure teaches how to adopt the PATMI technology to a number of conventional power cycles such as Brayton, Brayton-isoTT, and sCO$_2$-schemes.

It should be pointed out that in the current state of the art of heat-engine design, very little interest has been given to the Ericsson cycle as a viable power cycle as that the implementation of Ericsson cycle requires a design of an isothermal compressor and an isothermal expander, which operate at the lowest and the highest temperatures of the cycle respectively. This means that every blade in the turbine rotors is exposed to the highest temperature of the cycle. As mentioned before, the current thermodynamics paradigm dictates that the highest temperature of the cycle should be in the range 700-1200° C. to achieve high thermal efficiencies, but no known metal as of today can withstand such high temperatures constantly and operate without structural failure. With the introduction of the PATMI technology, this conventional norm is shattered. The PATMI technology enables the power cycles to operate at moderate temperatures (400-600° C.) while performing at superior efficiencies, thus making the isothermal expanders and the superior regenerative Brayton-isoTT cycle a reality. Naturally, the configurations based on approximate-Ericsson (Brayton-isoTT) schemes show significantly better performance than the configurations based on the conventional Brayton cycle.

Illustrative Embodiment 1—Solar PV-Thermal Brayton-PATMI Power Scheme

Figure 1:
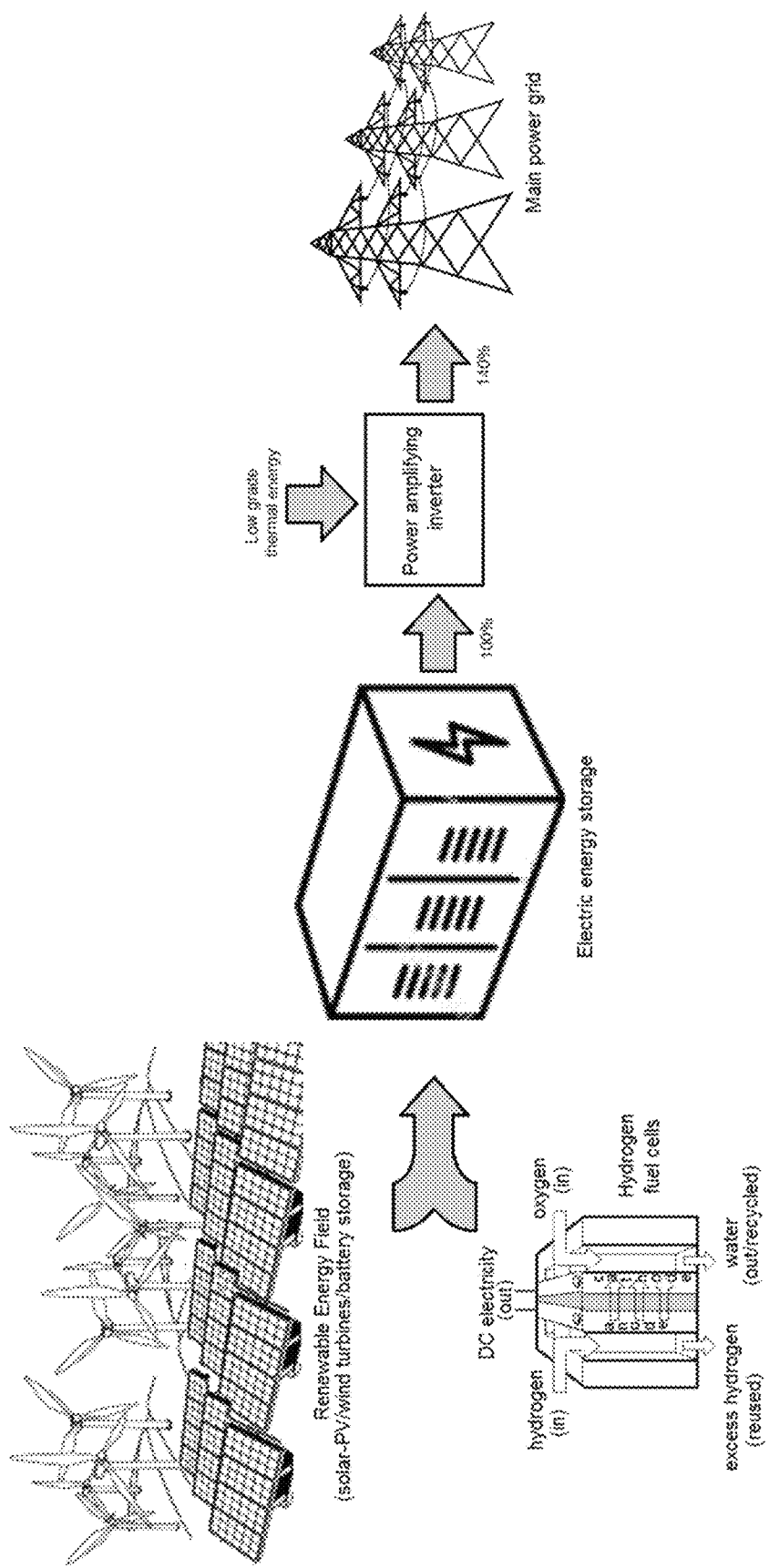
FIG. 1 is a schematics representation of the PATMI technology.
Figure 2:
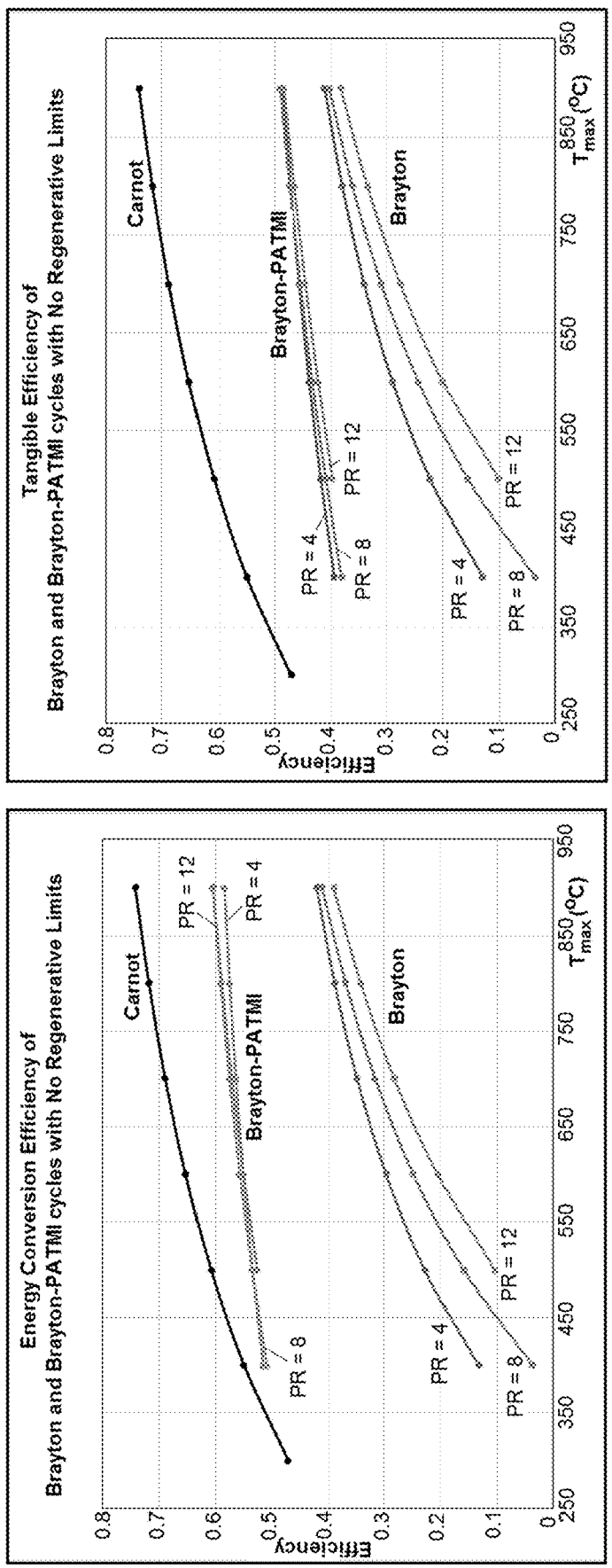
FIG. 2 is a graph comparing the efficiencies of Brayton-PATMI and the conventional Brayton power schemes.
Figure 3:
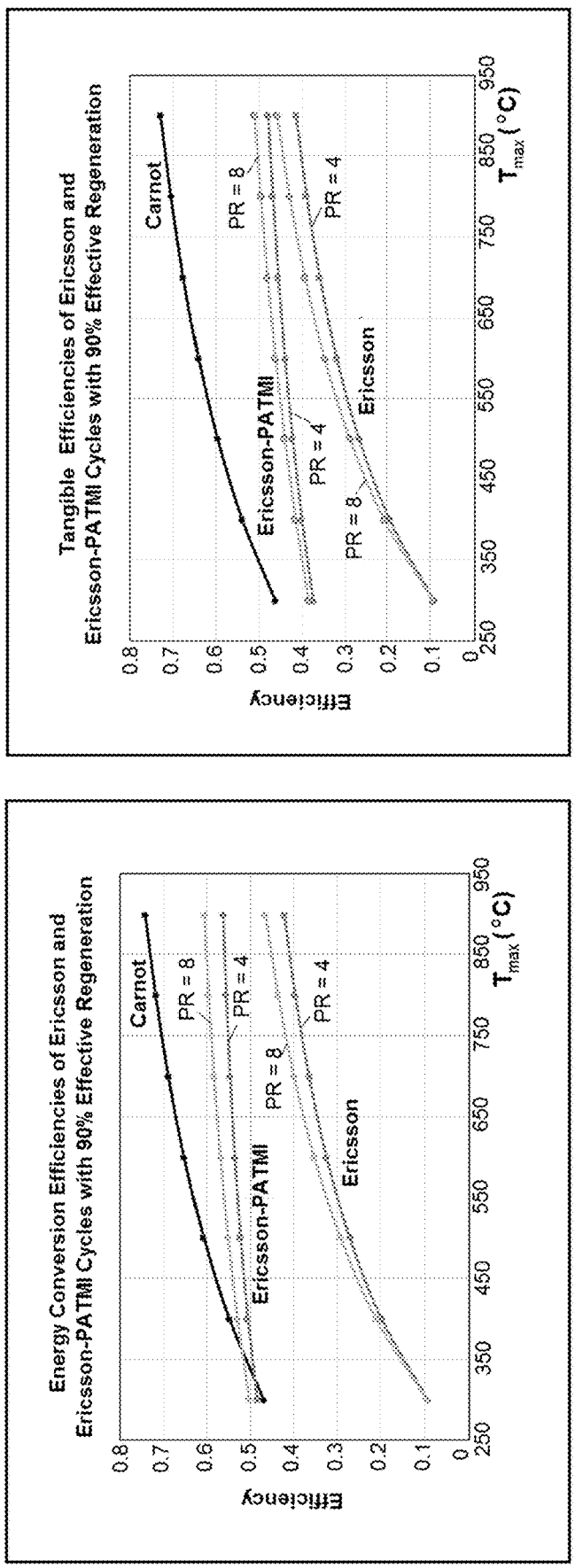
FIG. 3 is a graph comparing the efficiencies of Brayton-isoTT-PATMI and the Brayton-isoTT power schemes
Figure 4:
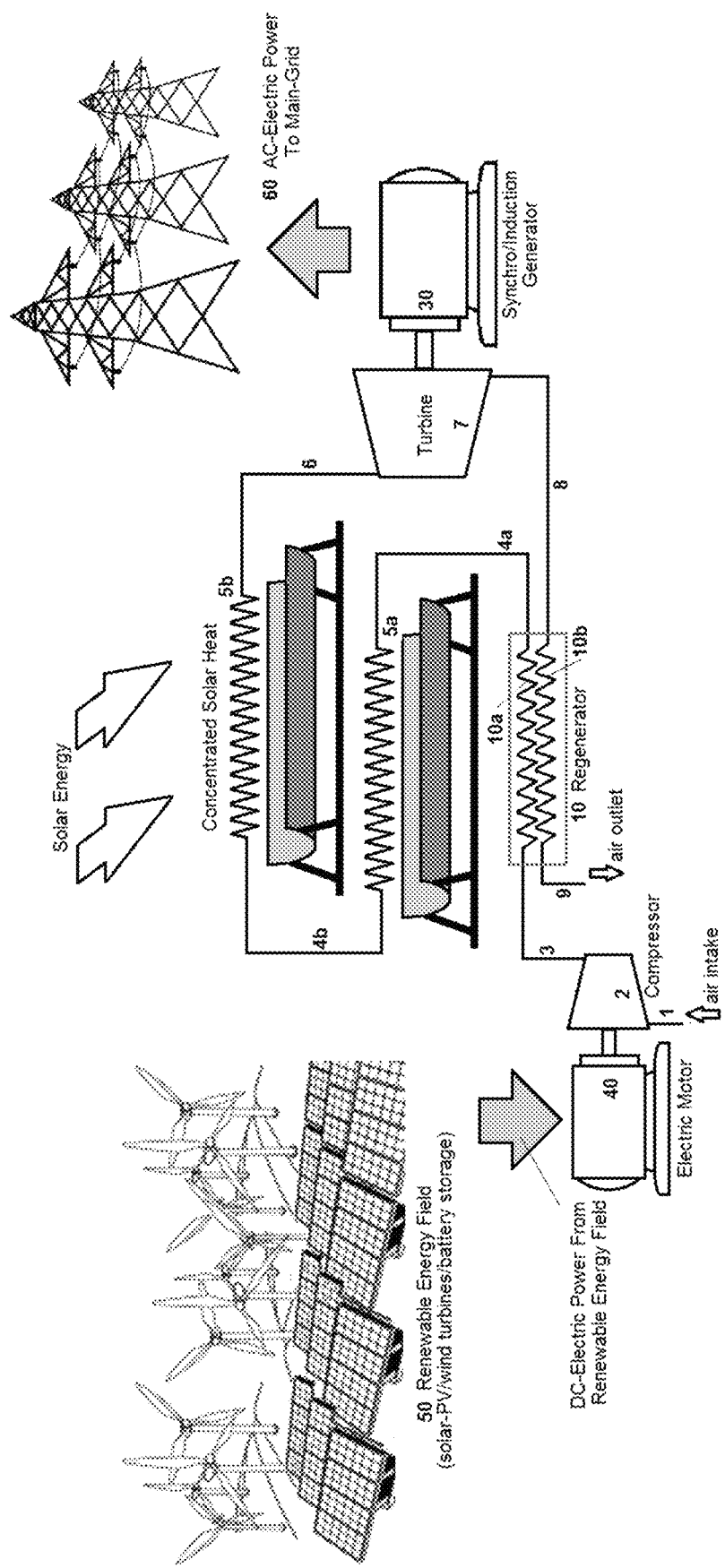
FIG. 4 is a schematic diagram of an Illustrative Embodiment of the invention based on solar-PV-thermal driven Brayton-PATMI power scheme.

This embodiment demonstrates how to reconfigure the basic Brayton cycle power plant to perform in Solar PV-Thermal driven Brayton-PATMI scheme. Similar to a conventional Brayton cycle power plant, the power scheme as shown in FIG. 4, comprises of a set of compression stages 2; a set of turbine expansion stages 7; heat-input devices 5*a* and 5*b* to heat the working fluid such as a set of heating conduits heated by concentrated solar thermal units; and an optional heat regenerator 10. In the Brayton-PATMI configuration, the compression stages 2 are driven by a renewable energy source 50 such as solar-PV units and/or fuel cells, which are driven by solar-PV generated hydrogen. As a result, the total power generated by the turbine stages 7 is delivered to the AC electricity generators 30, hence to the main power grid 60.

The workings of the solar PV-thermal driven Brayton-PATMI power scheme can be described as follows with reference to FIG. 4. The DC-electric power is generated in a renewable energy field 50 comprising of solar-PV cells, wind turbines, and/or any other renewable sources. So generated DC-electric power is used to drive the DC-electric motors 40, which in turn drive the compression stages 2. The compressor stages 2 extract atmospheric air through the compressor inlet 1 which may be fitted with a filter or a strainer to remove particulate matter. The working fluid air that enters the compression stages 2 is compressed by the compressor stages, thereby increasing the pressure and the temperature of the air. In order to minimize the power consumption of the compression stages, air could be cooled at multiple stages between the compression stages (not shown in FIG. 4). The compression stages 2 deliver the compressed air at its maximum pressure through the compressor outlet line 3 to the low-temperature flow passages 10a of the optional regenerator 10.

The regenerator 10 is a heat exchanger device, which comprises of low-temperature flow passages 10a and high-temperature flow passages 10b running approximately in parallel, but in counter-flow directions, thereby facilitating highly effective heat transfer from the high-temperature fluid stream 10b to the low-temperature fluid stream 10a that runs through the regenerator 10. The compressed air, which enters the low-temperature flow passages 10a of the regenerator through the compressor outlet 3 is heated by the high-temperature fluid stream that flows in the high-temperature flow passages 10b. Heated compressed air leaves the regenerator through the flowline 4a.

The compressed air, now at its maximum pressure and at a certain high temperature, flows into the working fluid heating device 5a and 5b, which are connected through the flowline 4b. In this configuration, the working fluid heating device is considered to be an externally heated flow conduit-type, with a set of solar-thermal collectors as its heat source. In order to achieve a maximum operating temperature in the range 300-500° C., the solar collectors need to be of the concentrating-type. However, it could either be an imaging-type which tracks the sun throughout the day, or a non-imaging type where sun-tracking is not essential. Another design variance that could arise here is the way in which the flow conduit of the power scheme working fluid and the solar thermal source are coupled. In the first variance, the solar concentrator is designed so that concentrating mirrors directly heat the flow conduits by directing the reflected rays of the concentrator on to the flow conduit. In the second variance design (not shown in the FIG. 4), the solar concentrator and the flow conduit are decoupled, and the heat is conveyed from the solar concentrator to the flow conduits by an intermediary phase-changing fluid such as water/steam using the heat-pipe principle.

The heated working fluid, now at its highest temperature enters the turbine stages 7 through the turbine feedline 6. The hot working fluid expands passing through the turbine stages 7, while the turbine shaft outputs the mechanical power harnessed by the turbine to the AC-electric generators 30. Eventually, the working fluid, now at a pressure somewhat close to but above the atmospheric pressure, exits the turbine stages 7 through the turbine outlet line 8 and enters the high-temperature flow passages 10b in the regenerator 10.

The hot working fluid, which enters the high-temperature flow passages 10b of the regenerator 10, rejects heat while heating up the low-temperature working fluid stream, which flows in the low-temperature flow passages 10a of the regenerator. Cooled working fluid in the high-temperature flow passages 10b, now at its lowest temperature, leaves the regenerator 10 through the exhaust line 9 and releases itself to the atmosphere, thus completing the cycle.

Illustrative Embodiment 2—Solar-PV-Hydrogen-Powered Brayton-PATMI Power Scheme

The embodiment described here is another variance of the Illustrative Embodiment 1 described above, and the variation is due to how the power scheme is powered. This Illustrative Embodiment is powered fully by the hydrogen gas generated in a renewable energy field, enabling this embodiment to operate at a higher temperature range 500-900° C.

Figure 5:
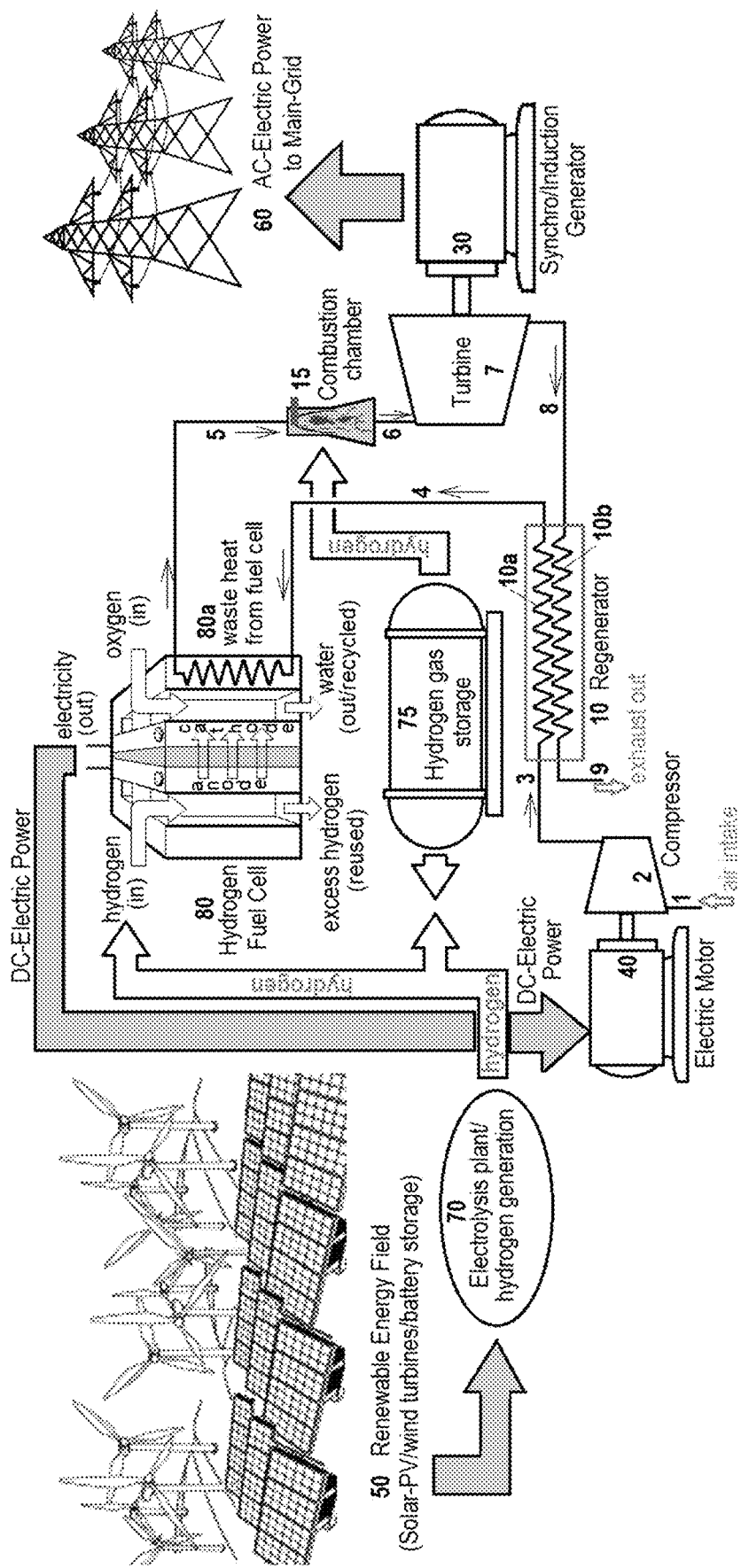
FIG. 5 is a schematic diagram of an Illustrative Embodiment of the invention based on solar-PV-hydrogen driven Brayton-PATMI power scheme.

As shown in FIG. 5 the DC-electric power is generated in a renewable energy field 50 comprising solar-PV cells, wind turbines, or any other renewable sources. In addition, the renewable energy field also generates gaseous hydrogen by an electrolysis process 70, and the generated hydrogen gas is stored in gas storage unit 75. On occasions where the solar energy availability is low, the DC-electric power is alternatively generated by hydrogen fuel cell units 80 using a portion of the hydrogen gas in the gas storage 75. In scenarios where the fuel cell operating temperature is in the range 300-600° C., the waste heat rejected from the fuel cells can be used to augment the heat supply to the Brayton cycle. This is achieved by the heat exchanger 80a attached to the fuel cell as shown in FIG. 5.

The workings of this Brayton-PATMI power scheme can be described as follows in reference to FIG. 5. The power scheme comprises of a set of compression stages 2; a set of turbine expansion stages 7; a hydrogen combustion chamber 15 to internally heat the working fluid; and an optional heat regenerator 10. In this hydrogen-driven Brayton-PATMI configuration, the compression stages 2 are driven by the electric motors 40 which in turn are driven by the DC electricity generated using hydrogen fuel-cell units 80. As a result, the total power generated by the turbine stages 7 is delivered to the AC electricity generators 30, and subsequently to the main power grid 60.

The compression stages 2 extract atmospheric air through the compressor inlet 1, which may be fitted with a filter or a strainer to remove particulate matter. The air that enters the compression stages 2 is compressed while passing through the compressor stages, thereby increasing the pressure and the temperature of the working fluid air. In order to minimize the power consumption of the compression stages 2, air could be inter-cooled at multiple stages between the compression stages (FIG. 5 does not show this feature). The compression stages 2 deliver the compressed air at its maximum pressure through the compressor outlet line 3 to the low-temperature flow passages 10a of the optional regenerator 10.

The regenerator 10 is a heat exchanger device, which comprises of low-temperature flow passages 10a and high-temperature flow passages 10b running approximately in parallel, but in counter-flow directions, thereby facilitating highly effective heat transfer from the high-temperature fluid stream 10b to the low-temperature fluid stream 10a. The compressed air which enters the low-temperature flow passages 10a of the regenerator 10 through the compressor outlet 3, is heated by the high-temperature fluid stream which flows in the high-temperature flow passages 10b. Heated compressed air then exits the regenerator through the flowline 4.

The compressed air, now at its maximum pressure and at a moderate high temperature, flows into the fuel cell heat exchanger 80a thereby heating the working fluid further. Heated compressed air flows through the combustion chamber feedline 5 and enters the combustion chamber 15. In the combustion chamber 15 the hydrogen gas is injected and ignited to heat the working fluid, enabling the working fluid to achieve its maximum operating temperature in the range 500-900° C.

The heated working fluid, now at its highest temperature, enters the turbine stages through the turbine feedline 6. The hot working fluid expands, passing through the turbine stages 7, while the turbine shaft outputs the mechanical power harnessed by the turbine. Eventually, the working fluid, now at a pressure somewhat close to but above the atmospheric pressure, exits the turbine stages 7 through the turbine outlet line 8 and enters the high-temperature flow passages 10*b* in the regenerator 10.

The hot working fluid that flows in the high-temperature flow passages 10*b* of the regenerator 10 rejects heat while heating up the low-temperature working fluid stream, which flows in the low-temperature flow passages 10*a* of the regenerator. The cooled working fluid in the high-temperature flow passages 10*b*, now at its lowest temperature leaves the regenerator 10 through the exhaust line 9 and releases itself to the atmosphere, completing the cycle.

Figure 6:
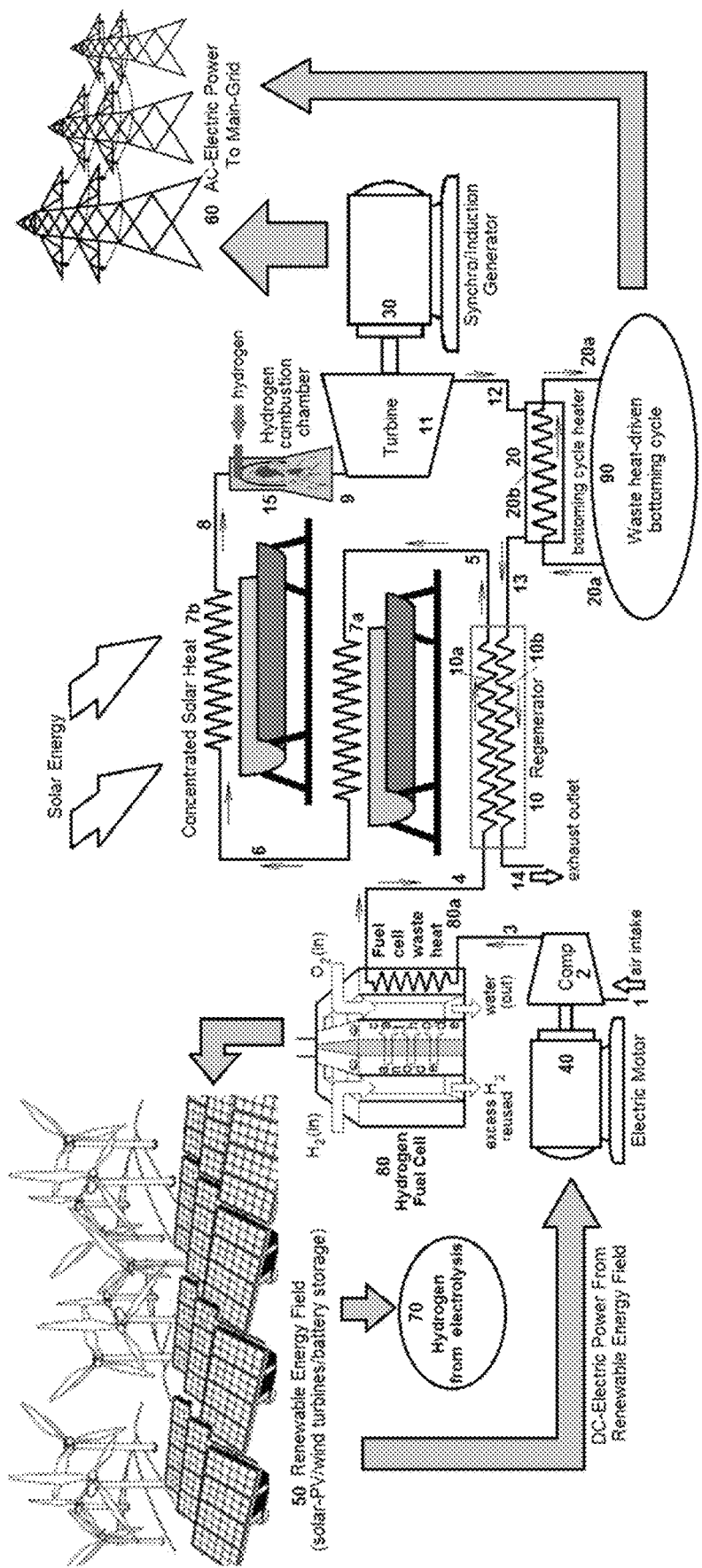
FIG. 6 is a schematic diagram of an Illustrative Embodiment of the invention based on solar-PV-thermal-hydrogen driven Brayton-PATMI power scheme with a bottoming cycle.

Illustrative Embodiment 3—Solar-PV-Thermal-Hydrogen Brayton-PATMI Power Scheme with a Bottoming Cycle Having a Thermal Feed from the Primary Cycle The embodiment described here is another variance of the Illustrative Embodiment 2 described above. The variation results from how the power scheme is powered; as well as the incorporation of a bottoming-cycle to generate extra power from the otherwise wasted heat. As shown in FIG. 6, this Illustrative Embodiment comprises of two power cycles; the primary cycle is the Brayton-PATMI based power cycle, and the secondary cycle is a bottoming-cycle powered by a thermal feed from the primary cycle. The primary power cycle is powered by multiple heat sources, which also includes a hydrogen combustion chamber, enabling the configuration to operate at a higher temperature range (700-900° C.). Consequently, because the flue gas expelled from the primary cycle turbine is at a considerably high temperature, a secondary bottoming-cycle can be incorporated to harness extra power, increasing the overall efficiency of the combined-cycle power scheme.

The secondary bottoming-cycle power unit could be any one of the low-to-medium temperature (500-700° C.) power cycles such as the Rankine cycle, Organic Rankine cycle, Kalina cycle, and/or any form of supercritical power cycles. However, for this application, the supercritical carbon dioxide ($sCO_2$) power cycles are preferred over the other cycles due to two reasons: (a) they have been proven to perform at higher efficiencies compared to other cycles (say 50% @ 650° C.); (b) their efficiencies can be further improved by incorporating the PATMI technology described here. Details of the $sCO_2$-PATMI power schemes for bottoming-cycle applications are covered under the Illustrative Embodiments 9(a) though 9(g).

Similar to the Illustrative Embodiment 1 and 2, the DC-electric power is generated in a renewable energy field 50 comprising solar-PV cells, wind turbines, and any other renewable sources. In addition, the renewable energy field also generates gaseous hydrogen by an electrolysis process 70, which is stored in a gas storage unit (not shown in FIG. 6). On occasions where the solar energy availability is low, the DC-electric power is alternatively generated by the hydrogen fuel cell unit 80 using a portion of the hydrogen gas in the gas storage. In scenarios where the fuel cell operating temperature is in the range 300-600° C., the waste heat rejected from the fuel cells can be used to augment the heat supply to the primary Brayton cycle. As shown in FIG. 6, this is achieved by the heat exchanger 80*a* that is attached to the fuel cell.

The power scheme comprises of a set of compression stages 2 driven by a set of electric motors 40; a set of turbine expansion stages 11; fuel cell waste-heat exchanger 80*a*; solar thermal collectors 7*a* and 7*b*; a hydrogen combustion chamber 15 to internally heat the working fluid; an optional heat regenerator 10; and a high-temperature regenerative heat exchanger 20 to power a suitable bottoming cycle 90.

The workings of this Brayton-PATMI power scheme with a bottoming-cycle can be described as follows in reference to FIG. 6. The compression stages 2 extract atmospheric air through the compressor inlet 1 which may be fitted with a filter or a strainer to remove particulate matter. The air that enters the compression stages 2 is compressed while passing through the compressor stages, thereby increasing the pressure and the temperature of the working fluid air. In order to minimize the power consumption of the compression stages 2, air could be inter-cooled at multiple stages between the compression stages (not shown in FIG. 6). The compression stages 2 deliver the compressed air at its maximum pressure through the compressor outlet line 3 to the waste-heat exchanger 80*a* in the fuel cell unit 80, thus conveying the waste-heat of the fuel cell unit to the compressed air stream. The heated air then flows through the feedline 4 to the low-temperature passages 10*a* of the optional regenerator 10.

One noteworthy aspect is that in this embodiment shown in FIG. 6, the working fluid flow sequence is set for compressed air to gain heat from the fuel cell waste-heat exchanger 80*a* first and then from the regenerator 10. However, this flow sequence can be reversed if the fuel cell operation temperature is greater than the regenerator operating temperature, in which case the compressed air needs to flow in the low-temperature passages 10*a* of the regenerator 10 first and then through the waste-heat exchanger 80*a* of the fuel cell unit 80.

The regenerator 10 is a heat exchanger device, which comprises of low-temperature flow passages 10*a* and high-temperature flow passages 10*b* running approximately in parallel, but in counter-flow directions, thereby facilitating highly effective heat transfer from the high-temperature fluid stream 10*b* to the low-temperature fluid stream 10*a* running through the regenerator 10. The compressed air which enters the low-temperature flow passages 10*a* of the regenerator 10 through the regenerator low-temperature feedline 4, is heated by the high-temperature fluid stream, which flows in the high-temperature flow passages 10*b*. The heated compressed air then exits the regenerator through the flowline 5.

The compressed air, now at its maximum pressure and at a certain high temperature, flows into the solar thermal collectors 7*a* and 7*b* in sequence, which are connected through the flowline 6, thereby heating the compressed air further to a higher temperature. The heated compressed air enters the combustion chamber 15 through the combustion chamber feedline 8. In the combustion chamber 15, the hydrogen gas is injected and ignited to heat the working fluid, thereby enabling the working fluid to achieve its maximum operating temperature in the range 700-900° C.

The heated working fluid, now at its highest temperature, enters the turbine stages 11 through the turbine feedline 9. The hot working fluid expands, passing through the turbine stages 11, while the turbine shaft outputs the mechanical power harnessed by the turbine to the AC-electric generators 30 which in turn supplies the generated electric power to the main power grid 60. Eventually, the expanded working fluid now at a low pressure somewhat close to but above the atmospheric pressure, exits the turbine stages 11 through the turbine outlet line 12 and enters the high-temperature waste-heat exchanger 20.

The high-temperature regenerator 20 acts as a thermal feed to the bottoming-cycle 90. Thus, the bottoming-cycle working fluid passes through the low-temperature flow passages 20a gaining heat, while the flue gas of the primary cycle cools down as it passes through the high-temperature flow passages 20b rejecting much of its high-temperature heat to the bottoming cycle 90.

Eventually, the flue gas of the primary cycle leaves the waste-heat exchanger 20 through the flowline 13 and enters the regenerator 10. The flue gas further rejects heat passing through the high-temperature flow passages 10b of the regenerator 10 and heats up the low-temperature compressed air, which flows in the low-temperature flow passages 10a of the regenerator. The cooled flue gas, now at its lowest temperature, leaves the high-temperature flow passages 10b of the regenerator 10 through the exhaust line 14 and releases itself to the atmosphere, thus completing the primary cycle.

This Illustrative Embodiment describes the use of a secondary bottoming-cycle driven by a thermal feed from an open-air primary cycle power scheme, thus achieving a higher overall efficiency of the combined-cycle power scheme. In a similar manner a closed-cycle power scheme could be used as the primary cycle to drive a suitable bottoming cycle. Such an Illustrative Embodiment will be discussed in a later section.

Illustrative Embodiment 4—Solar-PV-Hydrogen Brayton-PATMI Power Scheme with a sCO$_2$ Bottoming Cycle Thermal Feed is Augmented with the Fuel Cell Waste Heat The embodiments described here are variances of the Illustrative Embodiment 3 described above and the variances result from how the bottoming-cycle thermal feed is arranged. In the Illustrative Embodiment 3 the bottoming-cycle thermal feed solely came from the primary cycle while the waste-heat from the fuel cell was fed to the primary cycle. However, in these variances the bottoming-cycle is fed with the thermal feed from the primary cycle as well as from the fuel cell waste-heat feed. As a result, depending on the fuel cell operating temperature range is higher (or lower) with respect to the temperature of the primary cycle thermal feed to the bottoming cycle, two thermal feed configurations result for the bottoming-cycle. These two variances are described in the following sections under the Illustrative Embodiment 4(a) and the Illustrative Embodiment 4(b).

Figure 7A:
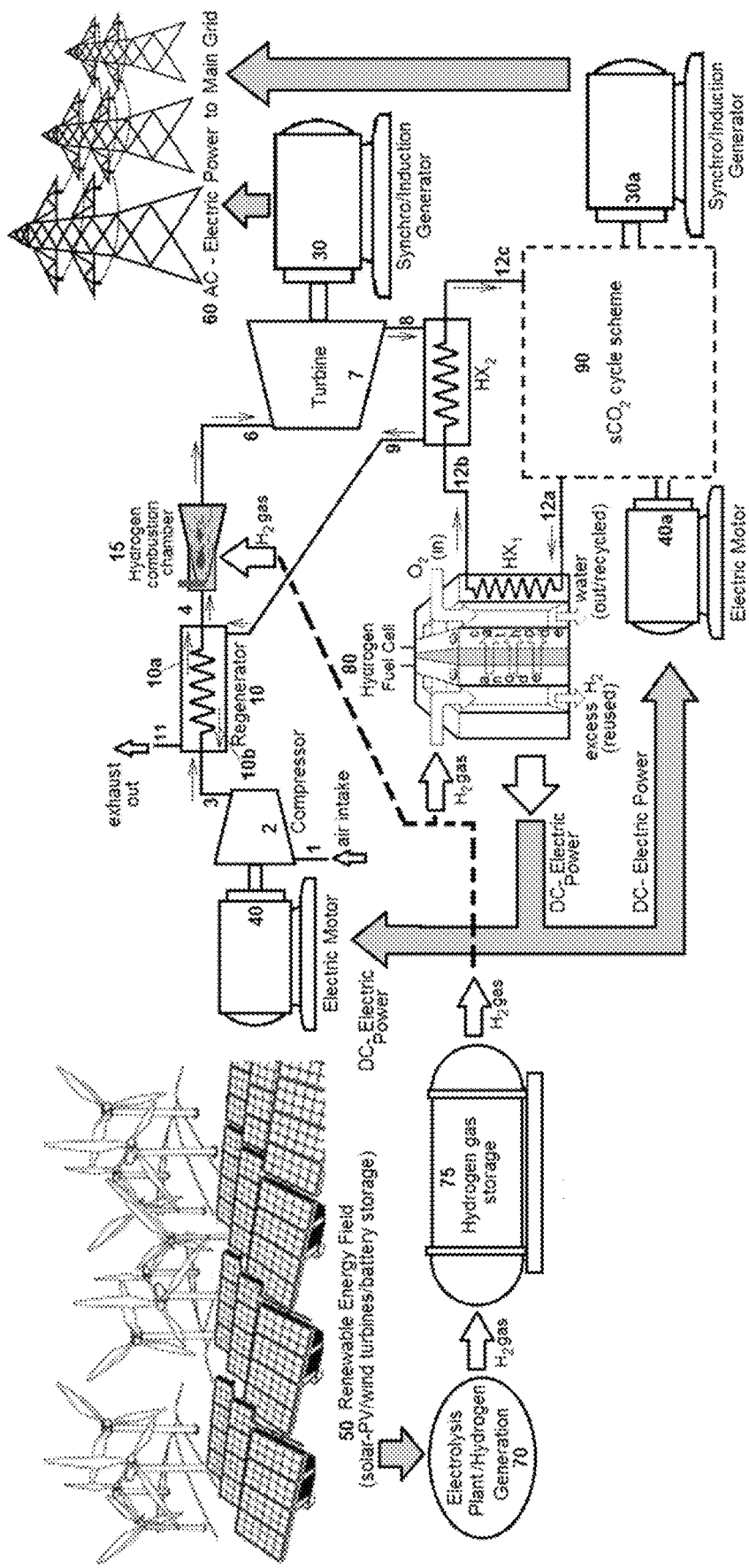
FIG. 7(a) is a schematic diagram of an Illustrative Embodiment of the invention based on solar-PV-hydrogen driven Brayton-PATMI power scheme with $sCO_2$ bottoming cycle, which has a low-moderate temperature thermal feed from the fuel cell

Illustrative Embodiment 4(a)—the sCO$_2$ Bottoming Cycle Gets Higher Temperature Heat from the Primary Cycle Thermal Feed As shown in FIG. 7(a), this Illustrative Embodiment comprises of two power cycles: the first is the Brayton-PATMI primary gas power cycle; and the second is the secondary bottoming-cycle power unit. The primary power cycle is powered by multiple heat sources which also include a hydrogen combustion chamber, thus enabling this configuration to operate at a higher temperature range (700-900° C.). Consequently, the flue gas expelled from the primary cycle turbine is at a considerably high temperature, a secondary bottoming-cycle can be incorporated to harness extra power, thus augmenting the overall efficiency of the combined-cycle power scheme. The secondary bottoming-cycle power unit could be any one of the low-to-medium temperature (500-700° C.) power cycles; however, for this application the supercritical carbon dioxide (sCO$_2$) power cycles are preferred due to the reasons mentioned in reference to the Illustrative Embodiment 3.

Similar to the Illustrative Embodiment 3, the DC-electric power is generated in a renewable energy field 50 comprising solar-PV cells, wind turbines, and any other renewable sources. In addition, the renewable energy field also generates gaseous hydrogen by an electrolysis process 70, and so generated hydrogen gas is stored in gas storage unit 75. On occasions where the solar energy availability is low, the DC-electric power is alternatively generated by the hydrogen fuel cell unit 80 using a portion of the hydrogen gas in the gas storage.

The power scheme comprises of a set of compression stages 2 driven by a set of electric motors 40; a set of turbine expansion stages 7; a hydrogen combustion chamber 15 to internally heat the working fluid; an optional low-temperature heat regenerator 10; fuel cell waste-heat exchanger HX$_1$; and a high-temperature regenerative heat exchanger HX$_2$ to thermally power the sCO$_2$ bottoming cycle 90. For this Illustrative Embodiment it is assumed that the primary cycle thermal feed to the bottoming-cycle has a higher temperature than the temperature of the fuel cell waste-heat feed.

The workings of this Brayton-PATMI power scheme with a bottoming-cycle can be described as follows with reference to FIG. 7(a). The compression stages 2 extract atmospheric air through the compressor inlet 1 which may be fitted with a filter or a strainer to remove particulate matter. The air that enters the compression stages 2 is compressed while passing through the compressor stages, thereby increasing the pressure and the temperature of the working fluid air. In order to minimize the power consumption of the compression stages 2, air could be inter-cooled at multiple stages between the compression stages (FIG. 7(a) does not show this feature). The compression stages 2 deliver the compressed air which is at its maximum pressure, to the optional low-temperature regenerator 10 through the compressor outlet line 3.

The regenerator 10 is a heat exchanger device which comprises of low-temperature flow passages 10a and high-temperature flow passages 10b running approximately in parallel, but in counter-flow directions, thereby facilitating highly effective heat transfer from the high-temperature fluid stream 10b to the low-temperature fluid stream 10a. The compressed air, which enters the low-temperature flow passages 10a through the regenerator low-temperature feed-line 3 is heated by the high-temperature fluid stream, which flows in the high-temperature flow passages 10b. The heated compressed air then exits the regenerator through the flow-line 4.

The compressed air, now at a certain high temperature, enters the combustion chamber 15 through the feedline 4. In the combustion chamber 15 the hydrogen gas is injected and ignited to heat the working fluid, thereby enabling the working fluid to achieve its maximum operating temperature in the range 700-900° C. As a variance to this Illustrative Embodiment, solar thermal heating option (not shown in FIG. 7(a)) can be included as a secondary thermal feed to the primary cycle. So heated working fluid, now at its highest temperature, enters the turbine stages 7 through the turbine feedline 6. The hot working fluid expands passing through the turbine stages 7 while the turbine shaft outputs the mechanical power harnessed by the turbine to the AC-electric generators 30 which in turn supplies the generated AC-electric power to the main power grid 60. Eventually, the expanded working fluid, now at a low pressure somewhat close to but above the atmospheric pressure, exits the turbine stages 7 through the turbine outlet line 8 and enters the high-temperature waste-heat exchanger $HX_2$.

Eventually, the flue gas of the primary cycle leaves the waste-heat exchanger $HX_2$ through the flowline 9 and enters the low-temperature regenerator 10. The flue gas further rejects heat passing through the high-temperature flow passages 10b of the regenerator 10 and heats up the low-temperature compressed air, which flows in the low-temperature flow passages 10a of the regenerator. The flue gas, having rejected heat in the flow passages 10b, leaves the high-temperature flow passages 10b of the regenerator 10 through the exhaust line 11, thus completing the primary cycle.

The high-temperature regenerator $HX_2$ acts as one of the thermal feeds to the bottoming-cycle 90, whereas the waste-heat exchanger $HX_1$ of the fuel cell acts as the second thermal feed to the bottoming-cycle. For this Illustrative Embodiment it is assumed that the fuel cell waste-heat feed is at a lower temperature range (400-500° C.) compared to the temperature of the exhaust flue gas expelling from the primary cycle turbine 7. Therefore, the bottoming-cycle working fluid carbon dioxide gains heat by passing through the waste-heat exchanger of the fuel cell $HX_1$ first and then gains further heat from the low-temperature flow passages of $HX_2$. Accordingly, the bottoming-cycle working fluid flows from the feedline 12a to the heat exchanger $HX_1$ first; then the working fluid is conveyed to the $HX_2$ through the feedline 12b; and finally, the working fluid flows through the feedline 12c to complete the bottoming-cycle.

The bottoming-cycle compressors are driven by the electric motors 40a which in turn are driven by the renewable energy field 50, while the generators 30a coupled to the turbine expanders of the bottoming-cycle generate AC-electric power to augment the power output to the main power grid 60.

One noteworthy consequence of this arrangement is that since the exhaust flue gas temperature of the primary cycle turbine determines the highest temperature of the $sCO_2$ bottoming-cycle, to obtain high overall performance the primary cycle pressure ratio needs to be in a moderate range.

Figure 7B:
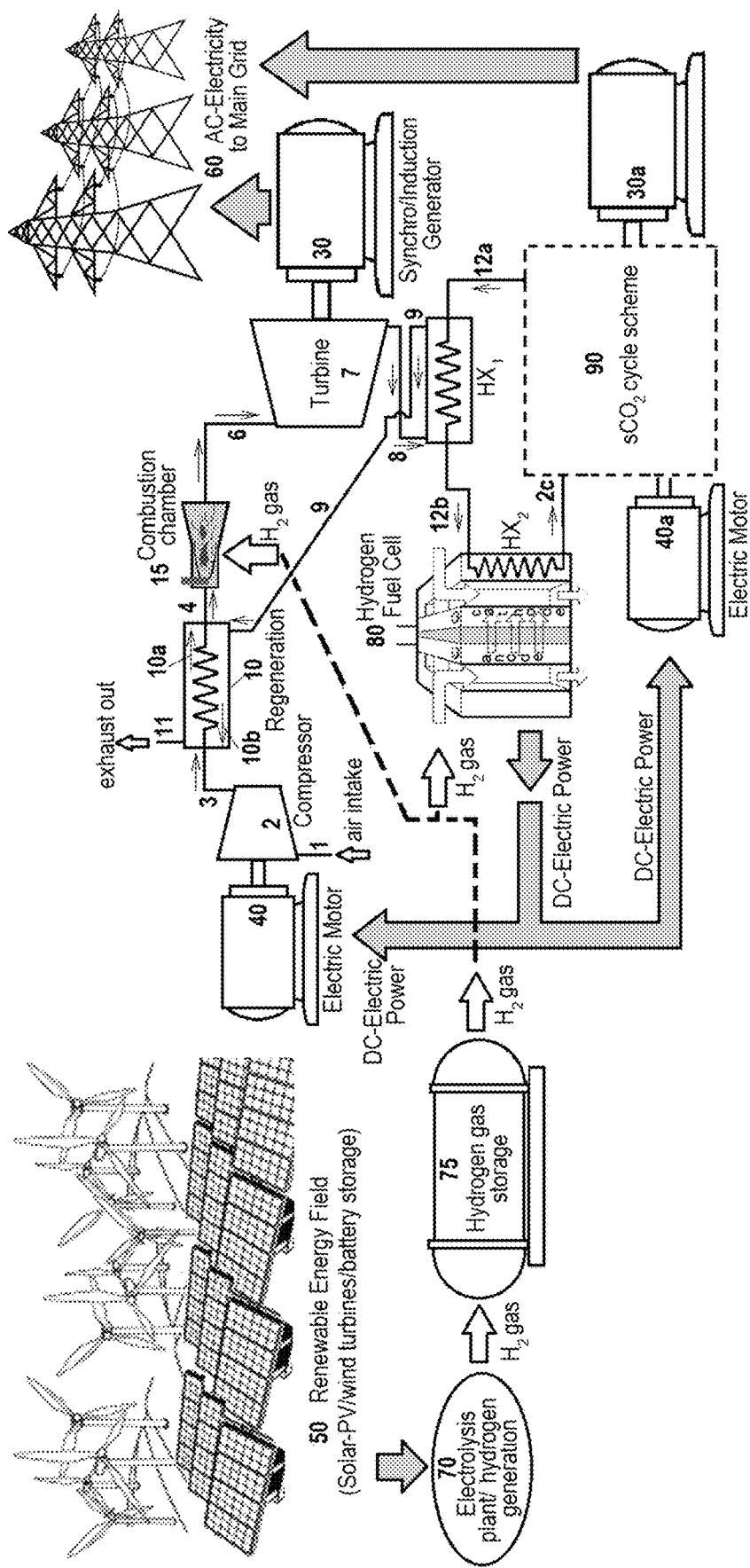
FIG. 7(b) is a schematic diagram of an Illustrative Embodiment of the invention based on solar-PV-hydrogen driven Brayton-PATMI power scheme with $sCO_2$ bottoming cycle, which has a high temperature thermal feed from the fuel cell

Illustrative Embodiment 4(b)—the $sCO_2$ Bottoming Cycle Gets Higher Temperature Heat from the Fuel Cell Waste Heat Feed This embodiment, to a very high degree, is similar to the Illustrative Embodiment 4(a) described in the previous section, however with a subtle variance based on how the thermal feeds of the bottoming-cycle are arranged. As shown in FIG. 7(b), this Illustrative Embodiment comprises of two power cycles: the first is the Brayton-PATMI primary gas power cycle; and the second is the secondary bottoming-cycle power unit. The primary power cycle is powered by multiple heat sources which also include a hydrogen combustion chamber, thus enabling this configuration to operate at a higher temperature range (700-900° C.). Consequently, the flue gas expelled from the primary cycle turbine is at a considerably high temperature, a secondary bottoming-cycle can be incorporated to harness extra power, thus augmenting the overall efficiency of the combined-cycle power scheme. The secondary bottoming-cycle power unit could be any one of the low-to-medium temperature (500-700° C.) power cycles, however, for this application the supercritical carbon dioxide ($sCO_2$) power cycles are preferred due to the reasons mentioned in reference to the Illustrative Embodiment 3.

Similar to the Illustrative Embodiment 4(a), the DC-electric power is generated in a renewable energy field 50 comprising solar-PV cells, wind turbines, and any other renewable sources. In addition, the renewable energy field also generates gaseous hydrogen by an electrolysis process 70, and so generated hydrogen gas is stored in gas storage unit 75. On occasions where the solar energy availability is low, the DC-electric power is alternatively generated by the hydrogen fuel cell unit 80 using a portion of the hydrogen gas in the gas storage.

The power scheme comprises of a set of compression stages 2 driven by a set of electric motors 40; a set of turbine expansion stages 7; a hydrogen combustion chamber 15 to internally heat the working fluid; an optional low-temperature heat regenerator 10; a high-temperature regenerative heat exchanger $HX_1$; and a fuel cell waste-heat exchanger $HX_2$ to thermally power the $sCO_2$ bottoming cycle 90.

The major variance between the Illustrative Embodiments 4(a) and 4(b) is based on which of the two thermal feeds to the $sCO_2$ bottoming-cycle is the high temperature feed. For the Illustrative Embodiment 4(a) it was assumed that the primary cycle thermal feed is at a higher temperature compared to the temperature of the fuel cell thermal feed. In this Illustrative Embodiment it is assumed that the fuel cell thermal feed is at a higher temperature; for example, the fuel cell could be of a molten-carbonate type which operates at the temperature range (600-700° C.). Under these conditions the flue gas expelled from the primary cycle turbine can provide the low-temperature thermal feed to the $sCO_2$ bottoming-cycle. One advantage of this scenario is that the pressure ratio of the primary cycle need not be restricted to the moderate range, meaning that the primary cycle can generate more power compared to the Illustrative Embodiment 4(a).

The workings of this Brayton-PATMI power scheme with the $sCO_2$ bottoming-cycle can be described as follows with reference to FIG. 7(b). The compression stages 2 extract atmospheric air through the compressor inlet 1 which may be fitted with a filter or a strainer to remove particulate matter. The air that enters the compression stages 2 is compressed while passing through the compressor stages, thereby increasing the pressure and the temperature of the working fluid air. In order to minimize the power consumption of the compression stages 2, air could be inter-cooled at multiple stages between the compression stages (FIG. 7(b) does not show this feature). The compression stages 2 deliver the compressed air which is at its maximum pressure, to the optional low-temperature regenerator 10 through the compressor outlet line 3.

The regenerator 10 is a heat exchanger device, which comprises of low-temperature flow passages 10a and high-temperature flow passages 10b running approximately in parallel, but in counter-flow directions, thereby facilitating highly effective heat transfer from the high-temperature fluid stream 10b to the low-temperature fluid stream 10a. The compressed air, which enters the low-temperature flow passages 10a of the regenerator 10 through the regenerator low-temperature feedline 3, is heated by the high-temperature fluid stream which flows in the high-temperature flow passages 10b. The heated compressed air then exits the regenerator through the flowline 4.

The compressed air, now at a certain high temperature, enters the combustion chamber 15 through the feedline 4. In the combustion chamber 15 the hydrogen gas is injected and ignited to heat the working fluid, thereby enabling the working fluid to achieve its maximum operating temperature in the range 700-900° C. As a variance to this Illustrative Embodiment, solar thermal heating option (not shown in FIG. 7(b)) can be included as a secondary thermal feed to the primary cycle. So heated working fluid, now at its highest temperature, enters the turbine stages 7 through the turbine feedline 6. The hot working fluid expands passing through the turbine stages 7 while the turbine shaft outputs the mechanical power harnessed by the turbine to the AC-electric generators 30 which in turn supplies the generated AC-electric power to the main power grid 60. Eventually, the expanded working fluid, now at a low pressure somewhat close to but above the atmospheric pressure, exits the turbine stages 7 through the turbine outlet line 8 and enters the high-temperature waste-heat exchanger $HX_1$.

Eventually, the flue gas of the primary cycle leaves the waste-heat exchanger $HX_1$ through the flowline 9 and enters the low-temperature regenerator 10. The flue gas further rejects heat passing through the high-temperature flow passages 10b of the regenerator 10 and conveys heat to the compressed air, which flows in the low-temperature flow passages 10a of the regenerator. The flue gas, having rejected heat in the flow passages 10b, leaves the flow passages 10b of the regenerator 10 through the exhaust line 11, thus completing the primary cycle.

The primary cycle thermal feed through the heat exchanger $HX_1$ acts as the low-temperature thermal feed to the bottoming-cycle 90, whereas the waste-heat exchanger $HX_2$ of the fuel cell acts as the high-temperature thermal feed to the bottoming-cycle. For this Illustrative Embodiment it is assumed that the fuel cell waste-heat feed is at a high temperature range (600-700° C.) compared to the temperature of the exhaust flue gas expelling from the primary cycle turbine 7. Therefore, the bottoming-cycle working fluid, carbon dioxide gains heat by passing through the low-temperature primary cycle thermal feed $HX_1$ first and then gains further heat from the high-temperature fuel cell waste-heat exchanger $HX_2$. Accordingly, the bottoming-cycle working fluid flows from the feedline 12a to the heat exchanger $HX_1$ first; then the working fluid is conveyed to the $HX_2$ through the feedline 12b; and finally, the working fluid flows through the feedline 12c to complete the bottoming-cycle.

The bottoming-cycle compressors are driven by the electric motors 40a, which in turn are driven by the renewable energy field 50, while the generators 30a coupled to the turbine expanders of the bottoming-cycle generate AC-electric power to augment the power output to the main power grid 60.

Illustrative Embodiment 5—Liquid Hydrogen Driven Brayton-PATMI Power Scheme

In the Illustrative Embodiments 2, 3, and 4 the hydrogen gas to drive the power scheme is assumed available in the gaseous form. Suppose, hydrogen is transported for greater distances in the liquid form, a major portion of the energy consumed in liquefying the hydrogen gas can be recovered by using liquid hydrogen in pre-coolers, intercoolers, and post-coolers placed before, in between, and after the compression stages. In doing so, not only a major portion of the energy consumption of the compression stages is saved, but also the hydrogen is heated and brought to the gaseous state. The Illustrative Embodiment 5 described here is a variance of the Illustrative Embodiment 2 with the incorporation of liquid hydrogen as the fuel source.

Figure 8:
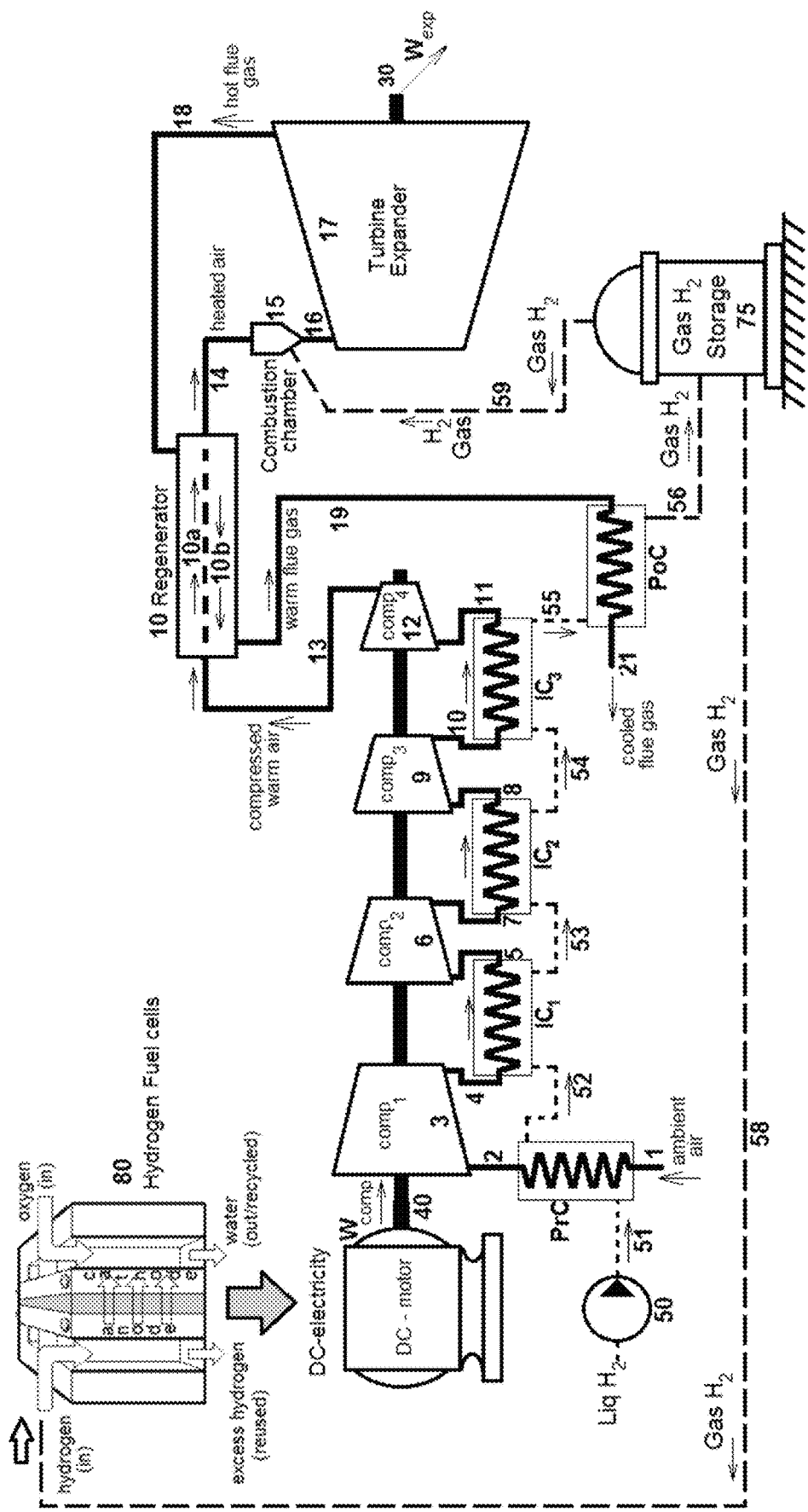
FIG. 8 is a schematic diagram of an Illustrative Embodiment of the invention based on the liquid-hydrogen driven Brayton-PATMI power scheme.

Similar to the Illustrative Embodiments 2, 3, and 4 this Illustrative Embodiment as shown in FIG. 8, comprises of a set of compression stages 3, 6, 9, and 12; a set of turbine expansion stages 17; a hydrogen combustion chamber 15 to internally heat the working fluid; an optional heat regenerator 10 to regenerate heat which otherwise would have been wasted; and a hydrogen fuel cell system 80 to provide electrical power to drive the compression stages by a set of DC-electric motors 40. In addition, this Illustrative Embodiment contains a series of heat exchanger devices $IC_1$ through $IC_3$ and PrC to cool the working fluid air with very cold liquid hydrogen. While these heat exchanger devices are used in the compression process, one post-cooler PoC is used to cool the flue gas emitting from the power scheme. Apart from the main cycle flow scheme, a second flow scheme carries the liquid hydrogen which exists at (approx.) −240° C.

The workings of the liquid hydrogen driven Brayton-PATMI power scheme can be described as follows in reference to FIG. 8, which depicts the power scheme comprising of four compression stages 3, 6, 9, 12 as an example. The first compression stage 3 ($comp_1$) extracts atmospheric air through the plant's air inlet 1 which may be fitted with a filter or a strainer to remove particulate matter. The air that flows through the feedline 1 enters the first precooler PrC, which cools the air at the atmospheric conditions to a very low temperature (approx. −130° C.) by the liquid-hydrogen. The cold air in the precooler PrC is then extracted through the feedline 2 to the first compression stage 3 ($comp_1$). The air, which enters the compressor is compressed to a certain degree in the first compression stage 3, and is delivered to the first intercooler $IC_1$ through the feedline 4. This sequence of progressive compression and intercooling of air occurs in the next two compression stages 6 ($comp_2$) and 9 ($comp_3$) followed by the intercoolers $IC_2$ and $IC_3$. In these two stages the air is extracted to the compression stages through their individual inlet lines 5 and 8, while the air is delivered to the intercoolers through their individual outlet lines 7 and 10. The last compression stage 12 ($comp_4$) extracts air, which is already compressed to a very high degree through the feedline 11, and compresses air to the highest pressure of the cycle. The compressed air is then delivered to the optional regenerator 10 through the feedline 13. At this point the compressed air temperature is expected to be around −100° C.

The regenerator 10 is a heat exchanger device, which comprises of low-temperature flow passages 10a and high-temperature flow passages 10b running approximately in parallel, but in counter-flow directions, thereby facilitates highly effective heat transfer from the high-temperature fluid stream 10b to the low-temperature fluid stream 10a. The compressed air, which enters the low-temperature flow passages 10a through the compressor outlet 13 is heated by the high-temperature fluid stream, which flows in the high-temperature flow passages 10b. The heated compressed air then exits the regenerator (temperature in the range 400-450° C.) through the flowline 14.

The compressed air, now at its maximum pressure and at a certain high temperature, flows into the combustion chamber 15, where the hydrogen gas is injected and ignited to heat the working fluid. This enables the working fluid to achieve its maximum operating temperature in the range 700-800° C. The heated working fluid, now at its highest temperature, enters the turbine stages 17 through the turbine feedline 16. The hot working fluid expands through the turbine stages 17 while the turbine shaft 30 delivers the mechanical power output harnessed in the turbine to the AC-generators (not shown in FIG. 8). Eventually, the working fluid, now hot flue gas at a pressure somewhat close to but above the atmospheric pressure, exits the turbine stages 17 through the turbine outlet line 18 and enters the high-temperature flow passages 10b in the regenerator 10.

The hot working fluid, which enters the high-temperature flow passages 10b of the regenerator 10, rejects heat while heating up the low-temperature working fluid stream 10a. The cooled flue gas stream now at a certain low temperature leaves the regenerator 10 through the exhaust line 19. Eventually, the flue gas passes through the post-cooler PoC, thereby heating the low-temperature hydrogen to its gaseous state. In this post-cooling process, water vapor in the flue gas condenses and ultimately releases itself to the atmosphere through the exhaust line 21, completing the cycle of the working fluid air.

In this Illustrative Embodiment, the liquid hydrogen undergoes a series of processes described as follows. Liquid hydrogen is pumped into the power plant by the pump 50 to the pre-cooler PrC through its feedline 51. Subsequently, the liquid hydrogen flows through the intercoolers $IC_1$, $IC_2$, $IC_3$ fed by their feed lines 52, 53, 54, thereby cooling the working fluid air in between the compression stages 3, 6, 9, 12. Eventually, the liquid hydrogen passes through the feedline 55 and enters the post-cooler PoC to cool the flue gas which enters through the exhaust line 19. The post-cooler PoC converts all the liquid hydrogen to gaseous hydrogen, and the generated hydrogen gas enters the storage tank 75 through the feedline 56. The hydrogen gas which is stored in the storage tank 75, is fed to the combustion chamber 15 through a metering device (not shown in FIG. 8) located in the fuel feedline 59. In a similar manner, the hydrogen gas is metered through the fuel feedline 58 to the fuel cell system 80 which provides DC-electric power to drive the compressor stages.

A number of variances of the Illustrative Embodiment described above can be devised by allowing the heat liberated by the fuel cell to be used suitably to heat up the compressed air in the main power cycle, which saves some hydrogen fuel used in the combustion chamber. However, the location at which this heat injection occurs depends on whether the fuel cell operates at a low, moderate, or high temperature. If the fuel cell operates at a high temperature (above 500° C.), then the heat rejected by the fuel cell can be used to heat up the compressed air by placing the fuel cell waste-heat exchanger in the flowline 14. On a similar rationale, if the fuel cell operating temperature is moderate to low (below 500° C.), a similar heat exchanger can be placed in the flowline 13. On the other hand, the waste heat liberated by the fuel cell can also be used to heat up the hydrogen fuel in the fuel feedlines 58 or 59 and/or on the liquid hydrogen feedlines 55 or 56.

Illustrative Embodiment 6—Solar-PV-Hydrogen Driven Brayton-isoTT-PATMI Power Scheme Under the section titled The Essence and Merits of the Invention, it was shown that adopting the PATMI technology to a power unit, which runs on the Brayton-isoTT cycle increases its efficiency beyond the Carnot efficiency. This disclosure demonstrates how to reconfigure a Brayton-isoTT cycle power plant to perform in Brayton-isoTT-PATMI scheme powered by the hydrogen gas. The Brayton cycle and the Brayton-isoTT cycle, to a greater degree, are very similar, except in the way that heat is provided to the cycles. In the Brayton cycle, the working fluid is heated in an isobaric process prior to the expansion process, the latter being an adiabatic process. In order to minimize the compression work in the Brayton cycle, the heat is removed in between the compression stages by incorporating intercoolers. The regenerator is optional in the Brayton cycle. Although the cycle can operate without a regenerator, having a regenerator increases the energy conversion efficiency.

In the Brayton-isoTT cycle described here consists of inter-cooled multi-stage compression process and multiple fuel injection points in the turbine between expansion stages, coupled with a high-performing regenerator with 90-95% heat transfer effectiveness.

Figure 9:
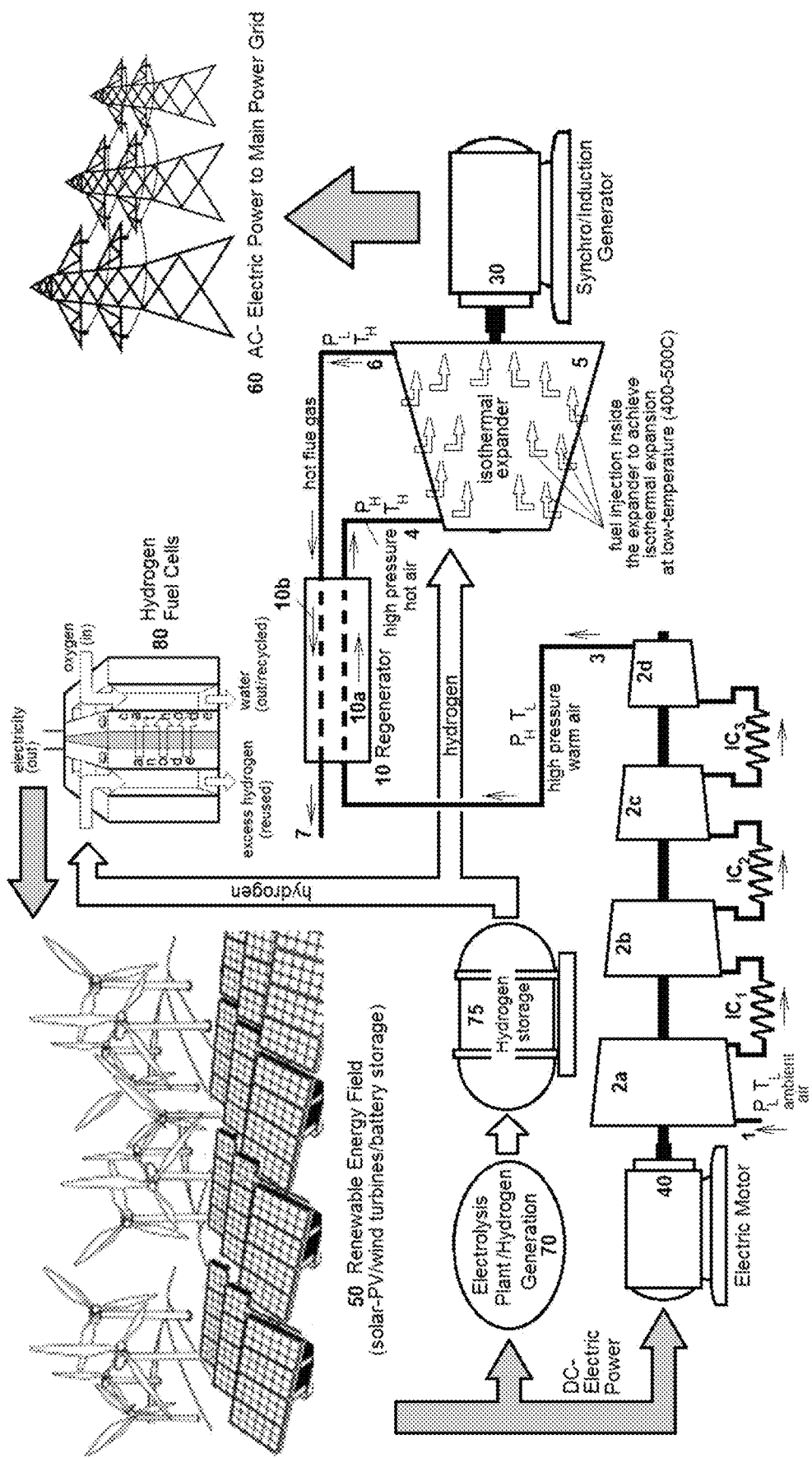
FIG. 9 is a schematic diagram of an Illustrative Embodiment of the invention based on solar-PV-hydrogen driven Brayton-isoTT-PATMI scheme.

As shown in FIG. 9, this Illustrative Embodiment comprises of a set of compression stages 2a, 2b, 2c, 2d; a set of turbine expansion stages 5; and a heat regenerator with a high heat transfer effectiveness 10. In this Brayton-isoTT-PATMI configuration, the compression stages are driven by a set of DC-electric motors 40 which are in turn powered by the DC-electricity generated in a renewable energy field 50 or using a hydrogen fuel-cell 80. As a result, the total power generated by the turbine stages is fully delivered to the AC-electric generators 30, which in turn supplies power to the main power grid 60.

The workings of this Brayton-isoTT-PATMI power scheme can be described as follows in reference to FIG. 9. A renewable field 50 contains DC-electric power generators such as solar PV-arrays, wind generators, and electric energy storage devices such as batteries, so that generated DC-electricity can be stored in the batteries. A portion of this stored energy is used to generate hydrogen gas in an electrolysis operation 70 and so generated hydrogen is stored in a hydrogen storage tank 75. When the renewable energy availability is scarce, a set of hydrogen fuel cells 80 uses a portion of the stored hydrogen to generate DC-electricity which augment the stored electric energy in batteries. The generated DC-electric power drives the compression stages 2a through 2d, enabling the extraction of the atmospheric air through the compressor inlet 1, which may be fitted with a filter or a strainer to remove particulate matter. The air that enters the compression stage 2a is compressed to a certain pressure while the temperature of the air is also increased to a certain degree. The partially compressed air then flows through the intercooler $IC_1$. In the intercooler the air is cooled to a lower temperature while the pressure more or less remains the same. The cooled air now at a certain higher pressure enters the next compressor stage 2b where the air is compressed further. As FIG. 9 shows, this alternate compression and intercooling continue through the compressor stages 2b, 2c, and 2d and the intercoolers $IC_2$ and $IC_3$, thereby compressing the air to the highest pressure of the cycle while its temperature increase is kept to a minimum. The compressed working fluid air, now at a mildly higher temperature is delivered through the compressor outlet line 3 to the low-temperature flow passages 10a of the regenerator 10.

As was the case with the previously described Illustrative Embodiments, the regenerator 10 is a heat exchanger device, which comprises of low-temperature flow passages 10a and high-temperature flow passages 10b running approximately in parallel, but in counter-flow directions, facilitates highly effective heat transfer (effectiveness 90-95%) from the high-temperature fluid stream 10b to the low-temperature fluid stream 10a. The compressed air, which flows through the low-temperature flow passages 10a of the regenerator 10, is heated by the high-temperature fluid stream which flows in the high-temperature flow passages 10b. The heated compressed air exits the regenerator through the turbine feedline 4.

The working fluid, now heated to (or very close to) the highest temperature of the cycle, enters the turbine stages 5. The hot working fluid expands through the turbine stages 5 while the hydrogen fuel is injected and ignited into the turbine at multiple points located strategically between the expansion stages to maintain the temperature of the expanding gas at its maximum value of the cycle. The working fluid expansion process enables the turbine 5 to output the mechanical power harnessed in the turbine to the AC-electric generator 30. The expansion process in the turbine 5 continues until the air (now contains a minute quantity of water vapor) reaches a pressure close to but above the atmospheric pressure while its temperature reaches a value somewhat higher than the compressed air temperature at the turbine inlet. Eventually, the working fluid containing a minute quantity of water vapor exits the turbine stages 5 through the turbine outlet line 6 and enters the high-temperature flow passages 10b in the regenerator 10.

The hot working fluid flows through the high-temperature flow passages 10b of the regenerator 10 and rejects heat while heating up the low-temperature working fluid stream, which flows in the low-temperature flow passages 10a of the regenerator. The cooled working fluid in the high-temperature flow passages 10b, now at its lowest temperature, leaves the regenerator 10 through the exhaust line 7 and releases itself to the atmosphere, completing the cycle.

It is worth highlighting that in order to begin the quasi-isothermal expansion process in the turbine at the highest temperature of the cycle, the hot compressed air needs to be at the highest temperature of the cycle at the inlet of the turbine (flowline 4). However, due to the imperfect regenerative process in the regenerator 10 the temperature of the heated compressed air leaving the regenerator through the flowline 4 will always be lower than the temperature of the hot gas that enters the regenerator through the flowline 6. This can be remedied by one of the following three methods. The first remedial scheme is to make the turbine run in the over-combustion mode, meaning that a certain extra amount of fuel is combusted in the turbine so that the exhaust gas in the outlet of the turbine (flowline 6) has a higher temperature than the compressed air temperature at the inlet of the turbine (flowline 4). The second remedial scheme is to introduce an optional combustion chamber (not shown in FIG. 9) in the entry line 4 of the turbine, which combusts a certain extra amount of fuel, which increases the temperature of the compressed air to the highest temperature of the cycle before it enters the turbine. The third, the most fuel-efficient, remedial scheme is to use the waste-heat from the fuel cell to supplement the heat supply to the primary cycle similar to the second scheme explained above.

Further two variations can be obtained as follows. Depending on whether the fuel cell operating temperature is low-medium or high, the fuel cell waste-heat could be injected to the primary cycle either at the flowline 3 or at the flowline 4. Similar to the Illustrative Embodiment 5, this power scheme also can be powered by the liquid hydrogen fuel, thus saving a considerable amount of consumed power in the compression process.

Figure 10:
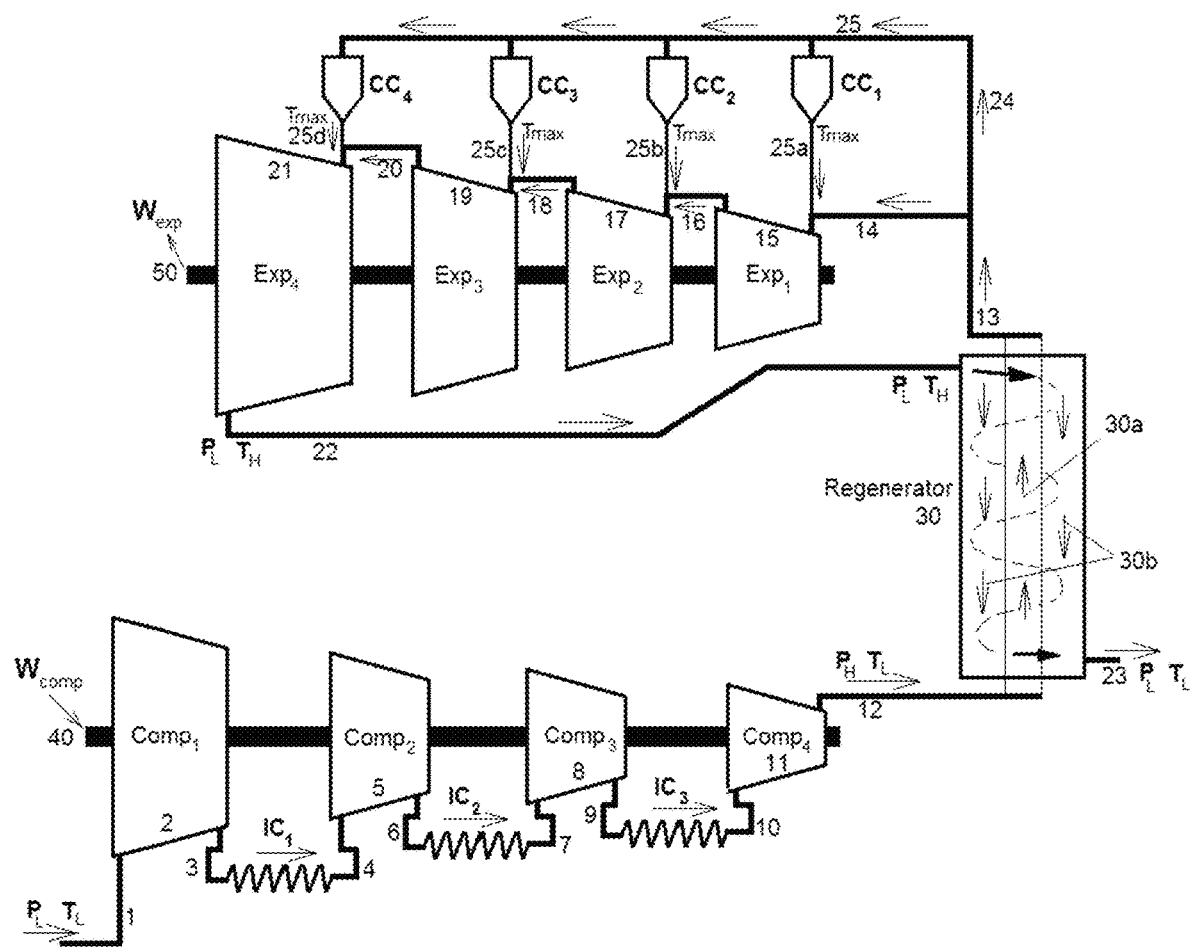
FIG. 10 is a schematic diagram of an Illustrative Embodiment of the invention based on hydrogen driven Brayton-Quasi-isoTT-PATMI (Config I) power scheme.

Illustrative Embodiment 7—Hydrogen Driven Brayton-Quasi-isoTT-PATMI (Config I) Power Scheme This Illustrative Embodiment is an implementation of the Config I version of the Brayton-Quasi-isoTT-PATMI shown in FIG. 10. In comparison to the Illustrative Embodiment 6 described previously, the following Brayton-isoTT cycle version is easier to implement practically, because in this Brayton-isoTT version implementation the combustion of a suitable fuel (such as hydrogen) occurs away from the turbine expander. Consequently, the design of the turbine can be done independent to the design of the combustion chambers.

One of the main features of this Illustrative Embodiment is that heating of the expanding working fluid in the turbine is achieved by injecting multiple streams of hot working fluid (at $T_m$ax in the range 1000-1200° C.) into the turbine at multiple stages of the expansion process, achieving an isothermal expansion that occurs at a near-constant moderate temperature in the range 400-600° C. These streams of hot working fluid are generated in multiple combustion chambers, which are fed with a suitable fuel (such as hydrogen) and streams of air extracted from the main stream of heated air flowing out of the regenerator. Similar to the PATMI configurations that have been described thus far, all the power-consuming components such as compressors, are driven by the power generated in a renewable energy field (not shown in FIG. 10).

Workings of the power scheme can be described as follows with reference to FIG. 10 which depicts only the thermodynamic cycle aspect of the power scheme. The power scheme extracts atmospheric air at condition ($P_L$, $T_L$) through the compressor inlet line 1 and compresses to a higher pressure $P_H$. The compression process is achieved through a series of compression stages; for example, FIG. 10 shows four compression stages. Atmospheric air enters the lowest pressure compression stage 2 ($comp_1$), gets compressed to a pressure set by the stage pressure ratio, and leaves the compression stage 2 through the outlet line 3. The air is directed to the first inter-cooler $IC_1$ in which the air is cooled to a certain degree. The cooled air then enters the second compression stage 5 through its inlet line 4. The compression process continues progressively when air passes through the remaining compression stages 5 ($comp_2$), 8 ($comp_3$), 11 ($comp_4$), entering through their individual inlet lines 4, 7, 10 and leaving through their individual outlet lines 6, 9, 12. In between the compression stages, the progressively compressed air is cooled as it passes through the inter-coolers $IC_2$, $IC_3$ placed between outlet/inlet lines of the compression stages, 6/7, 9/10, respectively. Although this Illustrative Embodiment is shown with four compression stages in FIG. 10, in reality the optimal number of compression stages must be determined to minimize the total power consumption by compression stages. Further, all the compression stages are driven by the power generated from a renewable energy field (not shown in FIG. 10), which is independent of the main power grid.

Eventually the compressed air, now at its highest pressure $P_H$ (while its temperature is still relatively low due to intercooling, but above $T_L$), enters the low-temperature flow passages 30a of the regenerator 30.

The regenerator 30 is a heat exchanger device, which comprises of low-temperature flow passages 30a and high-temperature flow passages 30b running approximately in parallel, but in counter-flow directions, facilitates highly effective heat transfer from the high-temperature fluid stream 30b to the low-temperature fluid stream 30a. The compressed air enters the low-temperature flow passages 30a through the compressor outlet line 12 and is heated to higher temperature by the high-temperature working fluid stream, which flows in the high-temperature flow passages 30b. Eventually, the heated compressed air exits the regenerator through the flowline 13.

The high-pressure air, which flows in the flowline 13, is separated into two streams 14 and 24, where the first separated major portion of the air flows through the flowline 14 towards the high-pressure expansion stage 15, while the second separated minor portion of the stream is directed through the flowline 24 to the combustion chamber feedline 25. The objective here is to combust a suitable fuel (such as hydrogen) with a metered portion of air extracted from feedline 25 inside each combustion chamber $CC_1$ through $CC_4$. The resulting hot combustion products (900-1000° C.) streams are then injected into the inlet line of the expansion stages so that the major stream of air that enters into each expansion stage is heated to the highest temperature $T_H$ of the cycle, prior to commencing the expansion process.

For example, referring to the expansion stage 15, a hot air stream is generated in the combustion chamber $CC_1$ by igniting the fuel (hydrogen) with a metered portion of the compressed air extracted from the feedline 25, and the generated hot gas stream 25a is injected to the main air stream 14, thus heating the main air stream 14 to the highest temperature of the cycle $T_H$ prior to entering the expansion stage 15.

Similarly, the hot air/fuel streams 25b, 25c, 25d generated in the combustion chambers $CC_2$, $CC_3$, $CC_4$ respectively feed the main gas streams 16, 18, 20, respectively, prior to entering the expansion stages 17, 19, 21, thereby approximating the expansion process to an isothermal expansion. As shown in FIG. 10, all the expansion stages are mounted on a single shaft, and the common shaft 50 delivers the power harnessed from all expansion stages to drive the AC-electric generators (not shown in FIG. 10).

The working fluid air mixed with combustion products, having passed through all the expansion stages, attain a pressure very close to the lowest pressure $P_L$ of the cycle. It then, exits the final turbine stage 21 through its outlet line 22, and enters the high-temperature flow passages 30b of the regenerator 30. Eventually, the exhaust gas stream 22, having passed through the high-temperature flow passages 30b and rejecting its useful heat, leaves the regenerator 30 through the high-temperature flow passage outlet line 23. This completes the cycle.

Based on the ideas presented in describing the previous embodiments, a number of design variances can be proposed here. For example, similar to the Illustrative Embodiment 5, this power scheme also can be powered by the liquid hydrogen fuel, thus saving a considerable amount of consumed power in the compression process. If fuel cells are used in the renewable energy field (not shown in FIG. 10) to power the compressor stages, the waste heat of the fuel cell can be fed to the cycle at a suitable location to augment the thermal feed of this embodiment.

Illustrative Embodiment 8—Hydrogen Driven Brayton-Quasi-isoTT-PATMI (Config II) Power Scheme One drawback of the Illustrative Embodiment 7 described above is that it uses a single high-pressure stream of air (24 of FIG. 10) to feed all the combustion chambers to generate individual hot air streams, which are in turn injected to the turbine at progressively reducing pressure stages. This causes an energy waste in the compression process as all the working fluid running through the turbine is compressed to the highest pressure in the cycle, despite that much of the hot gas is injected into the expanding gas stream at much lower pressures (flow lines 25b, 25c, 25d in FIG. 10). The Illustrative Embodiment 8 is disclosed to remedy this drawback of the previous configuration, saving some of the power consumed in the compression process.

Figure 11:
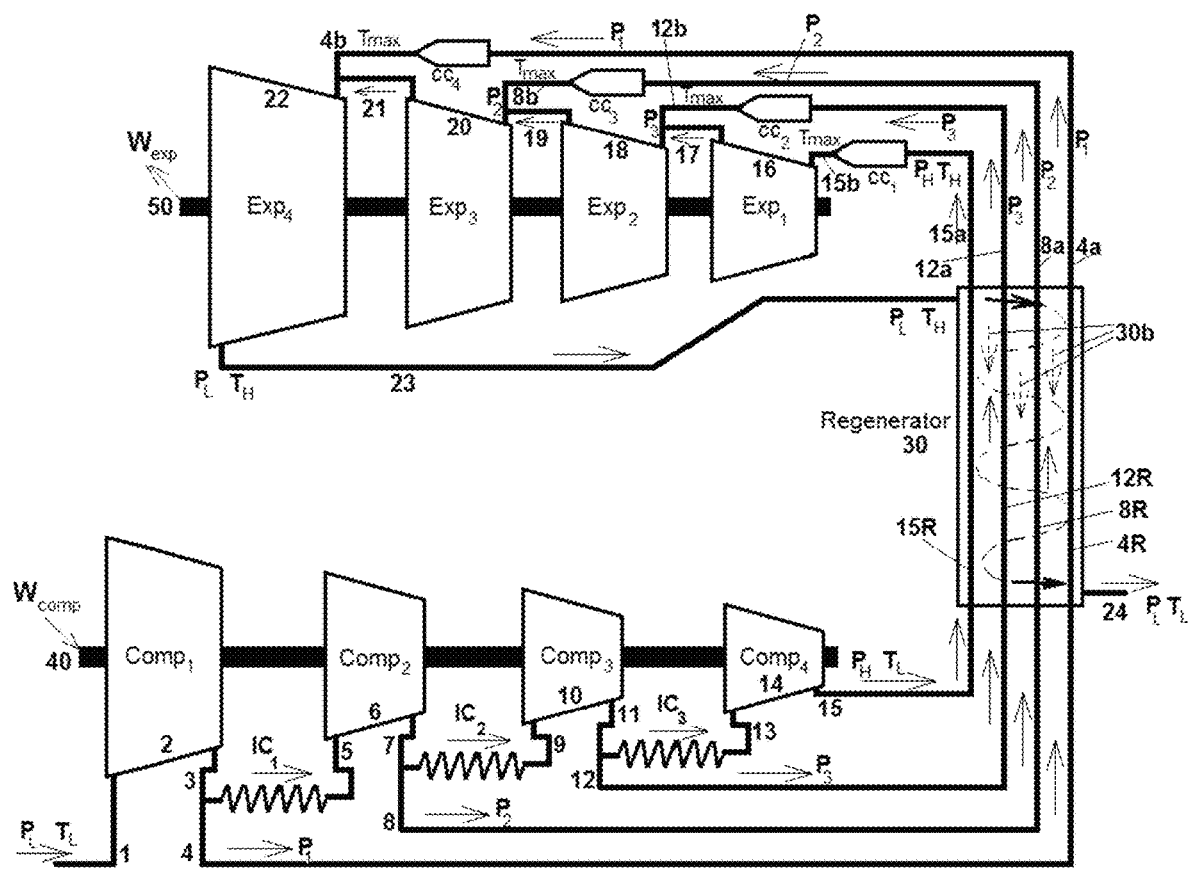
FIG. 11 is a schematic diagram of an Illustrative Embodiment of the invention based on hydrogen driven Brayton-Quasi-isoTT-PATMI (Config II) power scheme.

The improved implementation of the Config II version of the Brayton-Quasi-isoTT-PATMI is shown in FIG. 11. Similar to the Illustrative Embodiment 7, this Brayton-isoTT version is easier to implement practically, since the combustion of a suitable fuel (such as hydrogen) occurs away from the turbine expander. As a result, the turbine can be designed independently without paying any consideration to the design of the combustion chambers and the combustion process.

One of the main features of this Illustrative Embodiment is that heating of the expanding working fluid in the turbine is achieved by injecting multiple streams of hot working fluid (at $T_{max}$ 1000-1200° C.) into the turbine at multiple stages of the expansion process, achieving an approximate isothermal expansion process that occurs at a near-constant moderate temperature in the range 400-600° C. However, unlike the Illustrative embodiment 7 where these streams of hot working fluid are generated from a single air stream at the highest pressure of the cycle, this Illustrative Embodiment teaches how each of the fuel injecting air streams are extracted directly from the compression stages at suitable pressure levels. Similar to the PATMI configurations described thus far, all the power consuming components such as compressor stages are driven by the power generated in a renewable energy field (not shown in FIG. 11). As a result, the total power generated by the turbine stages is delivered to the AC-electricity generators.

The workings of the power scheme can be described as follows with reference to FIG. 11, which depicts only the thermodynamic cycle aspect of the power scheme. The power scheme extracts atmospheric air at condition ($P_L$, $T_L$) through the compressor inlet line 1 and compresses to a higher pressure $P_H$. The compression process is achieved through a series of compression stages as shown in FIG. 11. Although this Illustrative Embodiment is shown with four compression stages as an example, in reality the optimal number of compression stages is determined to minimize the total power consumption by all the compression stages. Atmospheric air enters the lowest pressure compression stage 2 ($comp_1$), gets compressed to a pressure set by the stage pressure ratio, and leaves the compression stage 2 through the outlet flowline 3, which separates the stream into two streams. Out of the two separated streams, the first major portion of air passes through the first inter-cooler $IC_1$, while the second minor portion of air is diverted to the flowline 4. The major stream of air then enters the second compression stage 6 through its inlet line 5, while the minor stream of air stream 4 passes through the first set of low-temperature flow passages 4R of the regenerator 30. The compression process continues progressively when air passes through the remaining compression stages 6 ($comp_2$), 10 ($comp_3$), 14 ($comp_4$), entering through their individual inlet flowlines 5, 9, 13 and leaving through their individual outlet flowlines 7, 11, 15.

After the intermediary compression stages 6 and 10, the compressed air output streams are individually divided into two streams, out of which the first major portions are cooled as they pass through the inter-coolers $IC_2$, $IC_3$, while the second minor portions are diverted through the flowlines 8 and 12 to a second and a third sets of low-temperature flow passages 8R and 12R in the regenerator 30. The compression process is concluded when the air in the flowline 13 passes through the final compression stage 14, which delivers its full compressed air output through the flowline 15 to the fourth set of low-temperature flow passages 15R in the regenerator 30.

The regenerator 30 in this Illustrative Embodiment is a heat exchanger device, which comprises of a number (in this case four) of low-temperature flow passages 4R, 8R, 12R, 15R, and a single set of high-temperature flow passages 30b running approximately in parallel, but in counter-flow directions, facilitates highly effective heat transfer from the high-temperature fluid stream 30b to the low-temperature fluid streams 4R, 8R, 12R, 15R. The regeneration process occurs when the compressed air streams 4, 8, 12, 15, which are at their individual pressures (while its temperature is still relatively low due to intercooling, but above $T_L$), flow through their individual set of low-temperature flow passages 4R, 8R, 12R, and 15R and are heated to a higher temperature by the high-temperature fluid stream that flows in the high-temperature flow passages 30b.

The high-pressure air streams which exit from the regenerator through the flowline 4a, 8a, 12a, 15a, are fed into the individual combustion chamber $CC_4$, $CC_3$, $CC_2$, $CC_1$ respectively, where metered amounts of suitable fuel (such as hydrogen) are ignited and burned to form four streams of hot gases 4b, 8b, 12b, 15b. The resulting hot gas streams are then injected to the main gas streams which pass from the consecutive higher-pressure turbine stage to the next lower-pressure turbine stage. For example, the hot gas stream 4b is injected into the gas stream 21, which flows from the turbine stage 20 to 22. Similarly, the hot gas stream 8b and 12b are injected into the gas streams 19 and 17 respectively, which flow from the turbine stage 18 to the turbine stage 20 and from 16 to 18 respectively. The only exception is that the turbine expansion stage 16, which operates at the highest pressure, is fed directly by the hot gas stream 15b generated from the combustion chamber $CC_1$ and there is no other stream to mix with it. This scheme of progressive mixing of the hot gas streams generated by the combustion chambers with the gas streams flowing in between the turbine stages at approximately equal pressures seems to effectively mimic the isothermal expansion process.

The working fluid air mixed with combustion products, having passed through all the expansion stages, attaining a pressure very close to the lowest pressure of the cycle $P_L$, exits the final turbine stage 22 through its outlet line 23 and enters the high-temperature flow passages 30b of the regenerator 30. Eventually, the exhaust gas stream 23, having passed through the high-temperature flow passages 30b leaves the regenerator 30 through the high-temperature flow passage outlet flowline 24.

Further, as shown in FIG. 11, all the compression stages in this Illustrative Embodiment are driven by the power generated from a renewable energy field (not shown in FIG. 11), which is independent of the main power grid. As a result, all the power generated in the expansion stages can be used to drive the AC-electric generators and supply the main power grid.

Similar to the Illustrative Embodiment 7, this power scheme also could have a number of design variances. For example, similar to the Illustrative Embodiment 5, it can be powered by the liquid hydrogen fuel, saving the consumed power in the compression process. Further, if fuel cells are used in the renewable energy field (not shown in FIG. 11) to power the compressor stages, the waste heat liberated in the fuel cells can be fed to the cycle at a suitable location to augment the thermal feed of this embodiment.

Illustrative Embodiment 9—sCO$_2$-PATMI Schemes for Bottoming Cycle Applications Under the Illustrative Embodiment 3, 4(a), and 4(b) the use of a bottoming cycle to recover the waste heat of the main power cycle was discussed and the possible use of the supercritical-CO$_2$ (sCO$_2$) cycle schemes was mentioned in this context. In this section, a number of sCO$_2$ schemes are described in detail to demonstrate how they may be converted to PATMI configurations to improve their efficiencies.

Carbon dioxide gas (CO$_2$) is detrimental to the environment, and its release into the atmosphere should be prevented at all cost. Nevertheless, CO$_2$ has tremendous advantages as a power-cycle working fluid, especially when it is used in the supercritical state. However, there is a caveat; the CO$_2$ power cycles, being closed cycles, require an additional cooling heat exchanger to cool the working fluid before recycling back to the main compressor.

Illustrative Embodiment 9(a)—sCO$_2$-PATMI Basic Power Scheme

Figure 12A:
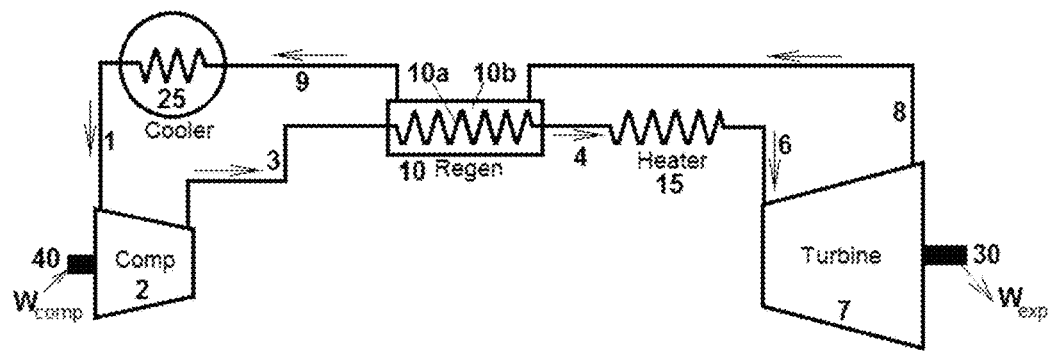
FIG. 12(a) is a schematic diagram of an Illustrative Embodiment of the invention based on $sCO_2$-PATMI basic regeneration scheme.
Figure 12B:
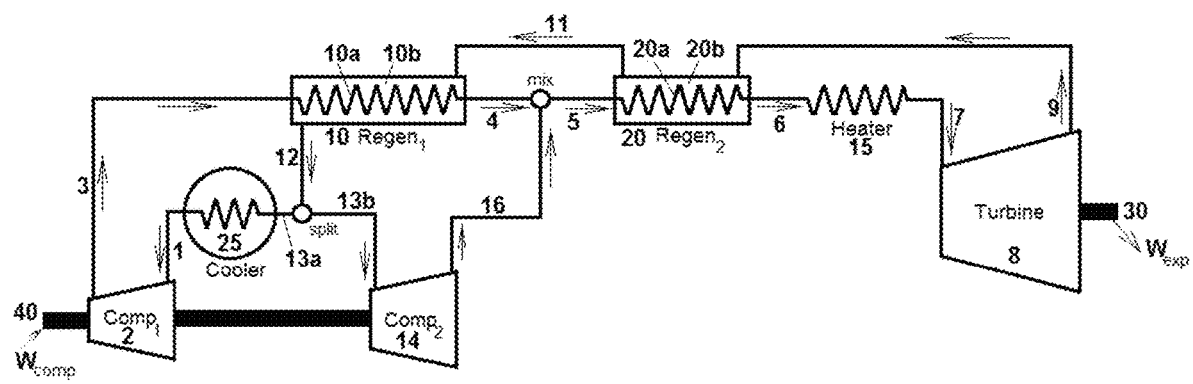
FIG. 12(b) is a schematic diagram of an Illustrative Embodiment of the invention based on $sCO_2$-PATMI split-flow recompression scheme.
Figure 12C:
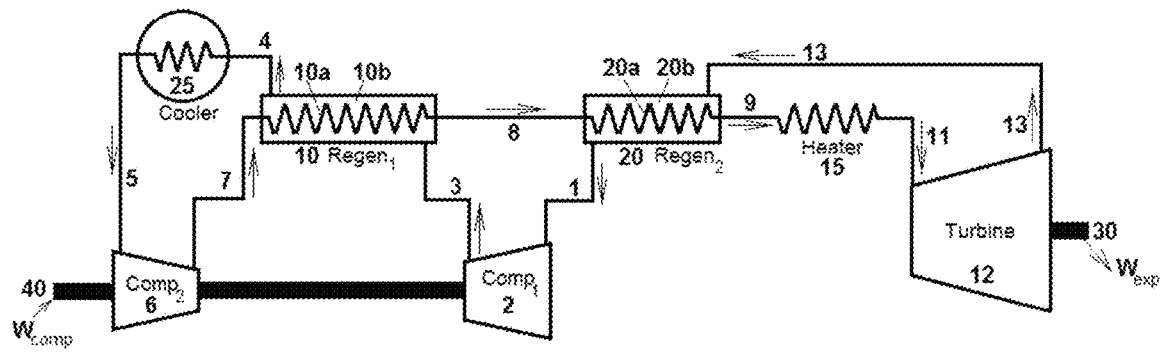
FIG. 12(c) is a schematic diagram of an Illustrative Embodiment of the invention based on $sCO_2$-PATMI partial compression regeneration scheme.
Figure 12D:
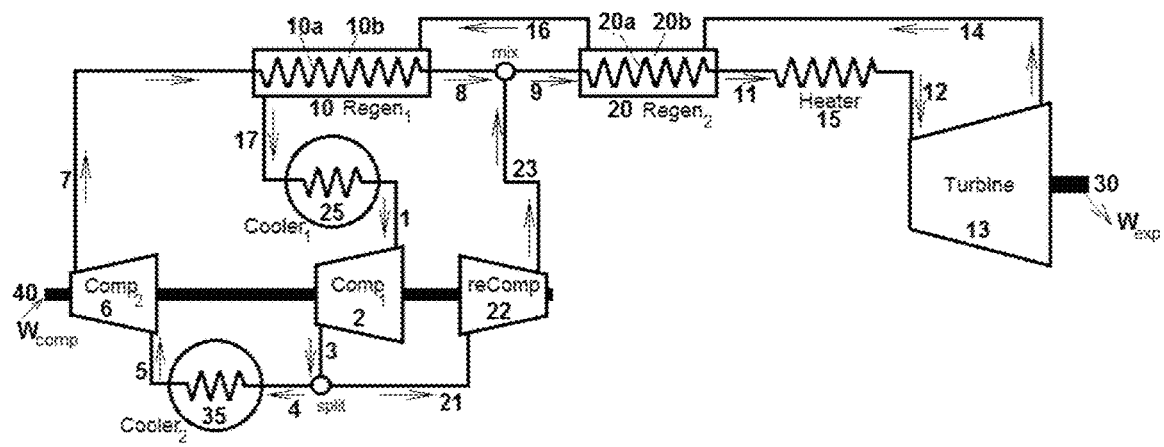
FIG. 12(d) is a schematic diagram of an Illustrative Embodiment of the invention based on $sCO_2$-PATMI partial cooling recompression scheme.

The basic supercritical-CO$_2$ (sCO$_2$) cycle, which is shown in FIG. 12(a) comprises of a compressor 2; a turbine 7; a heat exchanger 15 to heat the working fluid from the waste-heat source; a heat exchanger 25 to cool the working fluid either by ambient air or a liquid coolant such as water; and an optional heat exchanger 10 to regenerate a portion of the heat that otherwise would have been wasted.

The workings of the basic cycle are described as follows in reference to FIG. 12(a). The working fluid exists at its lowest pressure and the lowest temperature of the cycles in the flowline 1. The compressor 2 extracts the working fluid from the flowline 1, compresses the working fluid to the highest pressure of the cycle, and delivers the working fluid to the compressor delivery line 3. The working fluid flows along the flowline 3 to the low-temperature flow passages 10a of the regenerator 10, where the pressurized fluid is heated to a certain degree.

The regenerator 10, in effect a heat exchanger device, which comprises of low-temperature flow passages 10a and high-temperature flow passages 10b running approximately in parallel, but in counter-flow directions, facilitates highly effective heat transfer from the high-temperature fluid stream 10b to the low-temperature fluid stream 10a.

The heated working fluid leaves the regenerator 10 through the flowline 4 to the main waste-heat exchanger 15 where the fluid is heated to the highest temperature of the cycle. The working fluid, which is now at its highest pressure and the highest temperature of the cycle, enters the turbine 7 through the turbine inlet flowline 6. In the turbine 7, the working fluid expands while the turbine rotors harness the mechanical power from the expanding working fluid, and the generated power is delivered through the turbine shaft 30 to drive the AC-electric generators (not shown in FIG. 12(a)).

The expanded working fluid, now at its lowest pressure, exits the turbine through the flowline 8 and enters the high-temperature flow passages 10b of the regenerator 10. In the regenerator 10 the working fluid rejects heat thus lowering its temperature to a certain degree, and exits the regenerator through the flowline 9. The working fluid flows through the flowline 9 to the cooling heat exchanger 25 to be cooled to the lowest temperature of the cycle. Eventually, the cooled working fluid, now at its lowest pressure and its lowest temperature leaves the cooling heat exchanger through the flowline 1, thus completing the cycle.

In this PATMI power scheme, the compressor is driven by the power generated in a renewable energy field, such as solar PV, wind turbines, and/or power generated by fuel cell technology. Consequently, the total power generated in the turbine 7 is used to drive the AC-electric generators to supply power to the main power grid. Further, if there are fuel cells in the renewable energy field, which provide DC-electric power, a portion of the fuel cells' waste heat can supplement the thermal feed of the $sCO_2$ power scheme.

Despite its simplicity, the basic $sCO_2$ cycle is not a highly efficient power cycle. Therefore, various flow schemes, some of which with added complexity, are used to increase the efficiency of the $sCO_2$ power cycle. The next few sections describe some of these more complex $sCO_2$ based power schemes, while demonstrating how they could adopt the PATMI technology to improve their operating efficiencies.

Illustrative Embodiment 9(b)—$sCO_2$-PATMI Split-Flow Recompression Scheme

This Illustrative Embodiment for an $sCO_2$-PATMI power scheme, which comprises of two compressor stages in parallel, a single turbine, and two-stage regeneration, is commonly known as the Split-Flow Recompression Scheme. The workings of this particular $sCO_2$ scheme can be described as follows in reference to FIG. 12(*b*). The main compressor 2 ($Comp_1$) extracts the cooled working fluid ($CO_2$ in supercritical state) through the main compressor feedline 1, compresses the working fluid to the highest pressure of the cycle, and delivers the compressed working fluid to the flowline 3. The working fluid flows along the flowline 3 to the first low-temperature regenerator 10, and then along the flowline 4 to the second high-temperature regenerator 20.

The regenerator 10 (and 20), in effect a heat exchanger device, which comprises a set of low-temperature flow passages 10*a* (and 20*a*) and a set of high-temperature flow passages 10*b* (and 20*b*) running approximately in parallel, but in counter-flow directions, facilitates highly effective heat transfer from the high-temperature fluid stream 10*b* (and 20*b*) to the low-temperature fluid stream 10*a* (and 20*a*).

The compressed working fluid, which enters the low-temperature flow passages 10*a* of the regenerator 10, is heated to a certain high temperature by the high-temperature fluid stream, which flows in the high-temperature flow passages 10*b*. The heated compressed working fluid exits the regenerator 10 through the flowline 4. The compressed working fluid that flows in the flowline 4, mixes with the recompressed working fluid which flows along the flowline 16, and the mixed stream flows along the flowline 5 to the high-temperature regenerator 20. The working fluid, which enters the low-temperature flow passages 20*a* of the regenerator 20, is further heated by the high-temperature stream which flows in the high-temperature flow passages 20*b*. The heated fluid stream exits the flow passages 20*a* through the flowline 6.

The flowline 6 delivers the pressurized working fluid, now heated to a higher degree, to the main waste-heat exchanger 15, where the working fluid is heated to the highest temperature of the cycle. The heated working fluid flows to the turbine 8 through the flowline 7. In the turbine the working fluid expands to the lowest pressure of the cycle, allowing the turbine rotors to harness the mechanical power of the expanding working fluid. Eventually, the mechanical power harnessed in the turbine is delivered through its shaft 30 to drive the AC-electric generators (not shown in FIG. 12(*b*)), and the expanded working fluid leaves the turbine through the flowline 9.

The flowline 9 delivers the low-pressure working fluid to the high-temperature flow passages 20*b* of the high-temperature regenerator 20, where the working fluid is cooled as it rejects heat to the flow passages 20*a*. The cooled working fluid leaves the high-temperature regenerator through the flowline 11. The flowline 11 delivers the low-pressure working fluid to the high-temperature flow passages 10*b* of the low-temperature regenerator 10, where the working fluid is further cooled. The working fluid, now at a moderate-to-low temperature, leaves the low-temperature regenerator through the flowline 12. The fluid stream 12 is then split into two separate streams, and the first split stream flows through the flowline 13*a* to the cooling heat exchanger 25, while the second split stream flows through the flowline 13*b* to the compressor 14 for recompression.

In the cooling heat exchanger 25, the fluid stream 13*a* is cooled to the lowest temperature of the cycle and so cooled fluid stream leaves cooling heat exchanger through the main compressor feedline 1. The fluid stream, which flows in the flowline 13*b* is recompressed to the maximum pressure, while the temperature of the fluid stream also is raised to a certain degree. Eventually, the compressed fluid stream is delivered to the flowline 16, to complete the cycle.

Similar to the other PATMI power schemes described previously, the compressors in this Illustrative Embodiment are driven by the DC-electric power generated by a renewable energy field which may also include fuel cells. Consequently, the total power generated by the turbine drives the AC-electric generators to supply power to the main power grid. Further, if there are fuel cells in the renewable energy field, which provide DC-electric power, a portion of the waste heat from the fuel cells can augment the thermal feed of the $sCO_2$ scheme.

Illustrative Embodiment 9(c)—$sCO_2$-PATMI Partial Compression Regeneration Scheme This Illustrative Embodiment for an $sCO_2$-PATMI power scheme, which comprises of two compressors in series, a single turbine, and two-stage regeneration, is commonly known as the Partial Compression Regeneration scheme. The workings of this particular $sCO_2$ scheme can be described as follows in reference to FIG. 12(*c*). The low-pressure compressor 2 ($Comp_1$) extracts the working fluid, which is at its lowest pressure of the cycle through the flowline 1, compresses the working fluid to a suitable intermediate pressure for the cycle, and delivers the partially compressed working fluid to the flowline 3. The partially compressed working fluid flows along the flowline 3 to the first low-temperature regenerator 10.

The regenerator 10 (and 20), in essence a heat exchanger device, which comprises a set of low-temperature flow passages 10*a* (and 20*a*) and a set of high-temperature flow passages 10*b* (and 20*b*) running approximately in parallel, but in counter-flow directions, facilitates highly effective heat transfer from the high-temperature fluid stream 10*b* (and 20*b*) to the low-temperature fluid stream 10*a* (and 20*a*).

The partially compressed working fluid flows through the high-temperature flow passages 10*b* of the regenerator 10 and conveys heat to the low-temperature passages 10*a* of the regenerator. The partially compressed fluid stream, which is now cooled to a certain degree, leaves the regenerator flow passages 10*b* through the flowline 4, and flows to the cooling heat exchanger 25. The cooling heat exchanger 25 cools the partially compressed working fluid to the lowest temperature of the cycle and delivers the working fluid to the second compressor stage 6 (Comp$_2$) through the compressor feedline 5. The second compressor 6 compresses the working fluid to the highest pressure of the cycle and delivers to the compressor outlet line 7, which conveys the working fluid to the low-temperature flow passages 10*a* of the regenerator 10.

The high-pressure working fluid stream, which flows in the low-temperature flow passages 10*a* of the regenerator 10, is heated to a certain degree by the high-temperature fluid stream that flows in the high-temperature flow passages 10*b*. The heated working fluid leaves the regenerator 10 through the flowline 8 and enters the low-temperature flow passages 20*a* of the regenerator 20, where it is further heated by the high-temperature stream which flows in the high-temperature flow passages 20*b*.

The high-pressure working fluid leaves the low-temperature flow passages 20*a* of the regenerator 20 through the flowline 9 and enters the main waste-heat exchanger 15, where the working fluid is heated to the highest temperature of the cycle. The working fluid, now at the highest pressure and the temperature of the cycle, flows through the flowline 11 to the turbine stage 12, where it expands to the lowest pressure of the cycle enabling the turbine rotors to harness the mechanical power.

Eventually, the mechanical power harnessed in the turbine is delivered through the turbine shaft 30 to drive the AC-electric generators (not shown in FIG. 12(*c*)), while the expanded working fluid leaves the turbine through the flowline 13. The flowline 13 delivers the low-pressure working fluid through the high-temperature flow passages 20*b* of the high-temperature regenerator 20 enabling the working fluid to cool to a certain degree. The cooled fluid stream leaves the regenerator 20 through the flowline 1 to be compressed by the compressor 2, thus completing the cycle.

Similar to the other PATMI power schemes described previously, the compressors in this Illustrative Embodiment are driven by the DC-electric power generated by a renewable energy field which may also include fuel cells. Consequently, the total power generated by the turbine is used to drive the AC-electric generators to supply power to the main power grid. Further, if there are fuel cells in the renewable energy field, which provide DC-electric power, a portion of the waste heat from the fuel cells can augment the thermal feed of the sCO$_2$ scheme.

Illustrative Embodiment 9(d)—sCO$_2$-PATMI Partial Cooling Recompression Scheme

This Illustrative Embodiment for an sCO$_2$-PATMI power scheme, which comprises of three compressors, a single turbine, two-stage cooling, and two-stage regeneration, is commonly known as the Partial Cooling Recompression scheme. The scheme differs from the previously described schemes as it comprises of three compressors and two cooling stages. The scheme is devised by placing the two high-pressure compressor stages in parallel while the single low-pressure compression stage in series relative to the high-pressure compressor stages.

The workings of this particular sCO$_2$ scheme are described as follows in reference to FIG. 12(*d*). The first stage cooling heat exchanger 25 delivers the working fluid, which is at the lowest pressure and lowest temperature of the cycle, to the main compressor stage 2 through the main compressor feedline 1. The main compressor stage 2 compresses the working fluid to a suitable intermediate pressure for the cycle and delivers to the flowline 3. The working fluid stream 3 is then split into two separate parallel streams, where the first split stream 4 enters the second stage cooling heat exchanger 35 to be further cooled, while the second split stream 21 enters the recompression stage 22 to be compressed to the highest pressure of the cycle. The second split stream, having gone through the recompression process, eventually flows through the flowline 23 to be mixed with the first split stream.

The first split stream, which is cooled by the second stage cooling heat exchanger 35, enters the second compressor stage 6 (Comp$_2$) through its feedline 5, and is compressed to the highest pressure of the cycle. The fluid stream, now at the highest pressure of the cycle, flows through the compressor delivery line 7 to the low-temperature regenerator 10.

The regenerator 10 (and the regenerator 20), in effect a heat exchanger device, which comprises a set of low-temperature flow passages 10*a* (and 20*a*) and a set of high-temperature flow passages 10*b* (and 20*b*) running approximately in parallel, but in counter-flow directions, facilitates highly effective heat transfer from the high-temperature fluid stream 10*b* (and 20*b*) to the low-temperature fluid stream 10*a* (and 20*a*).

The compressed first split fluid stream, which enters the low-temperature flow passages 10*a* of the regenerator 10, is heated to a certain higher temperature by the high-temperature fluid stream, which flows in the high-temperature flow passages 10*b*. The heated working fluid exits the regenerator 10 through the flowline 8. The two split streams, which emerge through the flowlines 8 and 23, now at the highest pressure of the cycle, mix together and the mixed stream flows along the flowline 9 to the high-temperature regenerator 20. The mixed stream of working fluid, which flows in the low-temperature flow passages 20*a*, is further heated by the high-temperature stream that flows in the high-temperature flow passages 20*b*. The heated fluid stream exits the flow passages 20*a* through the flowline 11.

The flowline 11 delivers the pressurized working fluid, now heated to a higher degree, to the main waste-heat exchanger 15, where it is heated to the highest temperature of the cycle. The working fluid, now at the highest temperature of the cycle, flows through the flowline 12 to the turbine stage 13, where it expands to the lowest pressure of the cycle, enabling the turbine rotors to harness the mechanical power from the expanding working fluid. The mechanical power harnessed in the turbine is delivered through the shaft 30 to drive the AC-electric generators, while the expanded working fluid leaves the turbine through the flowline 14.

The flowline 14 delivers the low-pressure working fluid to the high-temperature regenerator 20, where the working fluid rejects heat flowing through the high-temperature flow passages 20*b* of the regenerator. The working fluid, having cooled in the regenerator 20, leaves the high-temperature flow passages 20*b* through the flowline 16. The flowline 16 delivers the low-pressure working fluid to the high-temperature flow passages 10*b* of the low-temperature regenerator 10, and the working fluid stream is further cooled. Eventually, the working fluid leaves the flow passages 10*b* through the flowline 17. The cycle is completed when the fluid stream 17 enters the first-stage cooling heat exchanger 25 to be cooled to the lowest temperature of the cycle.

Similar to the other PATMI power schemes described previously, the three compressors in this Illustrative Embodiment are driven by the DC-electric power generated by a renewable energy field, which may also include fuel cells. Consequently, the total power generated by the turbine is used to drive the AC-electric generators to supply power to the main power grid. Further, if there are fuel cells in the renewable energy field, which provide DC-electric power, a portion of the waste heat from the fuel cells can augment the thermal feed of the $sCO_2$ scheme.

Illustrative Embodiment 9(e)—$sCO_2$-PATMI Two-Stage Compression and Two-Stage Heating Scheme This Illustrative Embodiment for an $sCO_2$-PATMI power scheme, which comprises of two compressors, two-stage cooling, two-stage heating, and single turbine is commonly known as the Two-stage Compression with Two-stage Heating scheme. This scheme differs from the previously described schemes as this scheme comprises of a low-temperature and a high-temperature heating stages.

Figure 12E:
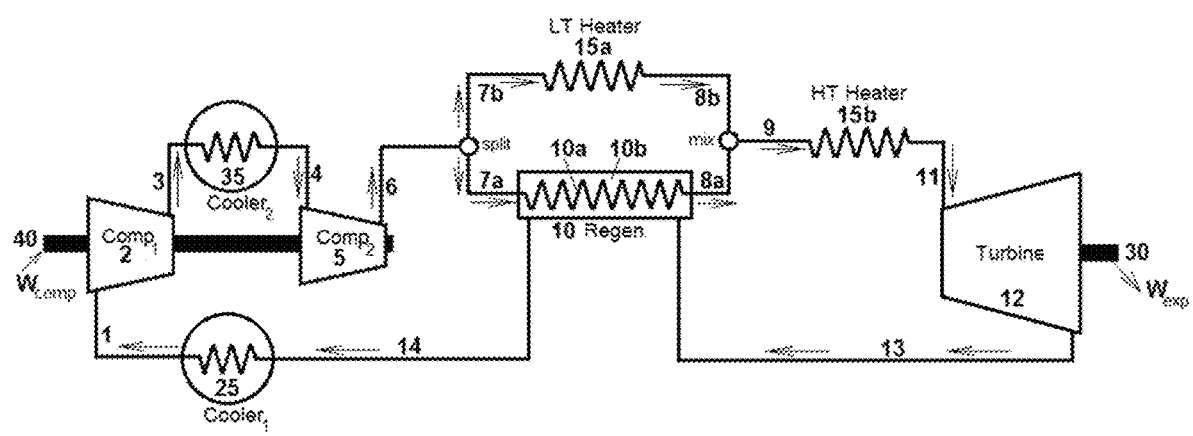
FIG. 12(e) is a schematic diagram of an Illustrative Embodiment of the invention based on $sCO_2$-PATMI two-stage compression and two-stage heating scheme.
Figure 12F:
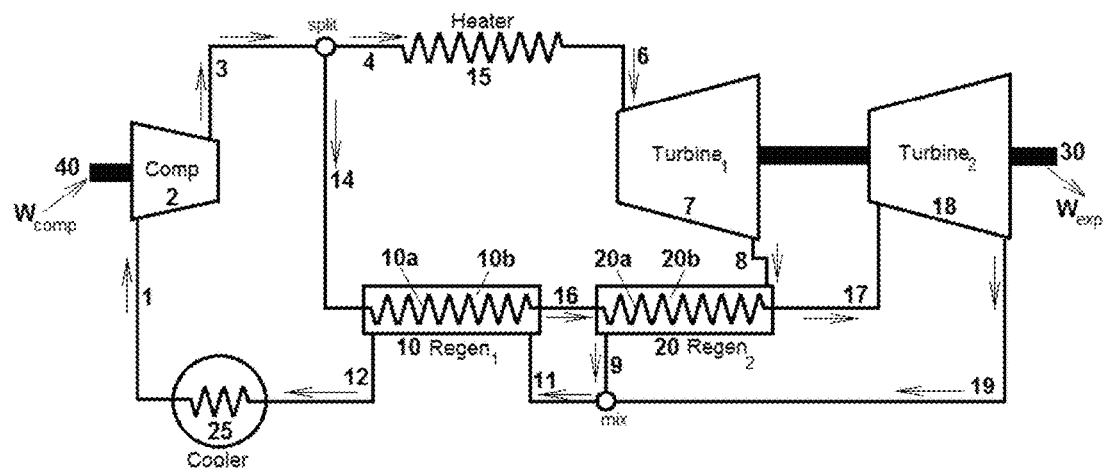
FIG. 12(f) is a schematic diagram of an Illustrative Embodiment of the invention based on $sCO_2$-PATMI two parallel turbines (Config I) scheme.
Figure 12G:
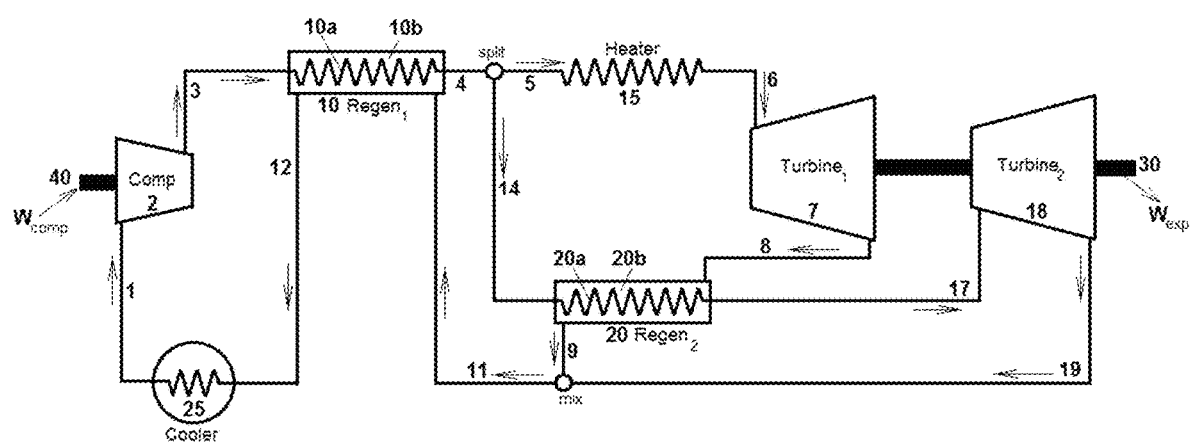
FIG. 12(g) is a schematic diagram of an Illustrative Embodiment of the invention based on $sCO_2$-PATMI two parallel turbines (Config II) scheme.

The workings of this particular $sCO_2$ scheme are described as follows in reference to FIG. 12(e). The first stage cooling heat exchanger 25 delivers the working fluid at the lowest pressure and the lowest temperature of the cycle, to the main compressor 2 ($Comp_1$) through the main compressor feedline 1. The main compressor 2 compresses the working fluid to a suitable intermediate pressure for the cycle, and delivers the compressed working fluid to the second stage cooling heat exchanger 35, which is in effect an intercooler, through the flowline 3. The working fluid, having cooled in the second cooling heat exchanger 35, flows through the flowline 4 and enters the second stage compressor 5 ($Comp_2$), where it is compressed to the highest pressure of the cycle. The second stage compressor 5 delivers the high-pressure working fluid to the flowline 6, which is then split into two separate parallel streams 7a and 7b. The first split stream 7a enters the low-temperature flow passages 10a in the regenerator 10 in the scheme, while the second split stream 7b enters the low-temperature waste-heat exchanger 15a to be heated to a certain high temperature. The second split stream, having gone through the low-temperature heating process, leaves the low-temperature waste-heat exchanger 15a through the flowline 8b.

The regenerator 10, in effect a heat exchanger device, which comprises a set of low-temperature flow passages 10a and a set of high-temperature flow passages 10b running approximately in parallel, but in counter-flow directions, facilitates highly effective heat transfer from the high-temperature fluid stream 10b to the low-temperature fluid stream 10a. The first split fluid stream 7a enters the low-temperature flow passages 10a of the regenerator 10 and is heated to a certain higher temperature by the high-temperature fluid stream, which flows in the high-temperature flow passages 10b of the regenerator. The heated compressed working fluid exits the flow passages 10a through the flowline 8a.

The two split streams, which emerge through the flowlines 8a and 8b, now at the highest pressure of the cycle and at a certain high temperature, undergo mixing, and the mixed stream flows along the flowline 9 to the main (high-temperature) waste-heat exchanger 15b. In the waste-heat exchange the working fluid is heated to the highest temperature of the cycle, and the heated working fluid flows to the turbine stage 12 through the flowline 11. In the turbine the working fluid expands to the lowest pressure of the cycle, enabling the turbine rotors to harness the mechanical power of the expanding working fluid. The mechanical power harnessed in the turbine is delivered through its shaft 30 to drive the AC-electric generators (not shown in FIG. 12(e)), while the expanded working fluid leaves the turbine through the flowline 13.

The flowline 13 delivers the low-pressure working fluid to the high-temperature flow passages 10b of the regenerator 10, where the fluid stream rejects heat and cools down. Eventually, working fluid leaves the flow passages 10b through the flowline 14. The cycle is completed when the fluid stream 14 enters the first-stage cooling heat exchanger 25 to be cooled to the lowest temperature of the cycle.

Similar to the other PATMI power schemes described previously, the three compressors in this Illustrative Embodiment are driven by the DC-electric power generated by a renewable energy field which may also include fuel cells. Consequently, the total power generated by the turbine is used to drive the AC-electric generators to supply power to the main power grid. Further, if there are fuel cells in the renewable energy field, which provide DC-electric power, a portion of the waste heat from the fuel cells can augment the thermal feed of the $sCO_2$ scheme.

Illustrative Embodiment 9(f)—$sCO_2$-PATMI Two Parallel Turbines (Config I) Scheme This Illustrative Embodiment for an $sCO_2$-PATMI power scheme is a configuration with two turbines in parallel. It comprises of a single compressor, two turbines placed in parallel, and two-stage regeneration, is commonly known as the Two Parallel Turbine scheme (Config I). The workings of this particular $sCO_2$ scheme can be described as follows in reference to FIG. 12(f). The compressor 2 (Comp) extracts the working fluid, which is at its lowest pressure and its lowest temperature of the cycle, through the flowline 1; compresses the working fluid to the highest pressure of the cycle; and delivers the compressed working fluid to the flowline 3. The flow stream 3 is then split into two separate parallel streams 4 and 14. The first split stream 4 enters the waste-heat exchanger 15 to be heated to the highest-temperature of the cycle, while the second split stream 14 is directed to the first-stage regenerator 10.

This scheme comprises of two regenerators 10 and 20 to rejuvenate the heat that otherwise would have wasted. The regenerator 10 (and 20) is in essence a heat exchanger device, which comprises a set of low-temperature flow passages 10a (and 20a) and a set of high-temperature flow passages 10b (and 20b) running approximately in parallel, but in counter-flow directions, so that the design facilitates highly effective heat transfer from the high-temperature fluid stream 10b (and 20b) to the low-temperature fluid stream 10a (and 20a).

The high-pressure working fluid, which flows in the flowline 14 enters the low-temperature flow passages 10a of the first-stage regenerator 10, and is heated to a certain degree by the high-temperature fluid stream which flows through the high-temperature flow passages 10b of the regenerator. The heated working fluid leaves the regenerator flow passages 10a through the flowline 16 and enters the low-temperature flow passages 20a of the second-stage high-temperature regenerator 20. The working fluid flows in the flow passages 20a is further heated by the high-temperature stream, which flows in the high-temperature flow passages 20b.

Eventually, the high-pressure working fluid leaves the flow passages 20a of the regenerator 20 through the flowline 17 and enters low-temperature turbine 18. In the turbine 18 the working fluid expands to the lowest pressure of the cycle, allowing the turbine rotors to harness the mechanical power of the expanding working fluid. The expanded working fluid, now at the lowest pressure of the cycle, leaves the turbine 18 through the turbine outlet line 19.

The first split stream 4, which is heated to the highest temperature of the cycle by the waste-heat exchanger 15, enters the high-temperature turbine 7 through the turbine feedline 6. In the turbine the working fluid expands to the lowest pressure of the cycle, enabling the turbine rotors to harness the mechanical power of the expanding working fluid. Eventually, the mechanical power harnessed by both turbines is delivered through their common shaft 30 to drive the AC-electric generators (not shown in FIG. 12(*f*)).

It is noteworthy that the output stream of the turbine 7 has a higher temperature than the temperature of the output stream of the turbine 18. The difference stems from the fact that the working fluid feed 6 to the turbine 7 is heated by the heat source, which in this case is the waste-heat from a high-temperature primary cycle, whereas the working fluid feed 17 of the turbine 18 is heated by the regenerator 20. Consequently, only the output stream of the turbine 7 is hot enough to regenerate heat in the high-temperature regenerator 20. Therefore, the hot output stream 8 of the turbine 7 flows through the high-temperature flow passages 20*b* of the regenerator 20, to regenerate heat to the flow stream 20*a*. The working fluid stream 20*b* leaves the regenerator 20 through the flowline 9 to merge with the other parallel stream 19.

The flow streams 9 and 19 are at the lowest pressure of the cycle and they also will be of similar low temperatures. The two working fluid streams are mixed, and the mixed stream 11 enters high-temperature flow passages 10*b* of the regenerator 10, which further regenerates heat to the high-pressure flow stream 10*a*. Eventually, the low-pressure working fluid stream leaves the regenerator 10 through the flowline 12 and enters the cooling heat exchanger 25. In the cooling heat exchanger 25 the working fluid is cooled to the lowest temperature of the cycle to be fed into the flowline 1. This completes the cycle.

Similar to the other PATMI power schemes described previously, the compressor in this Illustrative Embodiment is driven by the DC-electric power generated by a renewable energy field which may also include fuel cells. Consequently, the total power generated by the turbine is used to drive the AC-electric generators to supply power to the main power grid. Further, if there are fuel cells in the renewable energy field, which provide DC-electric power, a portion of the waste heat from the fuel cells can augment the thermal feed of the $sCO_2$ scheme.

Illustrative Embodiment 9(g)—$sCO_2$-PATMI Two Parallel Turbines (Config II) Scheme This Illustrative Embodiment for an $sCO_2$-PATMI power scheme is another configuration with two turbines in parallel. It comprises of a single compressor, two turbines placed in parallel, and two-stage regeneration, is commonly known as the Two Parallel Turbine scheme (Config II). The workings of this particular $sCO_2$ scheme can be described as follows in reference to FIG. 12(*g*). The compressor 2 (Comp) extracts the working fluid, which is at its lowest pressure and its lowest temperature of the cycle, through the flowline 1; compresses the working fluid to the highest pressure of the cycle; and delivers the compressed working fluid to the flowline 3. The flow stream 3 is directed to the first-stage regenerator 10.

This scheme comprises of two regenerators 10 and 20 to rejuvenate the heat otherwise would have wasted. The regenerator 10 (and 20) is in essence a heat exchanger device, which comprises a set of low-temperature flow passages 10*a* (and 20*a*) and a set of high-temperature flow passages 10*b* (and 20*b*) running approximately in parallel, but in counter-flow directions, so that the design facilitates highly effective heat transfer from the high-temperature fluid stream 10*b* (and 20*b*) to the low-temperature fluid stream 10*a* (and 20*a*).

The high-pressure working fluid, which flows in the flowline 3 enters the low-temperature flow passages 10*a* of the first-stage regenerator 10, and is heated to a certain degree by the high-temperature fluid stream which flows through the high-temperature flow passages 10*b* of the regenerator. The heated working fluid leaves the regenerator flow passages 10*a* through the flowline 4, which is then split into two separate parallel streams 5 and 14. The first split stream 5 enters the waste-heat exchanger 15 to be heated to the highest-temperature of the cycle, while the second split stream 14 is directed to the second-stage regenerator 20. The flow stream 14 enters the low-temperature flow passages 20*a* of the second-stage high-temperature regenerator 20. The working fluid is further heated by the high-temperature stream which flows in the high-temperature flow passages 20*b*.

Eventually, the high-pressure working fluid leaves the flow passages 20*a* of the regenerator 20 through the flowline 17 and enters low-temperature turbine 18. In the turbine 18 the working fluid expands to the lowest pressure of the cycle, allowing the turbine rotors to harness the mechanical power of the expanding working fluid. The expanded working fluid, now at the lowest pressure of the cycle, leaves the turbine 18 through the turbine outlet line 19.

The first split stream 4, which is heated to the highest temperature of the cycle by the waste-heat exchanger 15, enters the high-temperature turbine 7 through the turbine feedline 6. In the turbine the working fluid expands to the lowest pressure of the cycle, enabling the turbine rotors to harness the mechanical power of the expanding working fluid. Eventually, the mechanical power harnessed by both turbines is delivered through their common shaft 30 to drive the AC-electric generators (not shown in FIG. 12(*g*)).

It is noteworthy that the output stream of the turbine 7 has a higher temperature than the temperature of the output stream of the turbine 18. The difference stems from the fact that the working fluid feed 6 to the turbine 7 is heated by the heat source, which in this case is the waste-heat from a high-temperature primary cycle, whereas the working fluid feed 17 of the turbine 18 is heated by the regenerator 20. Consequently, only the output stream of the turbine 7 is hot enough to regenerate heat in the high-temperature regenerator 20. Therefore, the hot output stream 8 of the turbine 7 flows through the high-temperature flow passages 20*b* of the regenerator 20, to regenerate heat to the flow stream 20*a*. The working fluid stream 20*b* leaves the regenerator 20 through the flowline 9 to merge with the other parallel stream 19.

The flow streams 9 and 19 are at the lowest pressure of the cycle and they also will be of similar low temperatures. The two working fluid streams are mixed, and the mixed stream 11 enters high-temperature flow passages 10*b* of the regenerator 10, which further regenerates heat to the high-pressure flow stream 10*a*. Eventually, the low-pressure working fluid stream leaves the regenerator 10 through the flowline 12 and enters the cooling heat exchanger 25. In the cooling heat exchanger 25 the working fluid is cooled to the lowest temperature of the cycle to be fed into the flowline 1. This completes the cycle.

Similar to the other PATMI power schemes described previously, the compressor in this Illustrative Embodiment is driven by the DC-electric power generated by a renewable energy field which may also include fuel cells. Consequently, the total power generated by the turbine is used to drive the AC-electric generators to supply power to the main power grid. Further, if there are fuel cells in the renewable energy field, which provide DC-electric power, a portion of the waste heat from the fuel cells can augment the thermal feed of the $sCO_2$ scheme.

Illustrative Embodiment 10—PATMI Power Generation Scheme with a Fuel Cell Driven Combined Compressor/Generator and a Turbine Driven Generator Many Illustrative Embodiments presented thus far contained a fuel cell which generates DC electricity to operate the compressors. In some of these cases the fuel cell also provided a part of the heat required for the gas-turbine power cycle to operate. However, in the Illustrative Embodiments previously presented, the fuel cell is in essence depicted as a heat exchanger to transfer heat to the working fluid of the gas-turbine power cycle without being explicit as to how the fuel cell is fed with fuel and air. The Illustrative Embodiments 10 through 23 show how a fuel cell can be integrated to the gas-turbine power cycle so that the fuel cell operates at a pressure higher than the atmospheric pressure while the fuel cell consumes the high-pressure air supplied by the compressor(s) of the gas-turbine power cycle. In turn, the fuel cell provides the electricity to power the compressor(s) while it also expels a hot flue gas stream, and possibly a hot air stream to the gas-turbine power cycle, thus providing a part of the heat requirement of the gas-turbine power cycle.

Figure 13:
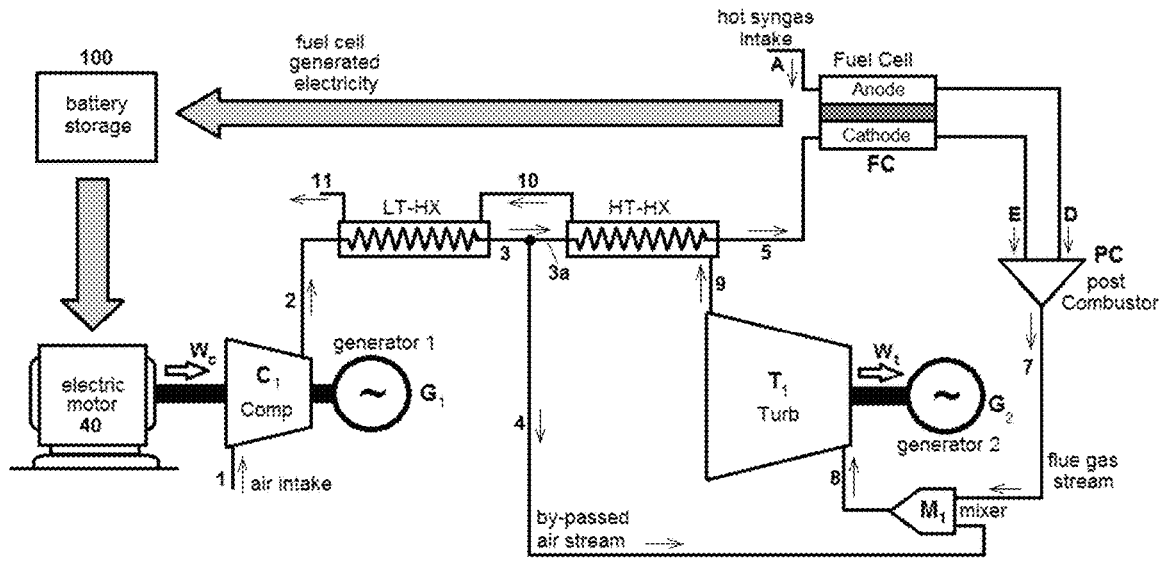
FIG. 13 is a schematic diagram of an Illustrative Embodiment of the invention based on PATMI power generation scheme with a fuel cell driven combined compressor/generator and a turbine driven generator.

FIG. 13 shows one of the basic Illustrative Embodiments where a single compressor, a single turbine, and a fuel cell can be integrated to form a single stage PATMI power scheme. Its workings can be described as follows. The compressor $C_1$ extracts atmospheric air from the air intake 1, compresses air to a higher pressure, and delivers the air stream to the high-pressure flow passage 2. The heat exchangers LT-HX and HT-HX which regenerate heat from the flue gas, operate in the low-temperature range and in the high-temperature range respectively. These devices are placed in series so that the compressed air stream is heated as it flows from the flow passage 2 to the flow passage 3 through the heat exchanger LT-HX and then flows from the flow passage 3a to the flow passage 5 through the heat exchanger HT-HX.

In this Illustrative Embodiment the fuel cell FC is possibly a high-temperature fuel cell such as the SOFC type, which can be powered with a variety of gaseous fuels including ammonia, syngas, natural gas, methane, or hydrogen. Here the focus is on a syngas powered SOFC fuel cell, as syngas neither requires reformation nor requires preheating since syngas is typically produced from an incineration process. The fuel cell FC consists of two electrodes (see FIG. 13); the cathode and the anode. While the anode is fed with the hot (600-800° C.) syngas as the fuel, through the flow passage A, the cathode is fed with hot (700-800° C.) compressed air from the heat exchanger HT-HX through the flow passage 5. The gaseous fuel and the oxygen in the compressed air react electrochemically within the high-temperature electrolyte (500-1,000° C.) of the fuel cell, and a portion of the fuel undergoes oxidation while the fuel cell produces electricity. As a result, hot partially oxidized fuel exits the anode through the flow passage D, while the hot compressed air with less oxygen exits the cathode through the flow passage E. The two streams D and E are mixed into a post-combustor PC, where the unreacted fuel completes the oxidation reaction, thereby producing a high-temperature flue gas stream, which exits the post-combustor PC through the flow passage 7. The temperature of the stream 7 depends on the fuel utilization factor of the fuel cell FC; the lower the fuel utilization in the fuel cell, the higher would be the temperature of the flue gas stream. For example, according to one published source[2], 30-50% fuel utilization can increase the mixed stream temperature to values as high as 1800-1350° C., whereas at 70-80% fuel utilization can lower the temperature to about 1080-850° C.

2. Fuel Utilization Effects On System Efficiency In SOFC-Gas Turbine Hybrid Systems; Oryshchyn, D., Harun, N. F., Tucker, D., Bryden, M. C., Shadle, L.; *Applied Energy* (2018), 228, 1953-1965

The bypassed compressed air stream 4 (so named since it bypasses the high-temperature heat exchanger HT-HX), which is extracted from the flow passage 3 will be at a certain temperature, somewhat higher than the temperature of the stream 2, but lower than that of the stream 5. The bypassed compressed air stream 4 and the hot flue gas stream 7 are fed into a static mixing device $M_1$, where the two streams mix and homogenize. The resulting mixed stream 8 is fed to the single turbine in the system $T_1$. The mixed stream 8 expands while flowing through the turbine $T_1$. As a result, the turbine rotors harness mechanical power, which is delivered through the turbine shaft. The turbine $T_1$ in turn drives the generator $G_2$, and the generator, possibly a synchronous type, delivers AC electricity to the main power grid. The expanded working fluid exits the turbine $T_1$ through the flow passage 9, and then it enters the high-temperature heat exchanger HT-HX to reject heat. The hot flue gas stream flows through the heat exchanger HT-HX rejecting heat, thereby heating the compressed air stream, which flows from flow passage 3a to flow passage 5. The flue gas stream then exits the high-temperature heat exchanger HT-HX through the flow passage 10, which directs the flue gas stream into the low-temperature heat exchanger LT-HX. The flue gas stream flows through the heat exchanger LT-HX rejecting heat further and eventually exits the heat exchanger LT-HX through the flow passage 11, which allows the flue gas stream to escape to the atmosphere, thereby dissipating the low-temperature heat content of the stream.

In par with the previous PATMI Illustrative Embodiments presented here, the compressor $C_1$ is driven by the electric motor 40, which in turn is powered by the electricity generated by the fuel cell FC. In a typical scenario, as shown in FIG. 13, the fuel cell is capable of producing electricity in excess of the electricity consumed by the compressor. Therefore, to harness the excess electricity produced by the fuel cell, a generator $G_1$, possibly an induction-type AC generator, is mounted on the same shaft of the compressor/motor combination as shown in FIG. 13. A battery bank 100 may be used to accommodate the imbalance of the fuel cell electric power supply and the power consumption of the electric motor which drives the compressor/generator combination.

Figure 14:
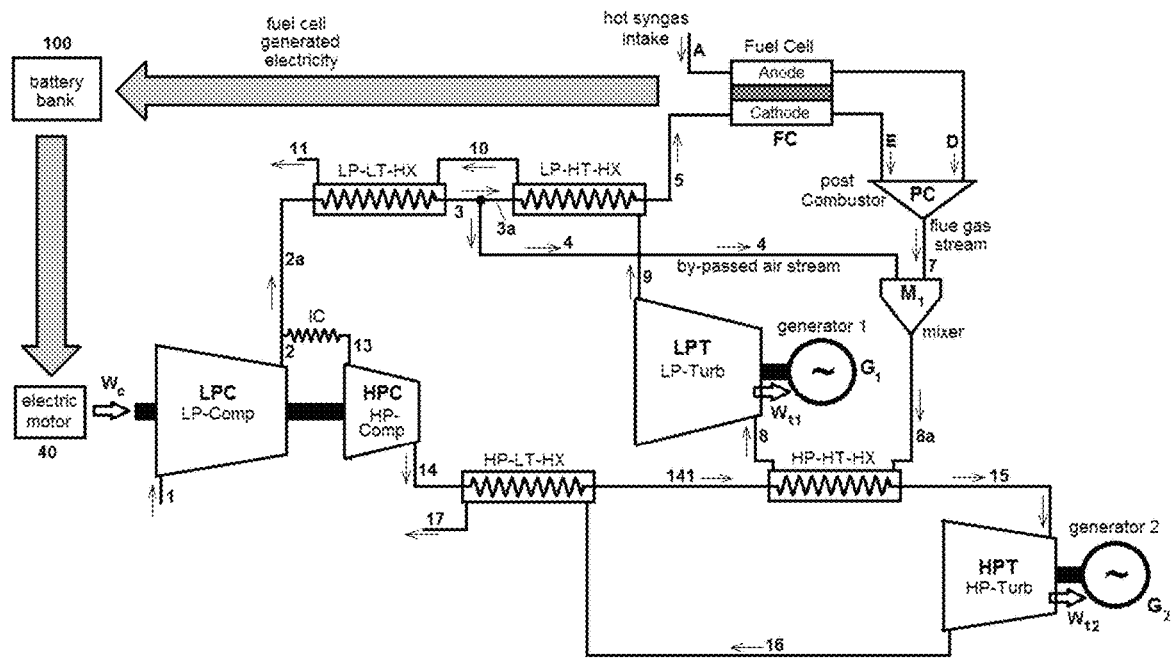
FIG. 14 is a schematic diagram of an Illustrative Embodiment of the invention based on two-stage PATMI power generation scheme with a by-pass cooling air stream and high-pressure gas turbine cycle.

Illustrative Embodiment 11—Two-Stage PATMI Power Generation Scheme with a by-Pass Cooling Air Stream and a High-Pressure Turbine Cycle FIG. 14 shows another version of a fuel cell integrated PATMI gas-turbine power scheme. However, in this case the gas-turbine power scheme is a two-stage scheme consisting of a low-pressure (first stage) power cycle and a high-pressure (second stage) power cycle. Here, the low-pressure power cycle resembles the Illustrative Embodiment 10 to a high degree. Further, the high-pressure second-stage power cycle is driven by the heat rejected by the first-stage power cycle. The workings of the power scheme can be described as follows.

The low-pressure compressor stage LPC extracts atmospheric air from its intake line 1 and compresses air to a pressure just above the operating pressure of the fuel cell FC. The low-pressure compressor stage delivers the partially compressed air, now at a temperature somewhat higher than the ambient temperature, to the flow passage 2. The air stream 2 is then split into two streams, one of which is cooled as it passes through the inter-cooler IC and then enters the intake line 13 of the high-pressure compressor stage HPC. The other stream 2a enters the low-pressure, low-temperature heat exchanger LP-LT-HX to be heated by the regenerated heat. As shown in FIG. 14, the low-pressure stream 2a is heated regeneratively as it passes through the two counter-flow heat exchangers LP-LT-HX and LP-HT-HX, which are placed in series. The compressed air stream 2a is heated as it passes through the low-temperature first-stage heat exchanger LP-LT-HX by the relatively cooler flue gas stream which flows from the flow passage 10 to the flow passage 11. The heated low-pressure compressed air stream then exits the heat exchanger through the flow passage 3. The compressed air stream 3 is then split into two streams, one of which flows through the by-pass flow passage 4, and the other stream 3a is further heated as it passes through the high-temperature second-stage heat exchanger LP-HT-HX by the relatively hotter flue gas stream which flows from the flow passage 9 to the flow passage 10. This heated low-pressure compressed air stream is fed to the cathode of the fuel cell FC through the flow passage 5. The fuel, in this case hot syngas, generated from an incineration process and subsequently filtered to remove all undesirable constituents, is fed to the anode of the fuel cell FC through the flow passage A.

In the high-temperature electrolyte of the fuel cell FC, the gaseous fuel and the oxygen in the low-pressure compressed air stream react electrochemically, and a portion of the fuel undergoes oxidation while the fuel cell produces electricity. Subsequently, hot partially oxidized fuel exits the anode through the flow passage D, while the hot compressed air with less oxygen exits the cathode through the flow passage E. The two streams D and E are mixed into a post-combustor PC, where the fuel is allowed to complete the oxidation reaction. The resulting high-temperature flue gas stream exits the post-combustor PC through the flow passage 7. As mentioned in reference to the Illustrative Embodiment 10, the temperature of the stream 7 depends on the fuel utilization factor of the fuel cell FC. The mixed hot flue gas stream 7 and the by-pass compressed air stream 4 are then combined and mixed in a static mixing device $M_1$ to form a mixed stream 8a. The stream 8a is then fed to the heat exchanger HP-HT-HX to harness a portion of its heat content to the high-pressure power cycle. The stream 8a, having been cooled in the heat exchanger HP-HT-HX to a certain degree, leaves the heat exchanger through the flow passage 8. The flue gas stream 8 enters the low-pressure turbine LPT, where the stream expands to a lower pressure close to the atmospheric pressure allowing the turbine rotors to harness the mechanical power. The power harnessed by the turbine rotors drives the electric generator $G_1$, which converts the mechanical power output of the turbine to electricity. Eventually, the flue gas, now at a pressure very close to the atmospheric pressure, leaves the turbine through the flow passage 9 and the stream passes through the heat exchangers LP-HT-HX and LP-LT-HX, in that sequence, passing through the flow passages 10 and 11 to regeneratively heat the counter-flow compressed air stream 2a to produce the hot air stream 5. The low-pressure power cycle completes when the flue-gas stream expels itself to the atmosphere through the flow passage 11.

The high-pressure power cycle begins as the partially compressed air stream 13 enters the high-pressure compression stage HPC, which further compresses the air stream 13 to a much higher pressure (800-1,000 kPa). The high-pressure compressor stage expels the high-pressure air stream through the flow passage 14 to the first-stage regenerative heat exchanger HP-LT-HX. In this heat exchanger, the compressed air stream 14 is heated to a certain high temperature from the hot air stream flowing in the counter-flow direction from the flow passage 16 to flow passage 17. The heated high-pressure air stream then enters the second-stage regenerative heat exchanger HP-HT-HX through the flow passage 141. The high-pressure air stream 141 is further heated as it passes through this heat exchanger by the counter-flow flue-gas stream in the low-pressure power cycle which flows from the flow passage 8a to the flow passage 8. Eventually, the heated high-pressure stream leaves heat exchanger HP-HT-HX through the flow passage 15 and enters the high-pressure stage turbine HPT. In the turbine the high-pressure air expands to a pressure somewhat higher than the atmospheric pressure allowing the turbine rotors to harness the mechanical power. The turbine rotors drive a second electric generator $G_2$ which converts the mechanical power feed of the turbine to an electrical power output. The expanded air stream exits the high-pressure turbine stage through the flow passage 16, which directs the stream to the regenerative heat exchanger HP-LT-HX. The air stream eventually leaves the high-pressure power cycle through the flow passage 17 completing the high-pressure power cycle.

In accordance with the previous PATMI Illustrative Embodiments presented here, the compressor LPC and HPC are driven by the electric motor 40, which in turn is powered by the electricity generated by the fuel cell FC. A battery bank 100 may be used to accommodate the imbalance of the fuel cell electric power supply and the power consumption of the electric motors. One noteworthy aspect in this Illustrative embodiment is that the high-pressure power cycle is an externally-heated cycle, meaning that the working fluid remains pure air without any fuel combustion occurring in the cycle. Another noteworthy aspect is that since the by-pass stream 4 inevitably cools the output stream 7 of the post combustor PC, this configuration is more appropriate for scenarios where the fuel cell fuel utilization factor is relatively low, which makes the temperature of the flue gas stream 7 relatively high.

Illustrative Embodiment 12—Two-Stage PATMI Power Generation Scheme with an Auxiliary Combustor in the by-Pass Air Stream and a High-Pressure Turbine Cycle With reference to the Illustrative Embodiment 11, it was highlighted that the power scheme (see FIG. 14) is more suitable for scenarios where the temperature of the output flue gas stream 7 of the post-combustor is relatively high. The Illustrative Embodiment 12 covered here, on the contrary, is more suitable for scenarios where the temperature of the output flue gas stream of the post-combustor is moderately high, meaning that the heat content of the mixed stream 8a is not adequate to drive the high-pressure power cycle. Therefore, a design change is required to convey more heat into the flue gas stream 8a.

Figure 15:
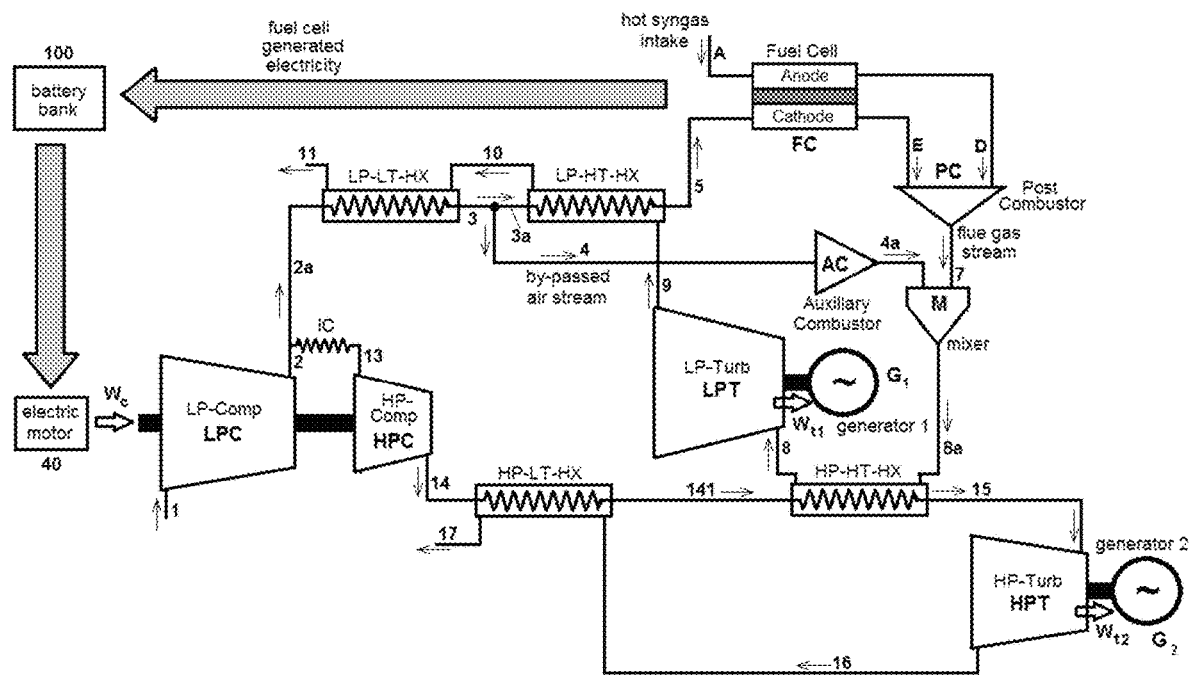
FIG. 15 is a schematic diagram of an Illustrative Embodiment of the invention based on two-stage PATMI power generation scheme with an auxiliary combustor in the by-pass air stream and high-pressure gas turbine cycle.

As shown in FIG. 15, Illustrative Embodiment 12 remedies this inadequacy by incorporating an auxiliary combustor AC in the by-pass air stream 4. As a result, the temperature of the flue gas stream 8a can be increased by controlling the rate of fuel combustion in the said auxiliary combustor AC. Apart from this minor modification, the Illustrative Embodiment 12 performs more or less the same manner as the Illustrative Embodiment 11.

Illustrative Embodiment 13—Two-Stage PATMI Power Generation Scheme with Two Auxiliary Combustors and a High-Pressure Turbine Cycle with a Thermal Feed to a Bottoming Cycle With reference to the Illustrative Embodiment 12, it was highlighted that the power scheme (see FIG. 15) is more suitable for scenarios where the temperature of the output flue gas stream 7 of the post-combustor is moderately high. The Illustrative Embodiment 13 covered here, on the contrary, is more suitable for scenarios where the temperature of the output flue gas stream of the post-combustor is relatively low. The typical scenario here is that the heat content of the mixed stream 8a is not only insufficient, but also this inadequacy cannot be remedied merely by incorporating the auxiliary combustor AC (see FIG. 15), even if the temperature of the by-pass air stream is raised to the maximum practically possible value. This scenario warrants a further design modification to the high-pressure power cycle, and that is to incorporate a second auxiliary combustor $AC_2$ at the inlet of the high-pressure turbine. However, the incorporation of a second auxiliary combustor provides further advantages in terms of harnessing more power. For example, since the added second auxiliary combustor enables the controlling of the inlet temperature of the high-pressure turbine, it facilitates the incorporation of a third bottoming cycle driven by the heat from the high-pressure power cycle. The details of the resulting power scheme can be described as follows.

Figure 16:
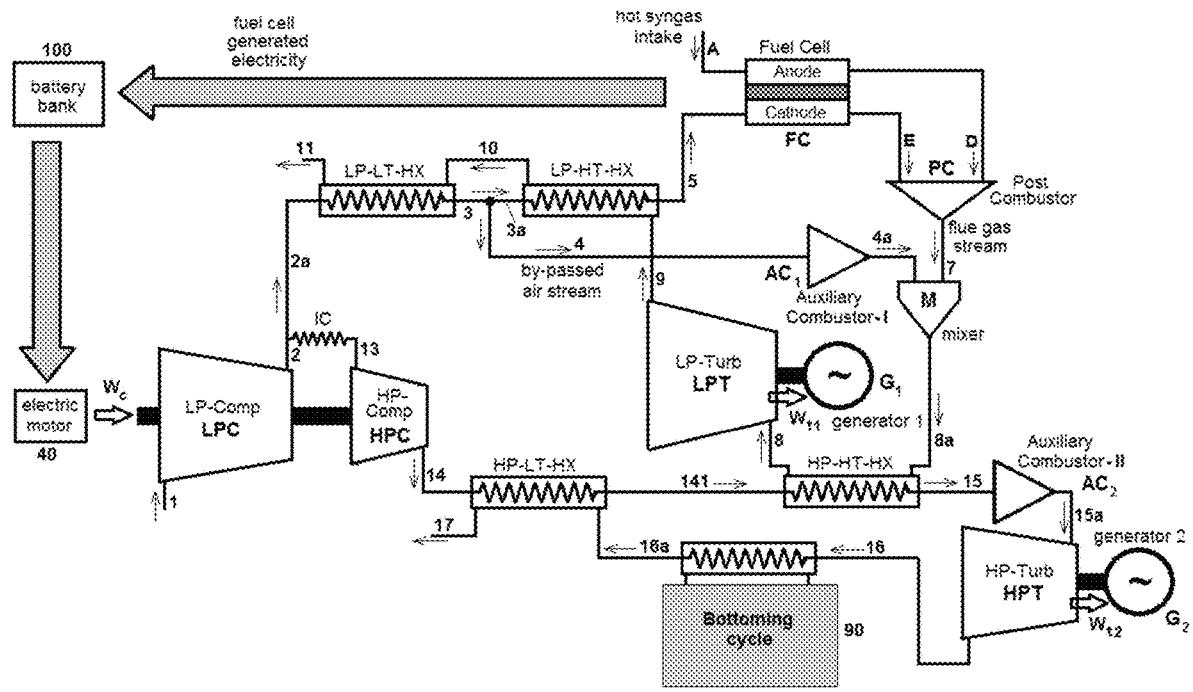
FIG. 16 is a schematic diagram of an Illustrative Embodiment of the invention based on two-stage PATMI power generation scheme with two auxiliary combustors and high-pressure gas turbine cycle feeding a bottoming cycle.

The low-pressure cycle of this Illustrative Embodiment operates exactly the same as the low-pressure cycle in the Illustrative Embodiments 12; therefore, the operation of the low-pressure cycle will not be described here. The high-pressure cycle begins (see FIG. 16) when the split air stream 13 undergoes the second-stage compression process in the high-pressure compressor stage HPC. The high-pressure compressor HPC further compresses the air stream 13 to a much higher pressure compared to the fuel cell operation pressure. The high-pressure compressor stage expels the high-pressure air stream through the flow passage 14 to the first-stage regenerative heat exchanger HP-LT-HX. In this heat exchanger, the compressed air stream 14 is heated to a certain high temperature from the hot air stream flowing in the counter-flow direction from the flow passage 16a to flow passage 17. The heated high-pressure air stream then enters the second-stage regenerative heat exchanger HP-HT-HX through the flow passage 141. The high-pressure air stream 141 is further heated as it passes through this heat exchanger from the heat rejected by the counter-flow flue-gas stream in the low-pressure power cycle, which flows from the flow passage 8a to the flow passage 8. Eventually, the heated high-pressure air stream leaves the heat exchanger HP-HT-HX through the flow passage 15 and enters the high-pressure auxiliary combustor $AC_2$. In the auxiliary combustor $AC_2$, a suitable fuel is combusted, and the air stream temperature increases to a certain degree, at which point the air stream becomes a flue gas stream due to the combustion products introduced. Heated flue gas stream then enters the high-pressure stage turbine HPT through the turbine inlet passage 15a. In the turbine, the high-pressure air stream expands to a pressure somewhat higher than the atmospheric pressure, allowing the turbine rotors to harness the mechanical power. The turbine drives a second electric generator $G_2$ thereby converting the mechanical power feed of the turbine to an electrical power output. The expanded flue gas stream exits the high-pressure turbine stage through the flow passage 16, which directs the flue gas stream to the regenerative heat exchanger HP-BC-HX, which feeds the excessive heat in the post-expanded flue gas stream to a thermally-coupled third bottoming cycle 90. The flue gas stream, having been cooled to a certain degree due rejection of heat to drive the bottoming cycle 90, leaves the heat exchanger HP-BC-HX through the flow passage 16a and enters the low-temperature regenerative heat exchanger HP-LT-HX. In the heat exchanger HP-LT-HX, the flue gas stream 16a further cools rejecting heat and eventually leaves the high-pressure power cycle through the flow passage 17, completing the high-pressure power cycle.

In accordance with the previous PATMI Illustrative Embodiments presented here, the compressor LPC and HPC are driven by the electric motor 40, which in turn is powered by the electricity generated by the fuel cell FC. A battery bank 100 may be used to accommodate the imbalance of the fuel cell electric power supply and the power consumption of the electric motors.

Illustrative Embodiment 14—Two-Stage PATMI Power Generation Scheme where the Low-Pressure Turbine is Fed with the Combined Exhaust from the Fuel Cell and the High-Pressure Turbine Cycle This Illustrative Embodiment is also a two-stage power generating scheme like the Illustrative Embodiments 11 through 13; however, it differs from the others in terms of the pressure ratio of the high-pressure cycle turbine. In this Illustrative Embodiment, the high-pressure cycle hot gas stream expands in two stages, first through the high-pressure turbine stage and then through the low-pressure turbine stage. Consequently, the low-pressure turbine power capacity increases due to the increase in the mass flow rate through it. Accordingly, the heat capacity of the hot gas stream, which preheats the fuel cell air feed is also increased. The workings of this Illustrative Embodiment can be described as follows in reference to FIG. 17.

Figure 17:
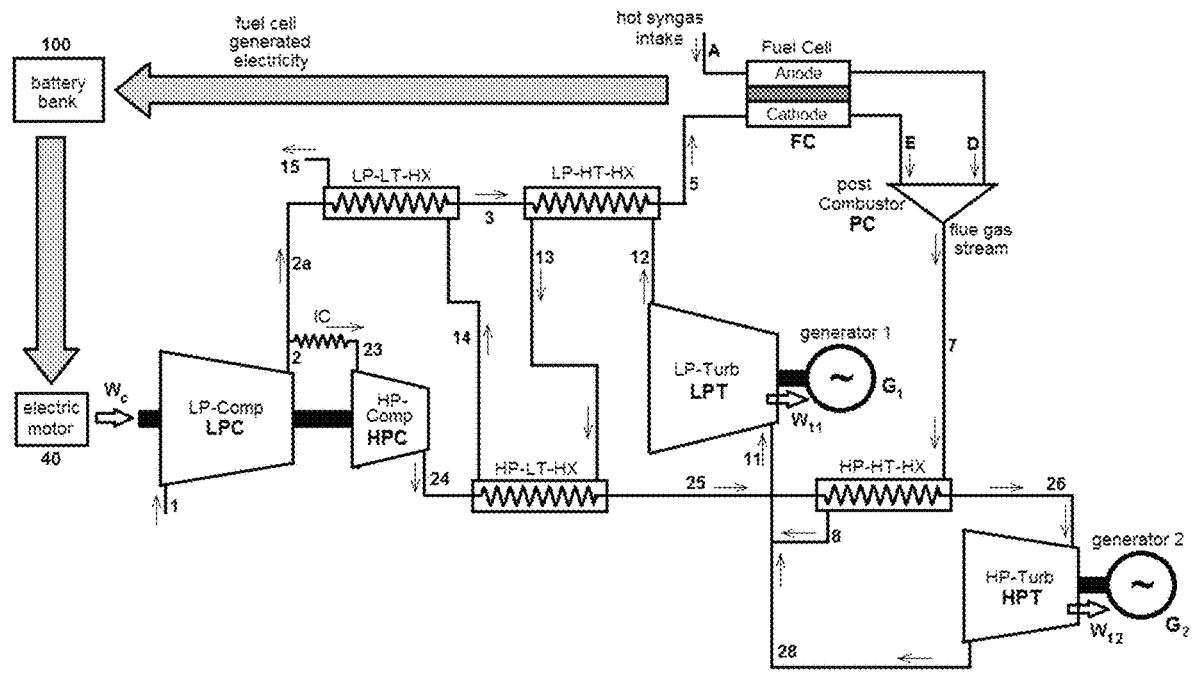
FIG. 17 is a schematic diagram of an Illustrative Embodiment of the invention based on two-stage PATMI power generation scheme where the low-pressure turbine is fed with the combined exhaust from the fuel cell and the high-pressure turbine.

The low-pressure compressor stage LPC extracts the atmospheric air from its intake line 1 and compresses air to a pressure just above the operating pressure of the fuel cell FC. The low-pressure compressor stage delivers the partially compressed air, now at a temperature somewhat higher than the ambient temperature, to the flow passage 2. The compressed air stream 2 is then split into two streams, one of which is cooled as it passes through the inter-cooler IC and then enters the intake line 23 of the high-pressure compressor stage HPC. The other compressed air stream 2a enters the low-pressure, low-temperature heat exchanger LP-LT-HX to be heated by the regenerated heat harnessed from the flue gas stream. As shown in FIG. 17, the low-pressure stream 2a is heated regeneratively as it passes through the two counter-flow heat exchangers LP-LT-HX and LP-HT-HX, which are placed in series. The compressed air stream 2a is first heated as it passes through the low-temperature first-stage heat exchanger LP-LT-HX by the relatively cooler flue gas stream which flows from the flow passage 14 to the flow passage 15. The partially heated compressed air stream then enters the high-temperature second-stage heat exchanger LP-HT-HX to be further heated by the relatively hotter flue gas stream which flows from the flow passage 12 to the flow passage 13.

This heated low-pressure compressed air stream is fed to the cathode of the fuel cell FC through the flow passage 5. The fuel, in this case hot syngas generated from an incineration process and subsequently filtered to remove all undesirable constituents, is fed to the anode of the fuel cell FC through the flow passage A. In the high-temperature electrolyte of the fuel cell FC, the gaseous fuel and the oxygen in the low-pressure compressed air stream react electrochemically, and a portion of the fuel undergoes oxidation while the fuel cell produces electricity. As a result, hot partially oxidized fuel exits the anode through the flow passage D, while the hot compressed air with less oxygen exits the cathode through the flow passage E. The two streams D and E are mixed into a post-combustor PC, where the remaining fuel in the stream D is allowed to complete the oxidation reaction. The resulting high-temperature flue gas stream exits the post-combustor PC through the flow passage 7. As mentioned in reference to the Illustrative Embodiment 10, the temperature of the stream 7 depends on the fuel utilization factor of the fuel cell FC. The hot flue gas stream 7 enters the heat exchanger HP-HT-HX to harness a portion of its heat content to the high-pressure power cycle. The stream 7, having been cooled in the heat exchanger HP-HT-HX to a certain degree, leaves the heat exchanger through the flow passage 8.

The high-pressure power cycle begins as the partially compressed air stream 23 enters the high-pressure compression stage HPC, which further compresses the air stream 23 to a much greater pressure. The high-pressure compressor stage expels the high-pressure air stream through the flow passage 24 to the first-stage high-pressure regenerative heat exchanger HP-LT-HX. In this heat exchanger, the compressed air stream 24 is heated to a certain high temperature from the hot flue gas stream flowing in the counter-flow direction from the flow passage 13 to flow passage 14. The heated high-pressure air stream then enters the second-stage regenerative heat exchanger HP-HT-HX through the flow passage 25. The high-pressure air stream 25 is further heated as it passes through this counter-flow heat exchanger HP-HT-HX by the flue-gas stream of the low-pressure power cycle, which flows from the flow passage 7 to the flow passage 8. Eventually, the heated high-pressure air stream leaves heat exchanger HP-HT-HX through the flow passage 26 and enters the high-pressure stage turbine HPT. In the turbine, the high-pressure air stream expands to a pressure somewhat close to the low-pressure turbine LPT inlet pressure, allowing the turbine rotors to harness the mechanical power. The turbine rotors drive a second electric generator $G_2$, which converts the mechanical power feed of the turbine to an electrical power output. The expanded air stream exits the high-pressure turbine stage HPT through the flow passage 28.

The hot air stream 28 which is now at a pressure close to that of the flue gas stream 8 are mixed and the mixed hot gas stream 11 enters to the low-pressure stage turbine LPT. In the low-pressure turbine LPT, the mixed hot gas stream expands to a lower pressure close to the atmospheric pressure allowing the turbine rotors to harness the mechanical power. The power harnessed by the turbine rotors drives the electric generator $G_1$, which converts the mechanical power output of the turbine to electricity. Eventually, the hot gas stream, now at a pressure very close to the atmospheric pressure, leaves the turbine through the flow passage 12 and enters the regenerative heat exchangers LP-HT-HX where the stream transfers heat to raise the temperature of the low-pressure compressed air stream 3. The hot gas stream leaves the heat exchanger LP-HT-HX through the flow passage 13 and enters the counter-flow heat exchanger HP-LT-HX, where it transfers heat further to raise the temperature of the high-pressure compressed air stream 24. Finally, the hot gas stream leaves the heat exchanger HP-LT-HX through the flow passage 14, which directs the hot gas stream to the low-temperature, counter-flow heat exchanger LP-LT-HX. In the low-temperature heat exchanger LP-LT-HX, the hot gas stream regenerates its low-temperature heat content raising the temperature of the relatively cooler low-pressure air stream 2a. The low-pressure and high-pressure power cycles are complete when the hot gas stream leaves the low-temperature heat exchanger LP-LT-HX and expels itself to the atmosphere through the flow passage 15.

In accordance with all the PATMI power generating schemes presented thus far, the compressors in this combined cycle are driven by an electric motor 40, which is in turn driven by the electricity produced by the fuel cell FC in the primary cycle, possibly with a battery bank 100 to store electricity. The battery bank 100 accommodates the imbalance of the fuel cell electric power supply and the power consumption of the electric motor.

Illustrative Embodiment 15—Two-Stage PATMI Power Generation Scheme with Three Auxiliary Combustors and a Bottoming Cycle Driven by a Thermal Feed from the High-Pressure Cycle This Illustrative Embodiment is also a two-stage power generating scheme, which can be seen as a hybrid version of the Illustrative Embodiments 13 and 14. Illustrative Embodiment 13 presented previously has two auxiliary combustors and a bottoming cycle, which is thermally fed by the high-pressure cycle. In comparison, this Illustrative Embodiment has three auxiliary combustors and a bottoming cycle, which is also thermally fed by the high-pressure cycle. However, in the Illustrative Embodiment 13, the expansion of the high-pressure cycle flue gas stream occurs completely to a near-atmospheric pressure in the high-pressure turbine, quite independently of the low-pressure turbine. As a result, the flue gas streams of both cycles expel themselves to the atmosphere through two different regenerative heat exchangers. In comparison in this Illustrative Embodiment, the high-pressure turbine causes the high-pressure cycle flue gas to expand partially until the stream pressure approaches the inlet pressure of the low-pressure turbine, thereafter the flue gasses of both cycles form a mixed stream to expand through the low-pressure turbine, similar to the Illustrative Embodiment 14.

Figure 18:
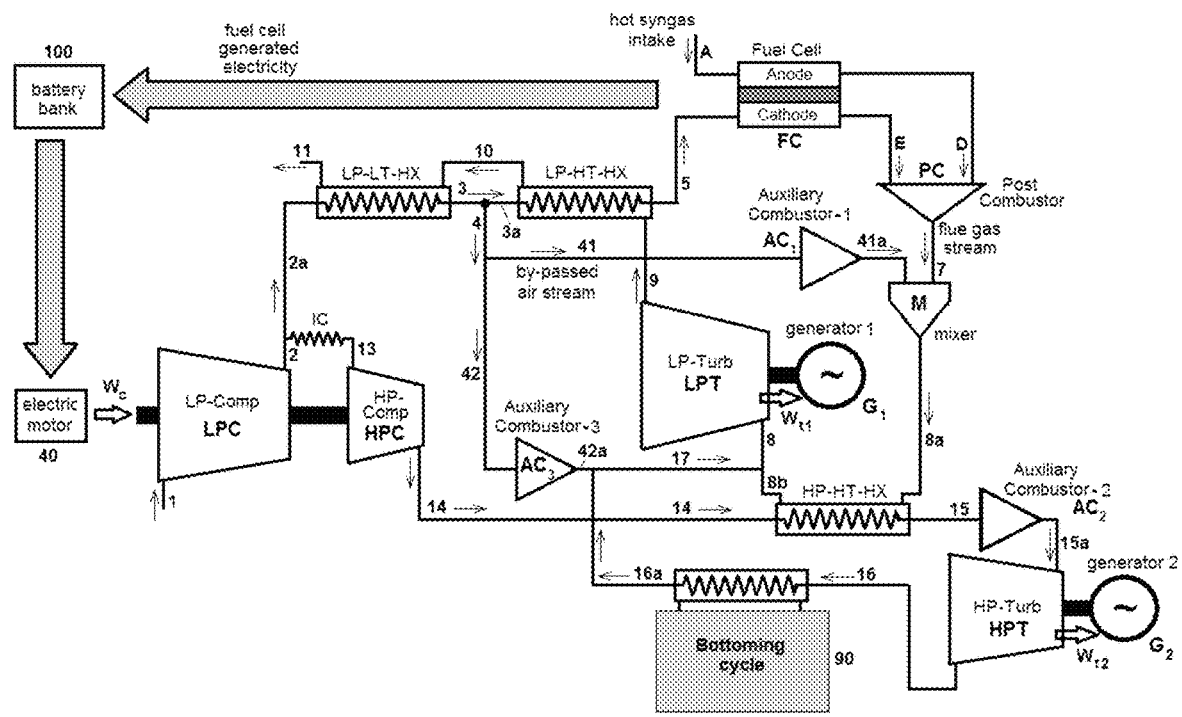
FIG. 18 is a schematic diagram of an Illustrative Embodiment of the invention based on two-stage PATMI power generation scheme with three auxiliary combustors and a bottoming cycle driven by the high-pressure gas turbine cycle.

The workings of this Illustrative Embodiment can be described as follows. As FIG. 18 shows, the low-pressure compressor stage LPC extracts atmospheric air from its intake line 1 and compresses air to a pressure just above the operating pressure of the fuel cell FC. The low-pressure compressor stage delivers the partially compressed air, now at a temperature somewhat higher than the ambient temperature, to the flow passage 2. The air stream 2 is then split into two streams, one of which is cooled as it passes through the inter-cooler IC and then enters the intake line 13 of the high-pressure compressor stage HPC. The other stream 2a enters the low-pressure, low-temperature heat exchanger LP-LT-HX to be heated by the regenerated heat. As shown in FIG. 18, the low-pressure stream 2a is heated regeneratively as it passes through the two counter-flow heat exchangers LP-LT-HX and LP-HT-HX, which are placed in series. The compressed air stream 2a is heated as it passes through the low-temperature first-stage heat exchanger LP-LT-HX by the relatively cooler flue gas stream which flows from the flow passage 10 to the flow passage 11. The heated low-pressure compressed air stream then exits the heat exchanger through the flow passage 3. The compressed air stream 3 is then split into two streams, one of which flows through the by-pass flow passage 4, and the other stream 3a is further heated as it passes through the high-temperature second-stage heat exchanger LP-HT-HX by the relatively hotter flue gas stream which flows from the flow passage 9 to the flow passage 10. The heated low-pressure compressed air stream is then fed to the cathode of the fuel cell FC through the flow passage 5. The fuel, in this case hot syngas generated from an incineration process and subsequently filtered to remove all undesirable constituents, is fed to the anode of the fuel cell FC through the flow passage A.

In the high-temperature electrolyte of the fuel cell FC, the gaseous fuel and the oxygen in the low-pressure compressed air stream react electrochemically, and a portion of the fuel undergoes oxidation while the fuel cell produces electricity. As a result, hot partially oxidized fuel exits the anode through the flow passage D, while the hot compressed air with less oxygen exits the cathode through the flow passage E. The two streams D and E are mixed into a post-combustor PC, where the fuel is allowed to complete the oxidation reaction. The resulting high-temperature flue gas stream exits the post-combustor PC through the flow passage 7. As mentioned in reference to the Illustrative Embodiment 10, the temperature of the stream 7 depends on the fuel utilization factor of the fuel cell FC.

The by-pass air stream 4 is further split into two streams, the first portion of which flows along the flow passage 41 and is heated by combusting a suitable fuel in the first auxiliary combustor $AC_1$. The resulting flue gas stream leaves the auxiliary combustor $AC_1$ through the flow passage 41a. The second portion of the split air stream 4 flows through the flow passage 42, which is also heated by combusting a suitable fuel in the third auxiliary combustor $AC_3$. The resulting flue gas leaves the third auxiliary combustor $AC_3$ through the flow passage 42a.

The hot flue gas stream 7 and the heated first by-pass compressed air stream 41a are then combined to form the mixed stream 8a in a static mixing device $M_1$. The stream 8a is then fed to the heat exchanger HP-HT-HX to harness a portion of its heat content to the high-pressure power cycle. The stream 8a, having been cooled in the heat exchanger HP-HT-HX to a certain degree, leaves the heat exchanger through the flow passage 8b. At this point the low-pressure cycle flue gas stream 8b is combined with the high-pressure cycle flue gas stream to form a mixed stream, thus the description will be focused on the workings of the high-pressure cycle.

The high-pressure power cycle begins as the partially compressed air stream 13 enters the high-pressure compression stage HPC, which further compresses the air stream 13 to a much higher pressure. The high-pressure compressor stage expels the high-pressure air stream through the flow passage 14 to the regenerative heat exchanger HP-HT-HX where the high-pressure air stream is heated by the low-pressure cycle flue gas stream flowing from the flow passage 8a to the flow passage 8b. The heated high-pressure air stream then enters the second auxiliary combustor $AC_2$ through the flow passage 15. In the auxiliary combustor $AC_2$, the high-pressure air stream is further heated by combusting a suitable fuel. The resulting hot flue gas stream 15a leaves the auxiliary combustor $AC_2$ and enters the high-pressure stage turbine HPT. In the turbine, the high-pressure hot flue gas stream expands to a pressure slightly higher than the inlet pressure of the low-pressure turbine LPT, allowing the turbine rotors to harness the mechanical power. The turbine rotors drive a second electric generator $G_2$ which converts the mechanical power feed of the turbine to an electrical power output. The expanded flue gas stream exits the high-pressure turbine stage through the flow passage 16 and enters the regenerative heat exchanger HP-BC-HX, which acts as a thermal feed to a suitably coupled bottoming cycle 90. In order to get the best performance, this bottoming cycle should be of a Rankine (steam) cycle type or a $sCO_2$ cycle type. The flue gas stream eventually leaves the bottoming cycle heat exchanger HP-BC-HX through the flow passage 16a, which is then mixed with the second flue gas stream 42a emitting from the third auxiliary combustor $AC_3$ to form the hot flue gas mix stream 17.

The mixed flue gas stream 17 is in turn mixed with the low-pressure cycle flue gas stream 8b, and the resulting mixed stream 8 enters the low-pressure turbine LPT. In the low-pressure turbine LPT, the combined flue gas stream 8 expands to a lower pressure close to the atmospheric pressure, allowing the turbine rotors to harness the mechanical power. The power harnessed by the turbine rotors drives the electric generator $G_1$, which converts the mechanical power output of the turbine to electricity. Eventually, the flue gas, now at a pressure very close to the atmospheric pressure, leaves the low-pressure turbine LPT through the flow passage 9 and the stream passes through the heat exchangers LP-HT-HX and LP-LT-HX, in that sequence, passing through the flow passages 10 and 11 to regeneratively heat the counter-flow compressed air stream 2a. The low-pressure and the high-pressure cycles conclude, once the flue gas stream 11 expels itself to the atmosphere.

In accordance with all the PATMI power generating schemes presented thus far, the compressors in this combined cycle are driven by an electric motor 40, which is in turn driven by the electricity produced by the fuel cell FC in the low-pressure cycle, possibly with a battery bank 100 to store electricity. The battery bank 100 accommodates the imbalance of the fuel cell electric power supply and the power consumption of the electric motor. A noteworthy aspect of this two-stage power generating scheme is that having three auxiliary combustors enable the achievement of the preferable temperature levels at temperature critical points while maintaining the maximum temperature to not to exceed a limiting value (say 1200° C.). For example, for this combined-cycle to perform as intended, the temperature of the streams 5, 15a, and 16 should have lower-bound temperature values. To achieve these limiting temperatures, the fluid streams 9, 8a, and 15a should have the corresponding minimum limits. These temperature conditions can be easily met having the three independent auxiliary combustors in the system.

Illustrative Embodiment 16—Two-Stage PATMI Power Generation Scheme with a Fuel-Feed, a Steam-Feed, a Reformer, and Fuel Preheaters This Illustrative Embodiment differs from the Illustrative Embodiments 10 through 15 as it comprises a gaseous fuel feed, a water/steam feed, and a reformer/pre-reformer. In this Illustrative Embodiment, the gaseous fuel is fed through two flow circuits which operate at two pressure levels. The first is a low-pressure fuel feed to drive the low-pressure power cycle, that also includes the fuel cell. The second is a high-pressure fuel feed to power the high-pressure power cycle. The workings of this two-stage power scheme can be described as follows with reference to FIG. 19. Since this Illustrative Embodiment has two auxiliary flow layouts for a gaseous fuel (such as natural gas) feed and a water/steam feed, in addition to the two power cycle layouts, it is worthwhile to describe the operation of the two auxiliary layouts before describing the operation of the main power cycles.

The electric motor 403 drives a water pump which pumps atmospheric water extracted from the water supply line 31 to the high-pressure water delivery line 32. The high-pressure water flows through the water preheater/boiler heat exchanger $HX_6$ where the water is converted to high-pressure steam. The generated steam is fed through the flow line 33 to a fuel/steam mixer M where the high-pressure steam is mixed with a gaseous high-pressure fuel.

The two-stage fuel compressor, which is driven by an electric motor 402, comprises a low-pressure compression stage 20a and a high-pressure compression stage 20b. The low-pressure compressor stage 20a extracts the gaseous fuel from the fuel supply line 21 and compresses the fuel to the low-pressure fuel delivery line 22. A portion of this compressed fuel is delivered to the low-pressure power cycle through the flow passage 23, while the remainder is further compressed by the high-pressure compressor stage 20b and is delivered to the high-pressure fuel delivery line 26. The high-pressure fuel delivery line 26 passes through the first high-pressure fuel preheater $HX_4$ and then flows through the flow passage 27 to enter the second high-pressure fuel preheater $HX_1$ where the high-pressure fuel stream is further heated before the fuel stream enters the high-pressure combustor $C_1$ through the flow passage 28.

The low-pressure fuel line 23 passes through the first low-pressure fuel preheater $HX_5$, and so heated fuel is delivered to the second low-pressure fuel preheater $HX_2$ through the fuel flow passage 24. The heated fuel stream leaves the second fuel reheater $HX_2$ through the flow passage 25, which is then split into two streams 25a and 25b. The fuel stream 25a enters the low-pressure combustor $C_2$, while the other fuel stream 25b enters the fuel/steam mixer M where the fuel stream is mixed with the high-pressure steam fed through the steam line 33. The mixed stream 34 enters the reformer REF, where the fuel/steam mixture undergoes the reformation reaction producing a significant amount of hydrogen. Since the reformation reaction is endothermic, the required heat for the reaction may be provided to the reformer REF by the recirculation of the fuel stream through the optional recirculation path 34a. The partially reformed fuel enters the fuel cell anode through the flow passage 35.

The two-stage main cycles begin when the atmospheric air is extracted by the two-stage compressor through the air supply line 1, and the air is compressed in the first stage compressor to a pressure slightly higher than the pressure at which the fuel cell SOFC operates. The first compressor stage delivers the low-pressure compressed air to the flow passage 2. The compressed air stream 2 is then split into two streams, the first of which is delivered to the flow passage 2a to be used in the low-pressure cycle. The second split stream is cooled through the inter-cooler IC and delivered to the inlet flow passage 13 of the high-pressure compressor stage where air is further compressed to a much higher pressure to be used in the high-pressure cycle.

The high-pressure cycle continues when the high-pressure compressor stage delivers air to the flow passage 14. The high-pressure compressed air stream 14 enters the high-pressure regenerator REG where the compressed air stream is heated by the hot flue gas stream which counter-flows from the flow passage 41 to flow passage 42. The heated air stream 15 enters the high-pressure combustor $C_1$ where its temperature is further increased due to the combustion of the fuel stream 28. The resulting very hot flue gas stream 16 enters the high-pressure turbine stage HPT where the high-pressure hot flue gas stream expands to a pressure slightly higher than the inlet pressure of the low-pressure turbine LPT, allowing the turbine rotors to harness the mechanical power. The expanded flue gas stream exits the high-pressure turbine stage through the flow passage 17 which directs the flue gas stream to mix with the flow stream 38 to form a combined stream 38a.

The low-pressure cycle continues when the low-pressure air stream enters the first low-pressure air preheater $HX_3$ where the air is heated to a certain temperature. The air stream leaves the first low-pressure preheater through the flow passage 3 which is split into two streams 3a and 3b. The first split low-pressure air stream 3a enters the cathode of the fuel cell SOFC to power the fuel cell, while the second split low-pressure air stream 3b enters low-pressure combustor $C_2$ where the fuel fed through the fuel line 25a undergoes the combustion reaction to form a hot flue gas stream 4b.

Figure 19:
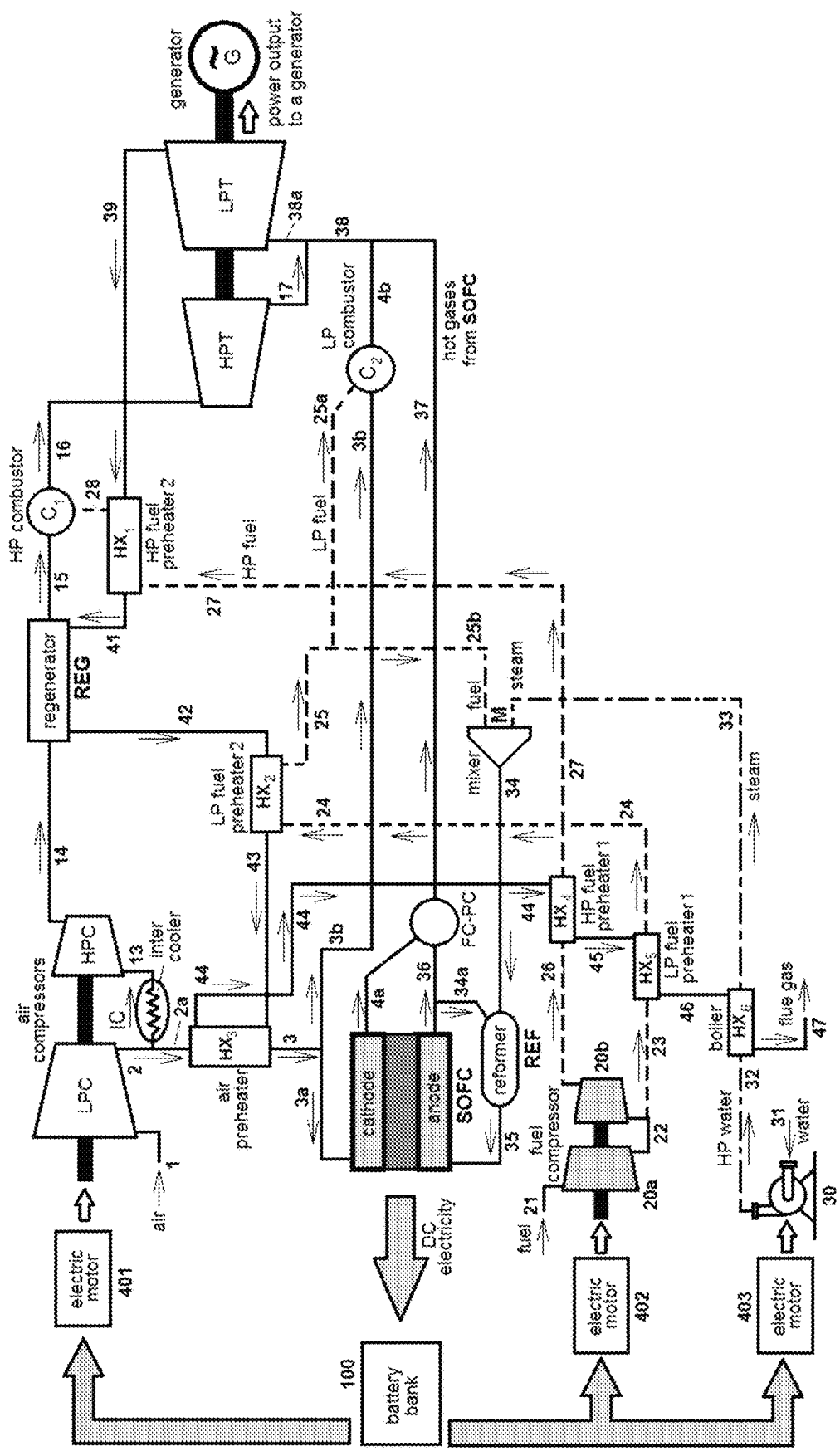
FIG. 19 is a schematic diagram of an Illustrative Embodiment of the invention based on two-stage PATMI power generation scheme with a fuel-feed, a steam-feed, a reformer, and fuel preheaters.

In the high-temperature electrolyte of the fuel cell SOFC, the gaseous fuel stream 35 and the oxygen in the low-pressure compressed air stream 3a react electrochemically, and a major portion of the fuel undergoes oxidation while the fuel cell produces electricity. As a result, hot partially oxidized fuel exits the anode through the flow passage 36, while the hot compressed air with less oxygen exits the cathode through the flow passage 4a. The two streams 4a and 36 are mixed into a post-combustor FC-PC, where the fuel completes the oxidation reaction. The resulting high-temperature flue gas stream exits the post-combustor FC-PC through the flow passage 37. The hot flue gas streams 37 and 4b which emits from the low-pressure combustor are combined to form the mixed stream 38. As previously mentioned, the flue gas streams 38 and 17 are further combined to form a single stream 38a. The combined flue gas stream 38a enters the low-pressure turbine stage LPT where the combined flue gas stream expands to a lower pressure close to the atmospheric pressure, allowing the turbine rotors to harness the mechanical power. As shown in FIG. 19, both turbine stages can be mounted on the same shaft to drive a single generator G, which converts the mechanical power feed of the two turbine stages to an electrical power output. It should be mentioned here that the workings of the two cycles will not be significantly altered if the two turbine stages were to drive two separate generators.

The expanded flue gas, now at a pressure slightly higher than the atmospheric pressure, leaves the low-pressure turbine stage LPT through the flow passage 39 which directs the flue gas stream to pass through the second high-pressure fuel preheater $HX_1$ where the fuel stream 28 is preheated. The flue gas stream, having passed through the second high-pressure fuel preheater $HX_1$, enters the high-pressure air regenerator REG through the flow passage 41 where much of the heat content of the flue gas stream is used up to regeneratively heat the high-pressure compressed air stream 14. The flue gas stream leaves the high-pressure air regenerator REG through the flow passage 42, which directs the flue gas stream to pass through the rest of the regenerative heat exchanges: the second low-pressure fuel preheater HX$_2$; the low-pressure air preheater HX$_3$; the first high-pressure fuel preheater HX$_4$; the first low-pressure fuel preheater HX$_5$; and the water boiler HX$_6$, in that sequence, directed by the flow passages 43, 44, 45, and 46 respectively. Eventually, the flue gas stream expels itself to the atmosphere through the flue passage 47, thus completing the two-stage power cycle.

In accordance with all the PATMI power generating schemes presented thus far, the compressors and pumps in this combined cycle are driven by the electric motors 401, 402, and 403, which are in turn driven by the electricity produced by the fuel cell SOFC, possibly with a battery bank 100 to store electricity. The battery bank 100 accommodates the imbalance of the fuel cell electric power supply and the power consumption of the electric motors.

Figure 20:
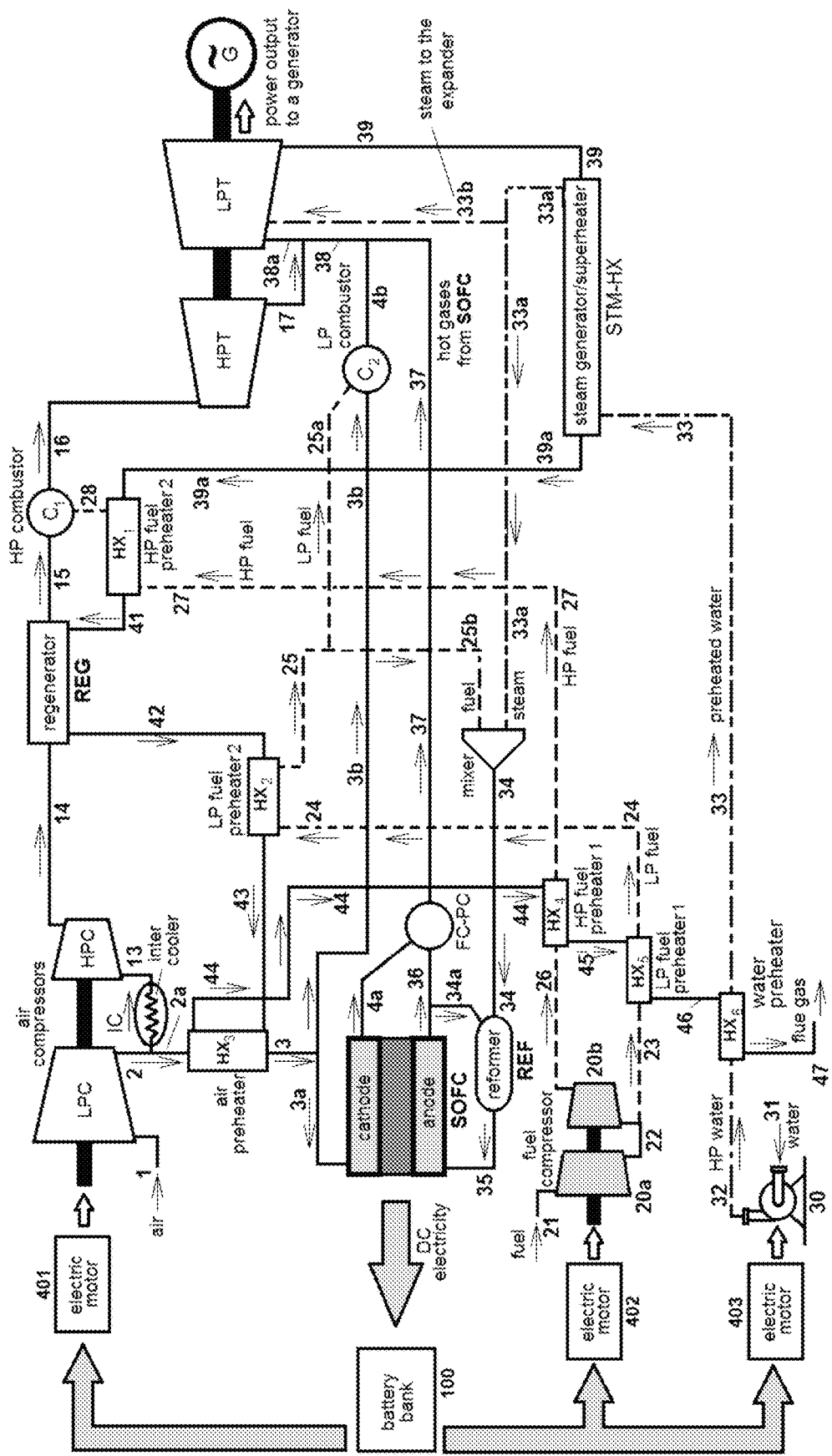
FIG. 20 is a schematic diagram of an Illustrative Embodiment of the invention based on two-stage PATMI power generation scheme with a reformer fed with steam generated using the exhaust of high-pressure gas turbine cycle.

Illustrative Embodiment 17—Two-Stage PATMI Power Generation Scheme with a Reformer Fed with Steam Generated Using the Exhaust of High-Pressure Gas Turbine Cycle This Illustrative Embodiment is almost identical to the Illustrative Embodiment 16 described previously, except that it differs in the way the steam is generated to feed the fuel cell. Therefore, this description is provided only to explain the workings of the water/steam circuit in reference to FIG. 20.

The electric motor 403 drives a water pump 30 which pumps atmospheric water extracted from the water supply line 31 to the high-pressure water delivery line 32. The high-pressure water flows through the water preheater/boiler heat exchanger HX$_6$ where the water is preheated. The preheated water leaves the preheater HX$_6$ through the flow line 33 and enters the steam generator/superheater STM-HX. In the heat exchanger STM-HX, the water is converted to steam, as it absorbs the heat rejected by the flue gas stream which enters from the flow passage 39 and exits through the flow passage 39$a$. One noteworthy feature here is that since the steam is generated by the heat regenerated by the flue gas, the amount of water that can be converted to steam is substantially higher compared to the same in the Illustrative Embodiment 16. It, therefore, enables the generation of more steam than what is consumed by the fuel cell, and this excess steam can now be used to generate extra power passing through a turbine.

The generated steam exits the heat exchanger STM-HX through the flow passage 33$a$. A portion of the steam so generated branches off through the flow passage 33$b$ and enters the low-pressure turbine stage LPT. In the turbine, the injected steam, mixed with the expanding flue gas, produces extra power, enhancing the power output of the low-pressure turbine stage LPT. The remainder of the stream 33$a$ is fed to the fuel/steam mixer M so that the two cycles continue as described with reference to the Illustrative Embodiment 16.

Figure 21:
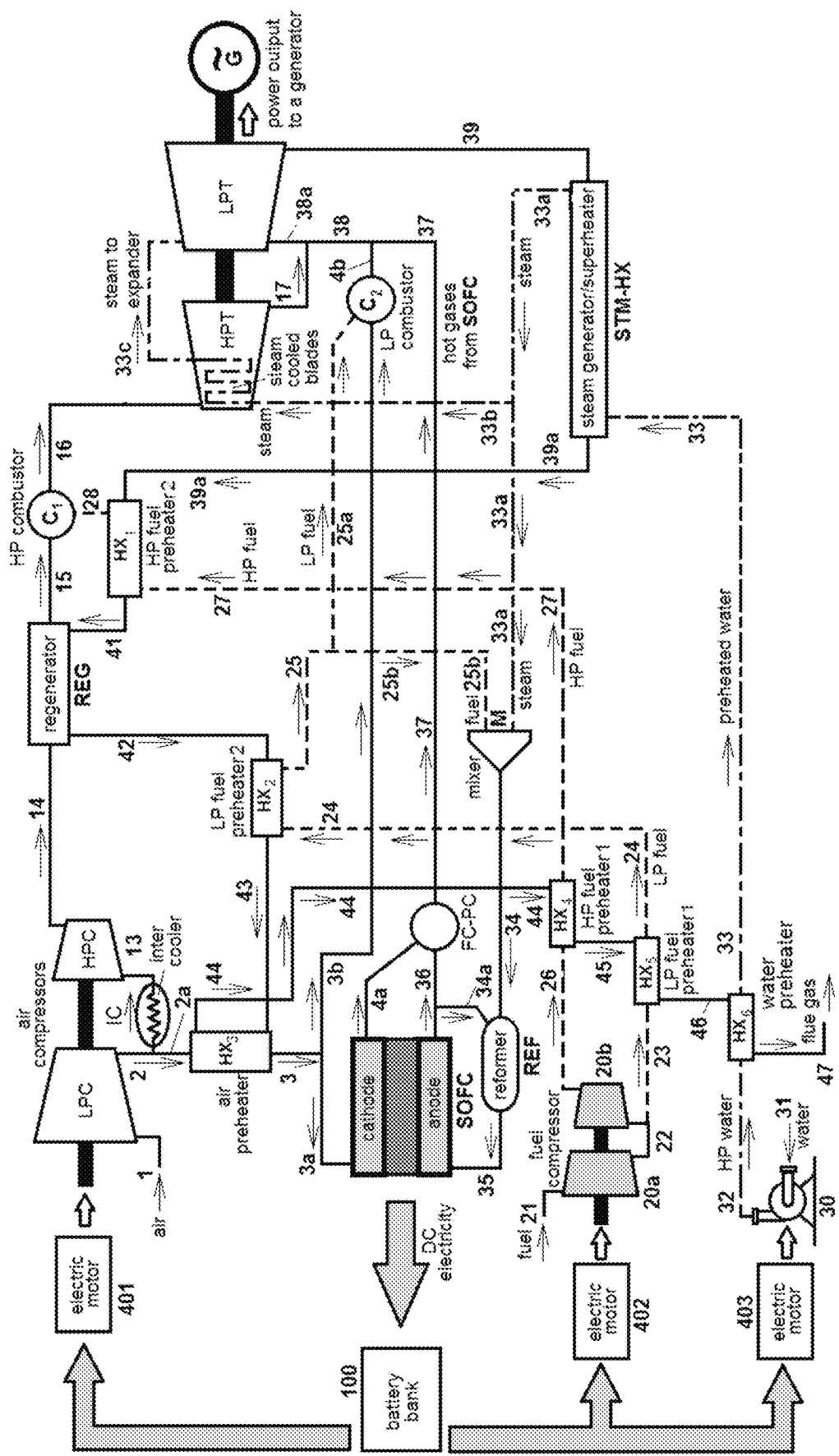
FIG. 21 is a schematic diagram of an Illustrative Embodiment of the invention based on two-stage PATMI power generation scheme with a high-pressure gas turbine cycle where turbine blades are cooled by steam.

Illustrative Embodiment 18—Two-Stage PATMI Power Generation Scheme with a High-Pressure Gas Turbine Cycle where Turbine Blades are Cooled by Steam This Illustrative Embodiment is a further extension of the Illustrative Embodiments 16 and 17 described previously. In this Illustrative Embodiment, the mass flow rate through the heat exchanger STM-HX is further increased so that a portion of the water fed through the steam-generating heat exchanger could be used to cool the high-temperature blades in the high-pressure turbine stage. This design feature enables the high-pressure turbine inlet temperature to be raised to a higher value, thus gaining an added advantage in the system performance. Since the workings of this Illustrative Embodiment are similar to the workings of the Illustrative Embodiment 16 to a higher degree, the description is restricted only to the workings of the water/steam circuit in reference to FIG. 21.

The electric motor 403 drives a water pump 30 which pumps atmospheric water extracted from the water supply line 31 to the high-pressure water delivery line 32. The high-pressure water flows through the water preheater/boiler heat exchanger HX$_6$ where the water is preheated. The preheated water leaves the preheater HX$_6$ through the flow line 33 and enters the steam generator/superheater STM-HX. In the heat exchanger STM-HX, the water is converted to steam, as it absorbs the heat rejected by the flue gas stream which enters from the flow passage 39 and exits through the flow passage 39$a$. The generated steam exits the heat exchanger STM-HX through the flow passage 33$a$. A portion of the steam so generated, branches off through the flow passage 33$b$ and enters the turbine blade-cooling passages in the high-pressure turbine stage HPT, where the steam is further heated while the turbine blades are cooled. The heated steam, now in a superheated-steam state, leaves the high-pressure turbine stage HPT through the flow passage 33$c$, which directs the steam to enter the low-pressure turbine stage HPT at a suitably chosen entry-port. In the low-pressure turbine stage LPT, the steam expands mixed with the expanding flue gas enabling the turbine stage LPT to harness extra power. The remainder of the stream 33$a$ is fed to the fuel/steam mixer M so that the two cycles continue, as described with reference to the Illustrative Embodiment 16.

The two most significant advantages of this Illustrative Embodiment over the Illustrative Embodiment 17 are that:
 (1) due to the incorporation of blade-cooling in the high-pressure turbine stage HPT, it can operate at a considerably higher inlet temperature, which increases the maximum temperature of the high-pressure cycle, thus enhancing the performance of the high-pressure cycle; and
 (2) the inlet steam temperature as well as the mass flow rate to the low-pressure turbine stage LPT is considerably increased due to the heat extracted by blade-cooling, thus enhancing the performance of the low-pressure cycle.

Illustrative Embodiment 19—Two-Stage PATMI Power Generation Scheme with Pre-Reformer/Reformer and Three Regenerative Heat Exchangers in the High-Pressure Gas Turbine Cycle This Illustrative Embodiment differs from Illustrative Embodiments 10 through 18 since this Illustrative Embodiment has three regenerative heat exchangers in the high-pressure cycle and a water/steam separator in the low-pressure cycle. The workings of this Illustrative Embodiment shown in FIG. 22, can be described as follows. The description first concentrates on the high-pressure water supply and the gaseous fuel supply circuits.

The electric motor 403 drives a water pump which pumps atmospheric water extracted from the water supply line 31 to the high-pressure water delivery line 32. The high-pressure water flows through the water preheater/boiler heat exchanger WAT-HX where the water is converted to high-pressure steam with a low dryness-fraction. The generated steam is fed through the flow passage 33 to a steam/water separator SEP, where dry-steam and water are separated. The separated dry-steam leaves the separator through the flow passage 33a, while the separated water leaves the separator SEP through the flow passage 33b. The flow passage 33a directs the stream of dry-steam 33a to the fuel/steam mixer M, where the high-pressure steam is mixed with the pressurized gaseous fuel.

The two-stage fuel compressor, which is driven by an electric motor 402, comprises a low-pressure compression stage 20a and a high-pressure compression stage 20b. The low-pressure compressor stage 20a extracts the gaseous fuel from the fuel supply line 21 and compresses the gaseous fuel to the low-pressure fuel delivery line 22. A portion of this compressed fuel is delivered to the low-pressure power cycle through the flow passage 23, while the remainder is further compressed by the high-pressure fuel compressor stage 20b and is delivered to the high-pressure fuel delivery line 26. The high-pressure fuel delivery line 26 passes through the high-pressure fuel preheater HP-FL-HX and then flows through the flow passage 27 to enter the high-pressure combustor $C_1$ where the fuel is mixed and combusted with the high-pressure compressed air stream that enters through the flow passage 17.

The low-pressure fuel line 23 passes through the first low-pressure fuel preheater LP-FL-HX1, and so heated fuel is delivered to the second low-pressure fuel preheater LP-FL-HX2 through the fuel flow passage 24. The heated fuel stream leaves the second fuel reheater LP-FL-HX2 through the flow passage 25 and enters the fuel/steam mixer M, where the fuel stream is mixed with the high-pressure steam, that is fed through the steam line 33a. The mixed stream 51 enters the reformer/pre-reformer REF, where the fuel/steam mixture undergoes the reformation reaction producing a significant amount of hydrogen. Since the reformation reaction is endothermic, the required heat for the reaction may be provided to the reformer REF by the recirculation of the partially-oxidized anode outlet stream 53 through the optional recirculation path 53a. The partially reformed fuel enters the fuel cell anode through the flow passage 52.

The two-stage main cycles begin when the atmospheric air is extracted by the two-stage compressor through the air supply line 1, and the air is compressed in the first stage compressor LPC to a pressure slightly higher than the pressure at which the fuel cell SOFC operates. The first compressor stage LPC delivers the low-pressure compressed air to the flow passage 2. The compressed air stream 2 is then split into two streams, the first of which is delivered to the flow passage 2a to be used in the low-pressure cycle. The second split stream is cooled through the inter-cooler IC and delivered to the inlet flow passage 13 of the high-pressure compressor stage HPC, where the air stream is further compressed to a much higher pressure to be used in the high-pressure cycle.

The high-pressure cycle continues when the high-pressure compressor stage HPC delivers air to the flow passage 14. The high-pressure compressed air stream 14 enters the first high-pressure air heat regenerator HP-LT-HX where the compressed air stream is heated by the hot flue gas stream which flows in the counter-flow direction from the flow passage 56 to flow passage 57. The heated high-pressure air stream 15 is further heated in the second and third high pressure air heat regenerators HP-HT-HX1 and HP-HT-HX2 consecutively, passing through the flow passage 16 connecting the two heat regenerators. The heated high-pressure air stream leaves the heat regenerator HP-HT-HX2 through the flow passage 17 and enters the high-pressure combustor $C_1$ where its temperature is further increased due to the combustion of the fuel stream 27. The resulting hot flue gas stream 37 enters the high-pressure turbine stage HPT where the high-pressure hot flue gas stream expands to a pressure slightly higher than the atmospheric pressure, allowing the turbine rotors to harness the mechanical power. The expanded flue gas stream exits the high-pressure turbine stage HPT through the flow passage 38 which directs the flue gas stream to pass through the third high-pressure air heat regenerator HP-HT-HX2, thereby enabling the regeneration of its heat content to the high-pressure air stream 16. The flue gas stream, having rejected heat, leaves the third high-pressure air heat regenerator HP-HT-HX2 through the flow passage 39, which directs the flue gas stream to pass through the high-pressure fuel preheater HP-FL-HX to preheat fuel and then through the water preheater WAT-HX to preheat water. The flue gas stream, having preheated the water, leaves the water preheater WAT-HX through the flow passage 42, which directs the flue gas stream to enter the second low-pressure air heat regenerator LP-HT-HX. Eventually, the flue gas stream loses its low-temperature heat content in the second low-pressure fuel preheater LP-FL-HX2 by entering the preheater through the flow passage 43 and exiting through the flow passage 44, thereby expelling itself to the atmosphere.

The low-pressure cycle continues when the low-pressure air stream 2a enters the first low-pressure air heat regenerator LP-LT-HX, where the air stream is heated to a certain temperature by the flue gas that flows from the flow passage 57 to the flow passage 58. Then the heated air stream enters the second low-pressure heat regenerator LP-HT-HX through the flow passage 3, where the air stream is further heated by the flue gas that flows from the flow passage 42 to the flow passage 43. The low-pressure air stream, now heated to the temperature which is required to operate the fuel cell, enters the cathode of the fuel cell SOFC through the flow passage 4. In the high-temperature electrolyte of the fuel cell SOFC, the reformed fuel/steam stream 52 and the oxygen in the low-pressure compressed air stream 4 react electrochemically, and a major portion of the fuel undergoes oxidation while the fuel cell produces electricity. As a result, hot partially oxidized fuel exits the anode through the flow passage 53, while the hot compressed air with less oxygen exits the cathode through the flow passage 5. The two streams 5 and 53 are mixed into a post-combustor FC-PC, where the fuel completes the oxidation reaction producing the hot flue gas stream 54.

Figure 22:
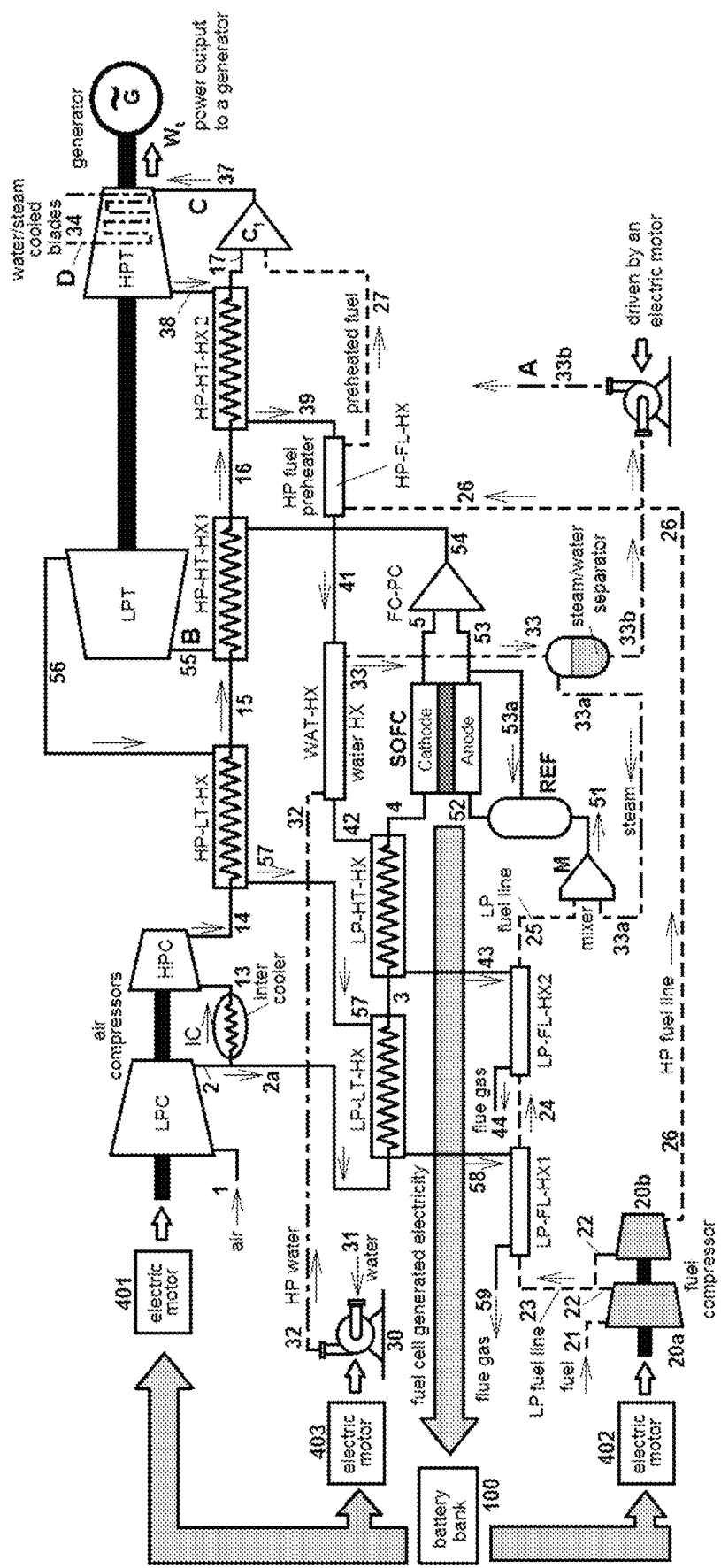
FIG. 22 is a schematic diagram of an Illustrative Embodiment of the invention based on two-stage PATMI power generation scheme with pre-reformer/reformer and three regenerative heat exchangers in the high-pressure gas turbine cycle.

The hot flue gas streams 54 flows through the second high-pressure air heat regenerator HP-HT-HX1 rejecting heat and thereby heating the high-pressure air stream 15. The flue gas stream leaves the regenerator HP-HT-HX1 through the flow passage 55 and enters the low-pressure turbine stage LPT, where the flue gas stream expands to a lower pressure close to the atmospheric pressure, allowing the turbine rotors to harness the mechanical power. As shown in FIG. 22, both turbine stages LPT and HPT can be mounted on the same shaft to drive a single generator G, which converts the mechanical power feed of the two turbine stages to an electrical power output. It should be mentioned here that the workings of the two cycles would not be significantly altered if the two turbine stages were to drive two separate generators.

The expanded flue gas, now at a pressure slightly higher than the atmospheric pressure, leaves the low-pressure turbine stage LPT through the flow passage 56 which directs the flue gas stream to pass through the first high-pressure air heat regenerator HP-LT-HX where the high-pressure air stream 14 is regeneratively heated. The flue gas stream then enters the first low-pressure air heat regenerator LP-LT-HX through the flow passage 57 where much of the heat content of the flue gas stream is used up to regeneratively heat the low-pressure compressed air stream 2a. The flue gas stream leaves the first low-pressure air regenerator LP-LT-HX through the flow passage 58, which directs the flue gas stream to pass through the first low-pressure fuel preheater LP-FL-HX1 where the flue gas stream loses its low-temperature heat content to preheat the low-pressure fuel. Eventually, the flue gas stream expels itself to the atmosphere through the flue passage 59, thus completing the two-stage power cycle.

In accordance with all the PATMI power generating schemes presented thus far, the compressors and pumps in this combined cycle are driven by the electric motors 401, 402, and 403, which are in turn driven by the electricity produced by the fuel cell SOFC, possibly with a battery bank 100 to store electricity. The battery bank 100 accommodates the imbalance of the fuel cell electric power supply and the power consumption of the electric motors.

As FIG. 22 shows, there is a somewhat open feature in this power cycle, which is in reference to the high-pressure water stream 33b (denoted by A). There are a few options one could find to use the high-pressure water stream 33b to optimize the performance of this combined power cycle. The first method is to use the high-pressure water stream to cool the high-temperature blades in the high-pressure turbine stage HPT (see flow paths 34 denoted by D). The steam generated in this manner can be fed into the low-pressure turbine stage LPT as described in reference to Illustrative Embodiment 18, thus increasing the power output of the combined-cycle. The second method is to use the steam generated (see flow path 34) to drive a separate Rankine (steam) cycle turbine, in which case most of the water can be recovered using a condenser and be refed to the power cycle. The third method is to inject this preheated water to the combined cycle at the locations denoted by B and C. This is important if the flue gas streams 55 and/or 37 are extremely hot (say above 1200° C.), and cooling is needed before those streams enter the respective turbine stages.

Illustrative Embodiment 20—Two-Stage PATMI Power Generation Scheme with a Rankine Bottoming Cycle and a Pre-Reformer/Reformer where Bled-Steam from the Rankine Turbine is Used for Fuel Reformation This Illustrative Embodiment differs from Illustrative Embodiments thus far described since this Illustrative Embodiment uses the bled steam from a Rankine steam cycle to reform the fuel prior to entering the fuel cell. Further, the Rankine cycle is partly driven by the regenerative heat harnessed in the high-temperature blade cooling of the high-pressure gas turbine. The workings of this Illustrative Embodiment shown in FIG. 23, can be described as follows. The description first focuses on the gaseous fuel supply circuits and the Rankine cycle, which supplies the bled-steam for reformation of fuel.

The two-stage fuel compressor, which is driven by an electric motor 402, comprises a low-pressure compression stage 20a and a high-pressure compression stage 20b. The low-pressure compressor stage 20a extracts the gaseous fuel from the fuel supply line 21 and compresses the gaseous fuel to the low-pressure fuel delivery line 22. A portion of this compressed fuel is delivered to the low-pressure power cycle through the flow passage 23, while the remainder is further compressed by the high-pressure fuel compressor stage 20b and is delivered to the high-pressure fuel delivery line 26. The high-pressure fuel delivery line 26 passes through the high-pressure fuel preheater FL-HX3 and then flows through the flow passage 27 to enter the high-pressure combustor $C_1$ where the fuel is mixed and combusted with the high-pressure compressed air stream that enters through the flow passage 16.

The low-pressure fuel line 23 passes through the first low-pressure fuel preheater FL-HX1, and so heated fuel is delivered to the second low-pressure fuel preheater FL-HX2 through the fuel flow passage 24. The heated fuel stream leaves the second fuel preheater FL-HX2 through the flow passage 25 and enters the fuel/steam mixer M where the fuel stream is mixed with the high-pressure steam fed through the steam line 35. The mixed stream 28 enters the reformer/pre-reformer REF, where the fuel/steam mixture undergoes the reformation reaction producing a significant amount of hydrogen. Since the reformation reaction is endothermic, the required heat for the reaction may be provided to the reformer REF by the recirculating the anode outlet stream 29 through the optional recirculation path 29a. The partially reformed fuel enters the fuel cell anode through the flow passage 28a.

Figure 23:
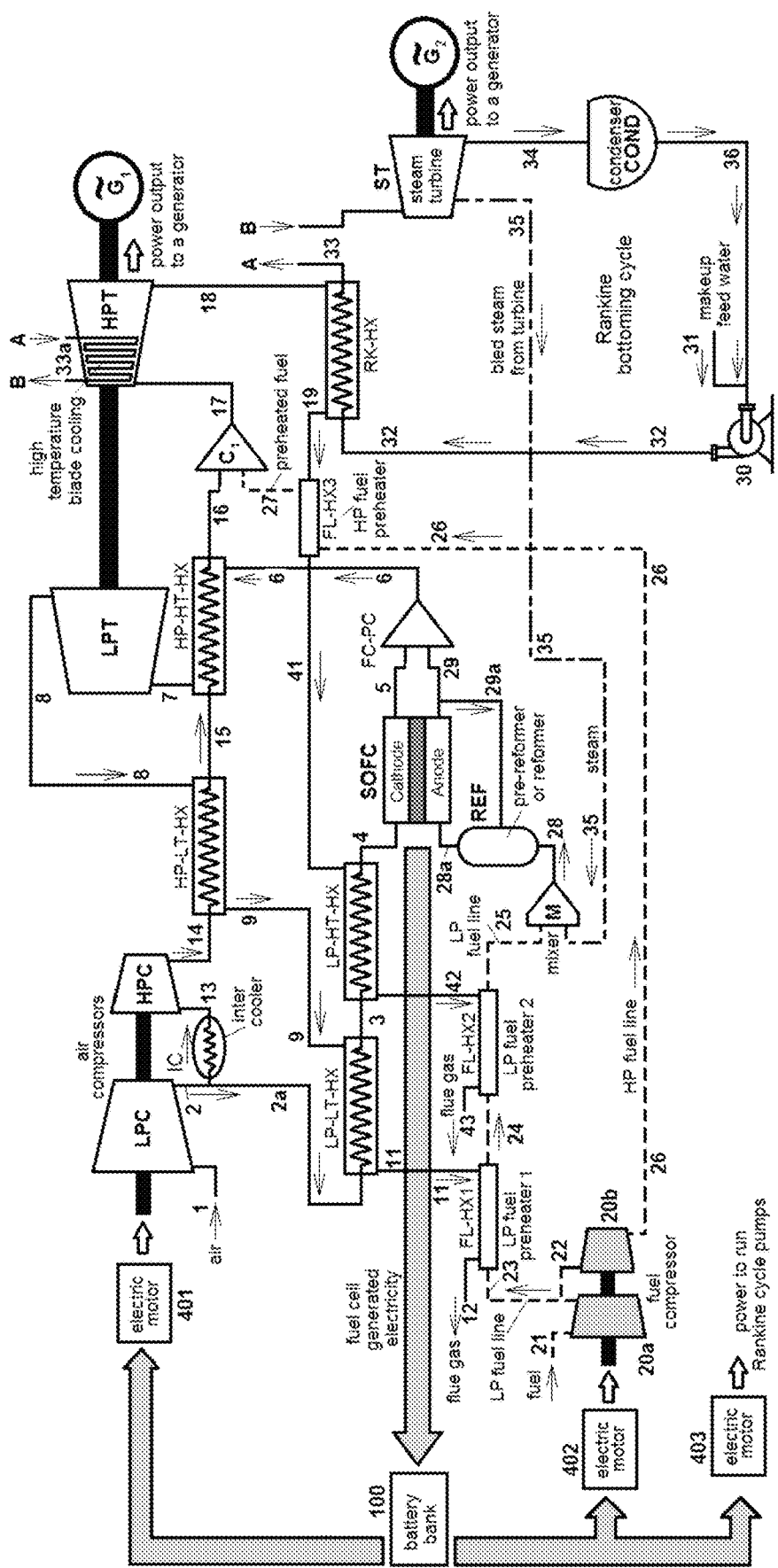
FIG. 23 is a schematic diagram of an Illustrative Embodiment of the invention based on two-stage PATMI power generation scheme with a Rankine bottoming cycle and a pre-reformer/reformer where bled-steam from Rankine turbine is used for fuel reformation.

In this Illustrative Embodiment, the steam feed used in the reformation process is obtained from the Rankine steam cycle shown in FIG. 23. The associated Rankine steam cycle can be described as follows. The water pump 30 extracts the condensate from the Rankine cycle condenser COND and pumps the water to the high-pressure water delivery line 32. The high-pressure water stream 32 passes through the regenerative heat exchanger RK-HX, which acts as a water preheater/boiler. In the heat exchanger RK-HX the water stream 32 is partially vaporized by the heat harnessed from the flue gas stream, which flows from the flow passage 18 to the flow passage 19. The steam stream 33 is diverted (A) to pass through the high-temperature blade cooling passages 33a in the high-pressure gas turbine HPT, thereby further heating the water/steam stream 33, converting it to superheated steam (B). The superheated steam (B) enters the steam turbine ST where the steam progressively expands through the turbine rotor blades to the condenser pressure, allowing the turbine rotors to harness mechanical power, which in turn drives the electricity generator $G_2$. In a certain suitably chosen location based on the pressure in the steam turbine, a portion of the steam is bled-out and diverted through the flow passage 35 to the steam/fuel mixer M to be used in the fuel reformer. The major portion of steam that completes the expansion process in the steam turbine, leaves the turbine and enters the condenser COND through the flow passage 34. In the condenser COND, steam condenses losing its latent-heat content, and the condensate so produced, mixed with the makeup water feed 31 enters the water pump 30 through the flow passage 36, thus completing the Rankine steam cycle.

The two-stage main cycles begin when the atmospheric air is extracted by the two-stage compressor through the air supply line 1, and the air is compressed in the first stage compressor LPC to a pressure slightly higher than the pressure at which the fuel cell SOFC operates. The first compressor stage LPC delivers the low-pressure compressed air to the flow passage 2. The compressed air stream 2 is then split into two streams, the first of which is delivered to the flow passage 2a to be used in the low-pressure cycle. The second split stream is cooled through the inter-cooler IC and delivered to the inlet flow passage 13 of the high-pressure compressor stage HPC, where the air stream is further compressed to a much higher pressure to be used in the high-pressure cycle.

The high-pressure cycle continues when the high-pressure compressor stage HPC delivers air to the flow passage 14. The high-pressure compressed air stream 14 enters the first high-pressure air heat regenerator HP-LT-HX where the compressed air stream is heated by the hot flue gas stream which flows in the counter-flow direction from the flow passage 8 to flow passage 9. The heated high-pressure air stream 15 is further heated in the second high-pressure air heat regenerators HP-HT-HX from the heat regenerated from the flue gas stream, which flows from the flow passage 6 to the flow passage 7. The heated high-pressure air stream leaves the second high-pressure heat regenerator HP-HT-HX through the flow passage 16 and enters the high-pressure combustor $C_1$ where its temperature is further increased by the combustion of the fuel stream 27. The resulting hot flue gas stream 17 enters the high-pressure turbine stage HPT where the high-pressure hot flue gas stream expands to a pressure somewhat higher than the atmospheric pressure, allowing the turbine rotors to harness mechanical power. In this Illustrative Embodiment, the high-pressure turbine stage HPT can operate with a considerably high inlet temperature since the turbine stage HPT is equipped with the blade-cooling passages. Eventually, the expanded flue gas stream exits the high-pressure gas turbine stage HPT through the flow passage 18, which directs the flue gas stream to pass through the bottoming Rankine cycle thermal feed heat exchanger RK-HX, thereby enabling the flue gas stream to regenerate its high-temperature heat content to drive the Rankine steam cycle. The flue gas stream, having rejected heat, leaves the bottoming cycle heat regenerator RK-HX through the flow passage 19, which directs the flue gas stream to pass through the high-pressure fuel preheater FL-HX3 to preheat fuel. The flue gas stream, having preheated the fuel, leaves the high-pressure fuel preheater FL-HX3 through the flow passage 41, which directs the flue gas stream to enter the second low-pressure air heat regenerator LP-HT-HX. Eventually, the flue gas stream loses its low-temperature heat content in the second low-pressure fuel preheater FL-HX2 by entering the fuel preheater through the flow passage 42 and exiting the fuel preheater through the flow passage 43, thereby expelling itself to the atmosphere.

The low-pressure gas turbine cycle continues when the low-pressure air stream $2a$ enters the first low-pressure air heat regenerator LP-LT-HX, where the low-pressure air stream is heated to a certain temperature by the flue gas that flows from the flow passage 9 to the flow passage 11. Then the heated air stream enters the second low-pressure air heat regenerator LP-HT-HX through the flow passage 3, where the air stream is further heated by the flue gas that flows from the flow passage 41 to the flow passage 42. The low-pressure air stream, now heated to the temperature which is required to operate the fuel cell, enters the cathode of the fuel cell SOFC through the flow passage 4. In the high-temperature electrolyte of the fuel cell SOFC the reformed fuel/steam stream $28a$ and the oxygen in the low-pressure compressed air stream 4 react electrochemically, and a major portion of the fuel undergoes oxidation while the fuel cell produces electricity. As a result, hot partially oxidized fuel exits the anode through the flow passage 29, while the hot compressed air with less oxygen exits the cathode through the flow passage 5. The two streams 5 and 29 are mixed into a post-combustor FC-PC, where the fuel completes the oxidation reaction producing the hot flue gas stream 6.

The hot flue gas streams 6 flows through the second high-pressure air heat regenerator HP-HT-HX rejecting heat and thereby heating the high-pressure air stream 15. The flue gas stream leaves the regenerator HP-HT-HX through the flow passage 7 and enters the low-pressure turbine stage LPT where the flue gas stream expands to a lower pressure close to the atmospheric pressure, allowing the turbine rotors to harness the mechanical power. As shown in FIG. 23, both turbine stages LPT and HPT can be mounted on the same shaft to drive a single generator $G_1$, which converts the mechanical power feed of the two turbine stages to an electrical power output. It should be mentioned here that the workings of the two cycles would not be significantly altered if the two turbine stages were to drive two separate generators.

The expanded flue gas, now at a pressure slightly higher than the atmospheric pressure, leaves the low-pressure turbine stage LPT through the flow passage 8 which directs the flue gas stream to pass through the first high-pressure air heat regenerator HP-LT-HX where the high-pressure air stream 14 is regeneratively heated. The flue gas stream then enters the first low-pressure air heat regenerator LP-LT-HX through the flow passage 9 where much of the heat content of the flue gas stream is used up to regeneratively heat the low-pressure compressed air stream $2a$. The flue gas stream leaves the first low-pressure air regenerator LP-LT-HX through the flow passage 11, which directs the flue gas stream to pass through the first low-pressure fuel preheater FL-HX1 where the flue gas stream loses its low-temperature heat content to preheat the low-pressure fuel. Eventually, the flue gas stream expels itself to the atmosphere through the flue passage 12, thus completing the two-stage power cycle.

In accordance with all the PATMI power generating schemes presented thus far, the compressors and pumps in this combined cycle are driven by the electric motors 401, 402, and 403, which are in turn driven by the electricity produced by the fuel cell SOFC, possibly with a battery bank 100 to store electricity. The battery bank 100 accommodates the imbalance of the fuel cell electric power supply and the power consumption of the electric motors.

One noteworthy aspect of this combined-cycle is that the highest pressure in the Rankine steam cycle, which is the pressure of the high-pressure water delivery line, should be higher than the fuel cell operating pressure. It is a necessary condition for steam to be bled from the steam turbine and be used in the reformer of the fuel cell.

Illustrative Embodiment 21—Two-Stage PATMI Power Generation Scheme with a Fuel Cell Located Downstream of the High-Pressure Gas Turbine and Steam Recirculation is Assisted by an Ejector This Illustrative Embodiment differs from the Illustrative Embodiments described thus far since this Illustrative Embodiment has its fuel cell placed in the down-stream of the high-pressure turbine stage. This Illustrative Embodiment also contains an ejector/mixer device to recirculate the fuel cell anode outlet stream to a pre-reformer/reformer. Another noteworthy feature here is that there is no high-pressure fuel circuit because there is no high-pressure combustor in the power scheme. The workings of the Illustrative Embodiment can be described as follows in reference to FIG. 24.

The two-stage main cycles begin when the low-pressure compression stage LPC extracts atmospheric air through the air supply line 1 and compresses air to a pressure slightly higher than the pressure at which the fuel cell SOFC operates. The first compressor stage LPC delivers the low-pressure compressed air to the flow passage 2, which is then split into two streams. The first of these split streams is delivered to the flow passage 2a to be used in the low-pressure cycle, and the second split stream is cooled through the inter-cooler IC and delivered to the inlet flow passage 13 of the high-pressure compressor stage HPC, where the second air stream is further compressed to a much higher pressure to be used in the high-pressure cycle.

The high-pressure cycle continues when the high-pressure compressor stage HPC delivers air to the flow passage 14. The high-pressure compressed air stream 14 enters the first high-pressure air heat regenerator HP-LT-HX where the compressed air stream is heated by the hot flue gas stream which flows in the counter-flow direction from the flow passage 31 to flow passage 32. The heated high-pressure air stream 15 is further heated in the second high-pressure air heat regenerators HP-HT-HX from the heat regenerated from the flue gas stream 27 emitted by the post combustor FC-PC of the fuel cell SOFC, which flows through the regenerator to the flow passage 28. The heated high-pressure air stream leaves the second high-pressure heat regenerator HP-HT-HX through the flow passage 16 and enters the high-pressure turbine stage HPT, where the high-pressure hot flue gas stream expands to the fuel cell operating pressure, allowing the turbine rotors to harness mechanical power. The partially expanded air stream, now at the operating pressure of the fuel cell, leaves the high-pressure turbine stage HPT through the flow passage 17.

The single-stage fuel compressor 20, which is driven by an electric motor 402, extracts the gaseous fuel from the fuel supply line 21, compresses the gaseous fuel to a pressure somewhat higher than the operating pressure of the fuel cell, and delivers it to the main fuel feed line 22. A portion of this compressed fuel branches off from the main fuel feed line 22 to the auxiliary fuel feed line 22a and enters the low-pressure combustor $C_1$, while the remainder of the main fuel feed 22 enters the primary port of the ejector/mixer device EJC-M. The ejector device EJC-M, which acts as a pump, pulls a portion of the anode outlet flue-gas stream 26 through the ejector secondary stream 26a, mixes it with the primary stream 22 inside the ejector, and the mixed stream is delivered to the reformer/pre-reformer REF through the flow passage 24. The objective here is to pull enough flue gas, which contains water vapor and heat, to mix with the primary fuel feed so that the reformation reaction could begin in the pre-reformer/reformer. Eventually the partially reformed fuel enters the fuel cell anode through the flow passage 25.

The low-pressure gas turbine cycle begins when the low-pressure air stream 2a enters the first low-pressure air heat regenerator LP-LT-HX, where the low-pressure air stream is heated to a certain temperature by the flue gas that flows from the flow passage 29 to the flow passage 31. Then a portion of the heated air stream 3 enters the low-pressure combustor $C_1$ where the pressurized auxiliary fuel stream 22a is combusted to generate the high-temperature flue gas stream 4, while the remainder of the heated air stream 3 branches off through the flow passage 3a to be further heated in the second low-pressure air heat regenerator LP-HT-HX. The branched-off air stream 3a is heated using a fraction of the heat content of the hot flue gas stream 4, which is expelled from the combustor $C_1$. The flue gas stream 4, having rejected a portion of its heat, leaves the LP-HT-HX regenerator through the flow passage 5, while the heated low-pressure air stream leaves the regenerator through the flow passage 4a.

One important design feature to highlight here is that the use of the optional heated air stream 4a, generated by heating the air stream 3a; the objective being to get sufficient heat to the fuel cell in case the stream 17 does not have the required temperature to operate the high-temperature SOFC fuel cell.

The heated hot air stream 4a mixed with the hot air stream 17 which exits the high-pressure turbine stage HPT, enters the cathode of the fuel cell SOFC. In the high-temperature electrolyte of the fuel cell SOFC, the reformed fuel/steam stream 25 and the oxygen in the low-pressure compressed air stream 17 (which is now mixed with the air stream 4a) react electrochemically, and a major portion of the fuel undergoes oxidation while the fuel cell produces electricity. As a result, hot partially oxidized fuel exits the anode through the flow passage 26, while the hot compressed air with less oxygen exits the cathode through the flow passage 18. The two outlet streams of the fuel cell 18 and 26 are mixed into a post-combustor FC-PC, where the fuel completes the oxidation reaction producing the hot flue gas stream 27.

Figure 24:
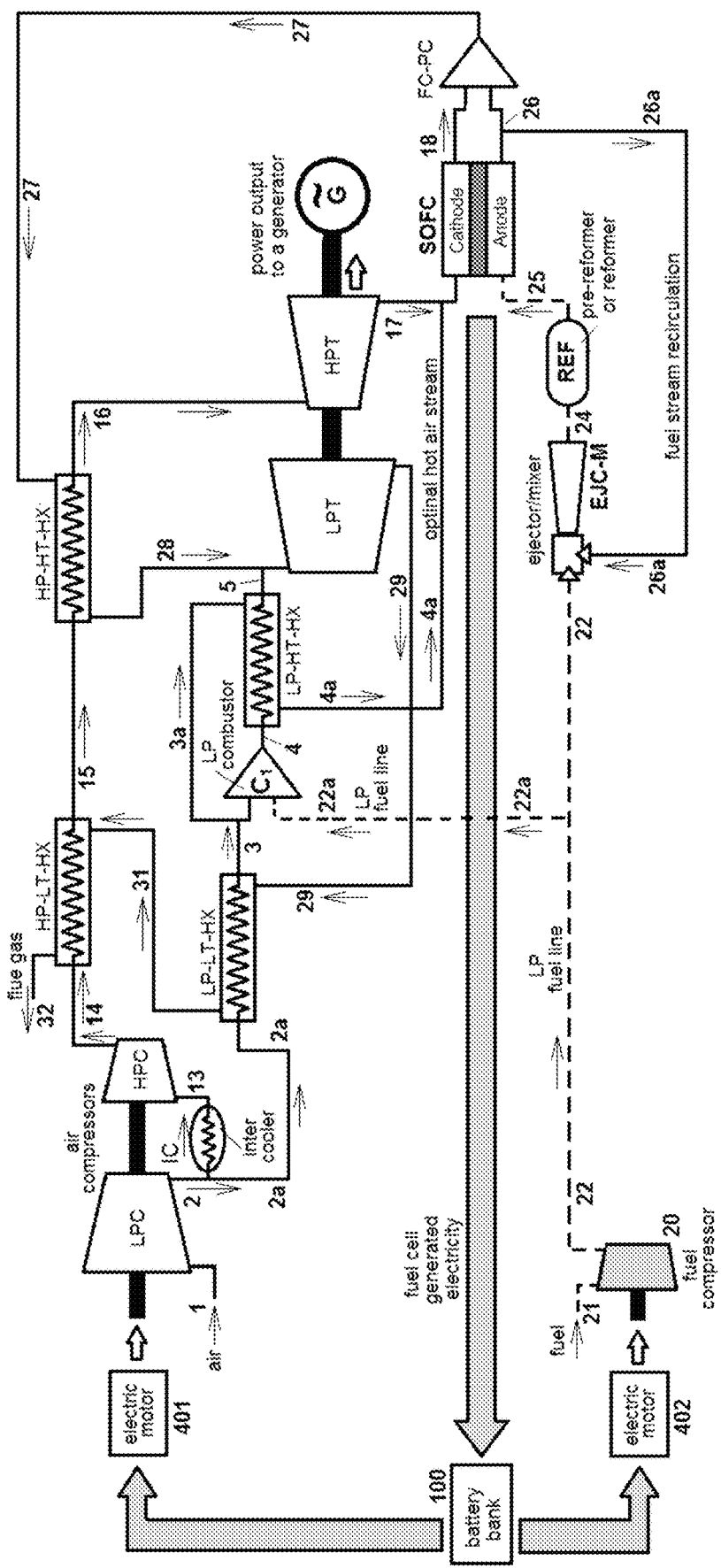
FIG. 24 is a schematic diagram of an Illustrative Embodiment of the invention based on two-stage PATMI power generation scheme with a fuel cell located downstream of the high-pressure gas turbine and steam recirculation is assisted by an ejector.

The hot flue gas streams 27 flows through the second high-pressure air heat regenerator HP-HT-HX rejecting heat and thereby heating the high-pressure air stream 15. The flue gas stream leaves the regenerator HP-HT-HX through the flow passage 28, which is then mixed with the hot flue gas stream 5, and the combined flue gas streams enter the low-pressure turbine stage LPT. In the low-pressure turbine stage, the flue gas stream expands to a lower pressure close to the atmospheric pressure, allowing the turbine rotors to harness the mechanical power. As shown in FIG. 24, both turbine stages LPT and HPT can be mounted on the same shaft to drive a single generator G, which converts the mechanical power output of the two turbine stages to an electrical power output. It should be mentioned here that the workings of the two cycles would not be significantly altered, but may provide some design flexibility, if the two turbine stages were to drive two separate generators.

The expanded flue gas, now at a pressure slightly higher than the atmospheric pressure, leaves the low-pressure turbine stage LPT through the flow passage 29 which directs the flue gas stream to pass through the first low-pressure air heat regenerator LP-LT-HX where the low-pressure air stream 2a is regeneratively heated. The flue gas stream then enters the first high-pressure air heat regenerator HP-LT-HX through the flow passage 31 where much of the heat content of the flue gas stream is used up to regeneratively heat the high-pressure compressed air stream 14. Eventually, the flue gas stream leaves the first high-pressure air regenerator HP-LT-HX through the flow passage 32, and expels itself to the atmosphere, thus completing the two-stage power cycle.

In accordance with all the PATMI power generating schemes presented thus far, the air and fuel compressors in this combined cycle are driven by the electric motors 401 and 402, which are in turn driven by the electricity produced by the fuel cell SOFC, possibly with a battery bank 100 to store electricity. The battery bank 100 accommodates the imbalance of the fuel cell electric power supply and the power consumption of the electric motors.

Illustrative Embodiment 22—Two-Stage PATMI Power Generation Scheme with a Reformer and an Advanced Rankine Bottoming Cycle Having Steam Reheating This Illustrative Embodiment consists of a two-stage gas turbine cycle and an advanced Rankine bottoming cycle.

The two-stage gas turbine cycle operates very similar to the Illustrative Embodiment 16 as it comprises a gaseous fuel feed, a water/steam feed, and a reformer/pre-reformer. In this Illustrative Embodiment, the gaseous fuel is fed through two flow circuits which operate at two pressure levels; the first of which is a low-pressure fuel feed to drive the low-pressure power cycle, that also includes the fuel cell. The second is a high-pressure fuel feed to power the high-pressure power cycle. The workings of this gas-turbine/steam-turbine combined cycle can be described as follows with reference to FIG. 25. Since this Illustrative Embodiment has two auxiliary flow layouts for a gaseous fuel (such as natural gas) feed and a water/steam feed, the description begins by emphasizing the operation of the two auxiliary layouts, prior to presenting the descriptions of the main two-stage gas-turbine cycle and the advanced Rankine cycle.

The electric motor 403 drives a water pump 30 which pumps atmospheric water extracted from the water supply line 31 to the high-pressure water delivery line 32. The high-pressure water flows through the water preheater/boiler heat exchanger $HX_6$ where the water is converted to high-pressure steam. The generated steam is fed through the flow line 33 (see location A) to a fuel/steam mixer M where the high-pressure steam is mixed with a gaseous high-pressure fuel.

The two-stage fuel compressor, which is driven by an electric motor 402, comprises a low-pressure compression stage 20a and a high-pressure compression stage 20b. The low-pressure compressor stage 20a extracts the gaseous fuel from the fuel supply line 21 and compresses the fuel to the low-pressure fuel delivery line 22. A portion of this compressed fuel is delivered to the low-pressure power cycle through the flow passage 23, while the remainder is further compressed by the high-pressure compressor stage 20b and is delivered to the high-pressure fuel delivery line 26. The high-pressure fuel delivery line 26 passes through the first high-pressure fuel preheater $HX_4$ and then flows through the flow passage 27 to enter the second high-pressure fuel preheater $HX_1$ where the high-pressure fuel stream is further heated before the fuel stream enters the high-pressure combustor $C_1$ through the flow passage 28.

The low-pressure fuel line 23 passes through the first low-pressure fuel preheater $HX_5$, and so heated fuel is delivered to the second low-pressure fuel preheater $HX_2$ through the fuel flow passage 24. The heated fuel stream leaves the second fuel reheater $HX_2$ through the flow passage 25, which is then split into two streams 25a and 25b. The fuel stream 25b enters the low-pressure combustor $C_2$, while the other fuel stream 25a enters the fuel/steam mixer M where the fuel stream is mixed with the high-pressure steam fed through the steam line 33. The mixed stream 35 enters the reformer REF, where the fuel/steam mixture undergoes the reformation reaction producing a significant amount of hydrogen. Since the reformation reaction is endothermic, the required heat of the reaction may be provided to the reformer REF by partially recirculating the anode output stream 37 through the optional recirculation path 35a. The partially reformed fuel enters the fuel cell anode through the flow passage 36.

The two-stage gas-turbine cycle begins when the atmospheric air is extracted by the two-stage compressor through the air supply line 1, and the air is compressed in the first-stage low-pressure compressor LPC to a pressure slightly higher than the fuel cell SOFC operating pressure. The first compressor stage LPC delivers the low-pressure compressed air to the flow passage 2. The low-pressure compressed air stream 2 is then split into two streams, the first of which is delivered to the flow passage 2a to be used in the low-pressure gas-turbine cycle. The second split stream is cooled through the inter-cooler IC and delivered to the inlet flow passage 13 of the high-pressure compressor stage HPC, where the air stream is further compressed to a much higher pressure to be used in the high-pressure gas-turbine cycle.

The high-pressure gas-turbine cycle continues when the high-pressure compressor stage HPC delivers air to the flow passage 14. The high-pressure compressed air stream 14 enters the high-pressure regenerator REG where the compressed air stream is heated by the hot flue gas stream which flows in the counter-flow direction from the flow passage 45 to flow passage 46. The heated air stream 15 enters the high-pressure combustor $C_1$ where its temperature is further increased by the combustion of the fuel stream 28. The resulting extremely hot flue gas stream 16 enters the high-pressure turbine stage HPT where the high-pressure hot flue gas stream expands to a pressure slightly higher than the inlet pressure of the low-pressure turbine LPT, allowing the turbine rotors to harness mechanical power. The expanded flue gas stream exits the high-pressure turbine stage HPT through the flow passage 17, which directs the flue gas stream to mix with the flow stream 39 and enter the low-pressure gas turbine stage LPT.

The low-pressure gas-turbine cycle continues when the low-pressure air stream 2a enters the first low-pressure air preheater $HX_3$ where the air is heated to a certain temperature. The preheated low-pressure air stream leaves the first low-pressure air preheater through the flow passage 3 which is then split into two streams 3a and 3b. The first split low-pressure air stream 3a enters the cathode of the fuel cell SOFC to power the fuel cell, while the second split low-pressure air stream 3b enters low-pressure combustor $C_2$ where the fuel fed through the fuel line 25b undergoes the combustion reaction to form a hot flue gas stream 4b.

Figure 25:
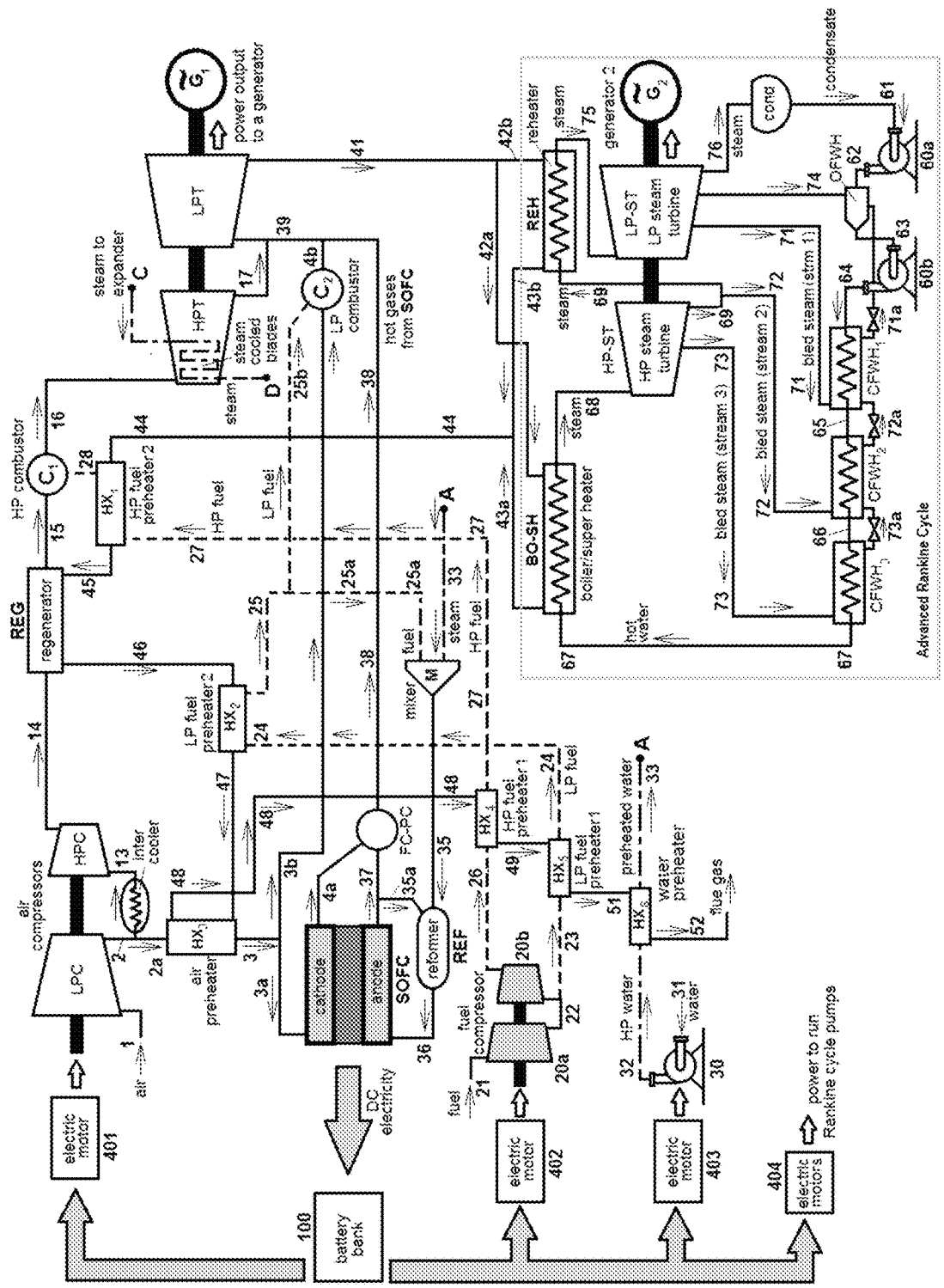
FIG. 25 is a schematic diagram of an Illustrative Embodiment of the invention based on two-stage PATMI power generation scheme with a reformer and an advanced Rankine bottoming cycle having steam reheating.

In the high-temperature electrolyte of the fuel cell SOFC, the gaseous fuel that enters through the flow passage 36 and the oxygen in the low-pressure compressed air stream 3a react electrochemically, and a major portion of the fuel undergoes oxidation while the fuel cell produces electricity. As a result, hot partially oxidized fuel exits the anode through the flow passage 37, while the hot compressed air with less oxygen exits the cathode through the flow passage 4a. The two streams 4a and 37 are mixed into a post-combustor FC-PC, where the fuel oxidation reaction comes to a completion. The resulting high-temperature flue gas stream exits the post-combustor FC-PC through the flow passage 38. The hot flue gas stream 38, which is combined with the flue gas streams 17 and 4b to form the mixed stream 39. The combined flue gas stream 39 enters the low-pressure turbine stage LPT where the combined flue gas stream expands to a lower pressure close to the atmospheric pressure, allowing the turbine rotors to harness and deliver mechanical power. As shown in FIG. 25 both turbine stages can be mounted on the same shaft to drive a single generator $G_1$, which converts the mechanical power feed of the two gas turbine stages to an electrical power output. It should be mentioned here that the workings of the two cycles will not be significantly altered if the two turbine stages were to drive two separate generators.

The expanded flue gas, now at a pressure slightly higher than the atmospheric pressure, leaves the low-pressure turbine stage LPT through the flow passage 41. The flue gas stream 41 is then split into two parallel streams 42a and 42b to form two parallel thermal feeds to the bottoming advanced Rankine cycle, the workings of which will be described shortly. The returning flue gas lines 43a and 43b from the advanced Rankine cycle thermal feed then are combined to form a single flue gas stream 44, which is directed to pass through the second high-pressure fuel preheater $HX_1$ to preheat the high-pressure fuel stream 28. The flue gas stream, having passed through the second high-pressure fuel preheater $HX_1$, enters the high-pressure air regenerator REG through the flow passage 45 where much of the heat content of the flue gas stream is used up to regeneratively heat the high-pressure compressed air stream 14. The flue gas stream leaves the high-pressure air regenerator REG through the flow passage 46, which directs the flue gas stream to pass through the rest of the regenerative heat exchanges: the second low-pressure fuel preheater $HX_2$; the low-pressure air preheater $HX_3$; the first high-pressure fuel preheater $HX_4$; the first low-pressure fuel preheater $HX_5$; and the water boiler $HX_6$, in that sequence, directed by the flow passages 46, 47, 48, 49, and 51 respectively. Eventually, the flue gas stream expels itself to the atmosphere through the flue passage 52, thus completing the two-stage gas-turbine power cycle.

The bottoming advanced Rankine cycle shown in FIG. 25 has two steam turbine stages, in between which, the steam is reheated. There are four steam bleeding locations in this power cycle. The first high-pressure steam bleeding point is placed in the high-pressure turbine stage, and two more steam bleeding points are placed in the low-pressure turbine stage. The fourth steam bleeding point is placed at the inlet to the steam reheater, which is placed in between the two turbine stages. The first three high-pressure feed water heaters are of the closed types, while the last low-pressure feed water heater is an open type. Since the pressure of steam along the turbine progressively drops from turbine upstream to the turbine downstream, the feed water heaters operate at progressively-reducing pressures corresponding to the bleeding points of the turbines.

The workings of the proposed advanced Rankine power scheme can be described with reference to FIG. 25 as follows. The first-stage pump 60a extracts condensed water from the condenser COND through the water suction line 61 and pumps the water to the open feed water heater OFWH through the water feedline 62. In the open feed water heater OFWH, the water is heated to a certain degree by mixing it with the bled steam, which enters through the bleed line 74. The second-stage pump 60b extracts water from the open feed water heater OFWH, through the second-stage pump suction line 63 and pumps through the three closed feed water heaters CFWH1, CFWH2, and CFWH3, through the flowlines 64, 65, and 66 respectively. In the three closed feed water heaters, the water is progressively heated regeneratively by the heat harnessed from the bled-steam streams 71, 72, and 73, which reject their latent heat and the steam condenses inside the closed feed water heaters. The condensed water inside each closed feed water heater flashes through their individual throttle valve into the adjacent low-pressure feed water heater. Thus, the condensed water in the feed water heater CFWH3 flashes through the throttle valve 73a into the feed water heater CFWH2 and condenses in CFWH2 further rejecting heat; the condensed water in the feed water heater CFWH2 flashes through the throttle valve 72a into the feed water heater CFWH1 and condenses in CFWH1 further rejecting heat. The last step of the condensed water flashing occurs when the condensed water in the closed feed water heater CFWH1 flashes through the throttle valve 71a into the open feed water heater OFWH where the condensate is mixed with the main water feed 63.

Eventually, the heated feed water stream 67 enters the boiler/superheater BO-SH where water is vaporized and steam is generated by the heat rejected from the first thermal feed (flue gas feed from 42a to 43a) of the gas-turbine cycle. The generated steam enters the high-pressure steam turbine stage HPST and expands allowing the turbine rotors to harness mechanical power. During the expansion process that occurs in HPST, a minute amount of steam is bled through the bleed line 73 and is fed to the closed feed water heater CFWH3. The remainder of the steam expands in the high-pressure turbine stage HPST and is directed to the reheater REH through the flow passage 69. At the steam inlet of the reheater REH, another minute amount of steam is bled through the bleed line 72 and is fed to the closed feed water heater CFWH2. The remainder of the steam flows through the steam reheater feedline 69 and enters the reheater REH to be heated by the second thermal feed (flue gas feed from 42b to 43b) of the gas-turbine cycle. The reheated steam leaves the reheater through the flow passage 75 and enters the low-pressure steam turbine stage LPST, where the steam expands further allowing the turbine rotors to harness mechanical power.

As shown in FIG. 25, the two steam turbine stages HPST and LPST can be mounted on the same shaft to drive a single generator $G_2$, in order to achieve some design flexibility. The steam that expands in the low-pressure steam turbine stage LPST is bled at two bleed locations. The first is bled through the bleed line 71 and is fed to the closed feed water heater CFWH1, and the second is bled through the bleed line 74 and is fed to the open feed water heater OFWH. Eventually, the steam expands in the low-pressure steam turbine stage LPST until its pressure equals the condenser pressure, exits the turbine, and enters the condenser through the flow passage 76. In the condenser, steam condenses rejecting its latent heat forming the condensate, thus completing the advanced Rankine cycle.

One noteworthy aspect of this combined cycle power scheme is that, as shown in FIG. 25, blade cooling can be incorporated (shown as the open flow path C to D in FIG. 25) in the high-pressure gas turbine stage, thereby increasing the inlet temperature of the high-pressure gas turbine stage. This design feature gives an added advantage as this thermal feed could be used to supplement one of the thermal feeds of the bottoming Rankine cycle, thereby enhancing the performance of the combined cycle.

In accordance with all the PATMI power generating schemes presented thus far, all compressors and pumps in this combined cycle, including the pumps in the advanced Rankine cycle, are driven by the electric motors 401, 402, 403, and 404, which are in turn driven by the electricity produced by the fuel cell SOFC, possibly with a battery bank 100 to store electricity. The battery bank 100 accommodates the imbalance of the fuel cell electric power supply and the power consumption of the electric motors.

Illustrative Embodiment 23—Three-Stage PATMI Power Generation Scheme with Two-Series Brayton/sCO$_2$ Bottoming Cycles This Illustrative Embodiment is very similar to the Illustrative Embodiment 13 described previously; however, this Illustrative Embodiment is a triple-combined cycle, which comprises of three independent cycles in cascade, forming two sets of topping-bottoming-cycle pairs. The top-most cycle (the primary cycle) is a fuel cell integrated gas-turbine plant, which resembles the Illustrative Embodiment 13. Its bottoming-cycle (the secondary cycle) is an independent Brayton cycle, which is partly powered by the heat rejected by the primary cycle. The second bottoming-cycle (the tertiary cycle) is a split-flow recompression supercritical carbon dioxide (sCO$_2$) cycle which is fully driven by a thermal feed from the secondary cycle.

Figure 26:
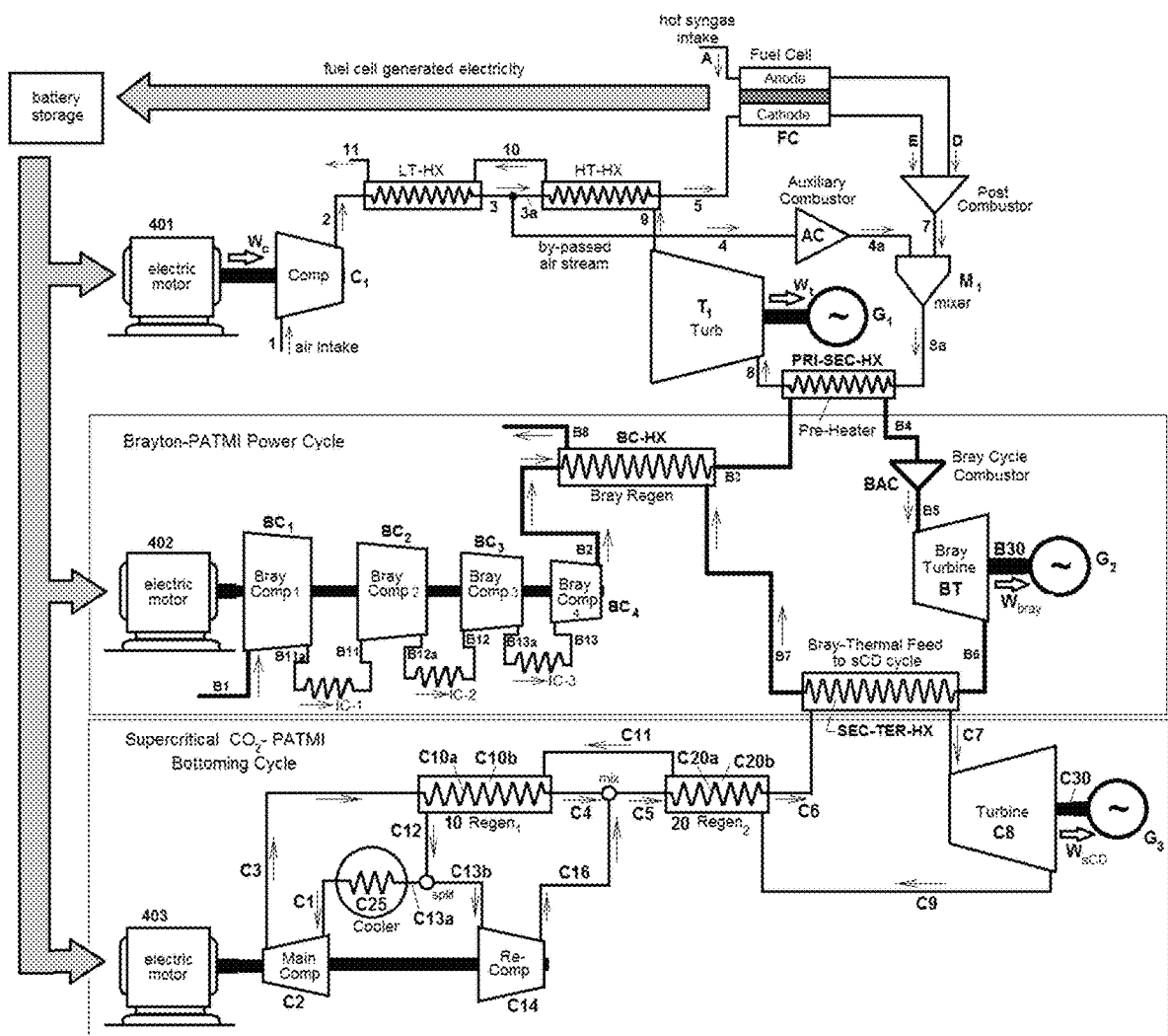
FIG. 26 is a schematic diagram of an Illustrative Embodiment of the invention based on three-stage PATMI power generation scheme with two-series Brayton/sCO$_2$ bottoming cycles.

The workings of the triple-combined cycle can be described as follows in reference to FIG. 26. The primary cycle begins when the compressor $C_1$ extracts atmospheric air from its intake line 1 and compresses air to a pressure just above the operating pressure of the fuel cell FC. The compressor $C_1$ delivers the compressed air stream, now at a temperature somewhat higher than the ambient temperature, to the flow passage 2. The air stream 2 then enters the low-temperature heat exchanger LT-HX to be heated by the regenerated heat. As shown in FIG. 26, the compressed air stream 2 is heated regeneratively as it passes through the two counter-flow heat exchangers LT-HX and HT-HX, which are placed in series. The compressed air stream 2 is first heated as it passes through the low-temperature first-stage heat exchanger LT-HX by the relatively cooler flue gas stream which flows from the flow passage 10 to the flow passage 11. The heated compressed air stream exits the heat exchanger through the flow passage 3. The compressed air stream 3 is then split into two streams, one of which flows through the by-pass flow passage 4, and the other stream 3a is further heated as it passes through the high-temperature second-stage heat exchanger HT-HX by the relatively hotter flue gas stream which flows from the flow passage 9 to the flow passage 10. The heated compressed air stream is fed to the cathode of the fuel cell FC through the flow passage 5. The fuel, in this case hot syngas, generated from an incineration process and subsequently filtered to remove all undesirable constituents, is fed to the anode of the fuel cell FC through the flow passage A.

In the high-temperature electrolyte of the fuel cell FC, the gaseous fuel and the oxygen in the compressed air stream 5 react electrochemically, and a portion of the fuel undergoes oxidation while the fuel cell produces electricity. As a result, hot partially oxidized fuel exits the anode through the flow passage D, while the hot compressed air with less oxygen exits the cathode through the flow passage E. The two streams D and E are mixed into a post-combustor PC, where the fuel is allowed to complete the oxidation reaction. The resulting high-temperature flue gas stream exits the post-combustor PC through the flow passage 7. As mentioned with reference to the Illustrative Embodiment 10, the temperature of the stream 7 depends on the fuel utilization factor of the fuel cell FC.

The bypassed compressed air stream 4 is directed through an auxiliary combustor AC to increase its temperature to a desired value and consequently exits through the flow passage 4a. The hot flue gas mixed stream 7 and the heated by-pass compressed air stream 4a are then combined and mixed in a static mixing device $M_1$ to form a mixed hot flue gas stream 8a. The flue gas stream 8a is then fed to the heat exchanger PRI-SEC-HX to harness a portion of its heat content to the secondary power cycle. The stream 8a, having been cooled in the heat exchanger PRI-SEC-HX to a certain degree, leaves the heat exchanger through the flow passage 8. The flue gas stream 8 enters the turbine $T_1$, where the stream expands to a lower pressure close to the atmospheric pressure allowing the turbine rotors to harness the mechanical power. The power harnessed by the turbine rotors drives the electric generator $G_1$, which converts the mechanical power output of the turbine to electricity. Eventually, the flue gas, now at a pressure very close to the atmospheric pressure, leaves the turbine through the flow passage 9, and the stream passes through the heat exchangers HT-HX and LT-HX, in that sequence, passing through the flow passages 10 and 11 to regeneratively heat the counter-flow compressed air stream 2 to produce the hot air stream 5. The primary power cycle completes when the flue-gas stream expels itself to the atmosphere through the flow passage 11.

The secondary Brayton cycle begins when the Low-pressure, first compression stage $BC_1$ extracts atmospheric air through the air-intake B1. The first compression stage raises the pressure of the air to a certain level and delivers to the first inter-cooler stage IC-1. Having cooled in the first inter-cooler stage IC-1, the partially compressed air then enters the second stage compressor $BC_2$. In this manner the air is progressively compressed while it is cooled in the inter-cooler stages IC-2 and IC-3 between the compression stages $BC_2$ and $BC_3$. The compression process is completed when the air stream is compressed in the last compression stage $BC_4$, after passing through the inter-cooler IC-3 and enters the flow passage B2. The flow passage B2 directs the compressed air stream to the first regenerative heat exchanger BC-HX. In the heat exchanger BC-HX, the air stream is heated by the hot flue gas stream which enters from the flow passage B7 and flows in the counter-flow direction rejecting heat. The compressed air stream leaves the heat exchanger BC-HX through the flow passage B3, with its temperature being raised to a certain high temperature. The flow passage B3 directs the compressed air stream to the topping-cycle heat regenerator PRI-SEC-HX where the secondary cycle air stream is further heated with the heat rejected by the primary cycle flue gas stream, which flows from the flow passage 8a to the flow passage 8.

Having heated the compressed air stream in the heat exchanger PRI-SEC-HX, the air stream flows into the fuel combustor BAC, where the compressed air stream is further heated by combusting a suitable fuel in the air stream. The combustion of fuel in the air stream converts the compressed air stream B4 to a hot flue gas stream B5, which exits the combustor at the highest temperature of the secondary cycle and enters the secondary cycle turbine BT. In the turbine BT the high-pressure, high-temperature flue gas stream expands, while the turbine rotors harness the mechanical power from the expanding gas, enabling the turbine rotors to drive the electric generator $G_2$, thus producing electricity. The expanded flue gas stream leaves the turbine BT through the flow passage B6 and enters the regenerative heat exchanger SEC-TER-HX, which provides the thermal feed to the supercritical carbon-dioxide tertiary cycle. In the heat exchanger SEC-TER-HX, the flue gas stream decreases its temperature by rejecting heat, and so cooled flue gas stream leaves the heat exchanger SEC-TER-HX through the flow passage B7 and enters the first regenerative heat exchanger BC-HX to provide heat to the compressed air stream B2 as described earlier. Eventually, the flue gas stream leaves the heat exchanger BC-HX through the flow passage B8 and expels itself to the atmosphere completing the secondary cycle.

The tertiary cycle is a split-flow recompression sCO$_2$ cycle operates as described under the Illustrative Embodiment 9(b). The tertiary cycle shown in FIG. 26 gets its sole thermal feed from the secondary cycle from the SEC-TER-HX heat exchanger.

In accordance with all the PATMI power generating schemes presented thus far, the compressors in this triple-combined cycle are driven by the electric motors 401, 402, and 403; they are in turn driven by the electricity produced by the fuel cell FC in the primary cycle, possibly with a battery bank 100 to store electricity. The battery bank 100 accommodates the imbalance of the fuel cell electric power supply and the power consumption of the electric motors.

There are several noteworthy points in this Illustrative Embodiment. The first point is that the pressure ratio of the primary cycle is determined by the fuel cell operation pressure. Since high-pressure SOFC fuel cells work in the range 350-400 kPa, the typical pressure ratio range of the primary cycle is 3.5-4.5. The second noteworthy point is that the pressure ratio of the secondary cycle turbine needs to be determined in relation to two factors; the first factor is the temperature of the turbine input stream B5. The second factor is the temperature of the stream C7 of the tertiary cycle. Typically, the tertiary $sCO_2$ cycle to perform optimally, its maximum temperature, which is at the turbine inlet, should be around 650-700° C.

In the disclosure, the phrases "near-atmospheric pressure" and "near-fuel cell operating pressure" are commonly used in the following context. The pressure drops across expanders are very significant. In a typical turbine expander, the pressure drop is such that the ratio between inlet to outlet pressure will be in 2-10 range. However, the pressure drops in many heat exchanges are not that significant. Typical well-designed heat-exchanger flow passages have pressure drops in the range 3-10% of the inlet pressure depending on the number of heat-exchanger flow passages that are placed in series.

Therefore, in the instances where a gas expands in an expander and passes through a number of heat exchanger passages before the gas is expelled to the atmosphere, the phrase "the gas expands to near-atmospheric pressure" is used in some embodiments to mean that at the outlet of the expander, the gas pressure is 3-10% higher than the atmospheric pressure to allow the pressure drop across the heat-exchangers in the downstream of the expander.

Similarly, in the instances where a gas expands in an expander and passes through a number of heat exchanger passages before the gas enters a fuel cell or the gas is mixed with the another gaseous stream expelled by a fuel cell, the phrase "the gas expands to near-operating pressure of the fuel cell" is used in some embodiments to mean that at the outlet of the expander, the gas pressure is 3-10% higher than the fuel cell operating pressure to allow the pressure drop across the heat-exchanger flow passages.

It should be highlighted that any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A power generation system, comprising:
a first subsystem, the first subsystem including one or more mechanical work-consuming components, and the one or more mechanical work-consuming components including at least one compressor or one pump;
a second subsystem, the second subsystem including one or more components that output mechanical work, and the one or more components that output mechanical work including at least one expander;
a third subsystem, the third subsystem including one or more heat-consuming components, and the one or more heat-consuming components including at least one heat exchanger with an external thermal feed to the power generation system; and
a fourth subsystem, the fourth subsystem including one or more heat sinks in the power generation system which dissipate heat to the surroundings, the one or more heat sinks including a single heat sink or flue gas outlet;
wherein the first, second, third, and fourth subsystems are configured to interact with each other by exchanging matter from one or more working fluids and by exchanging heat, such that the first, second, third, and fourth subsystems cooperate to maximize energy conversion efficiency; and
wherein, when the power generation system is in operation for a particular finite time period, the first subsystem consumes $W_{in}$ quantity of mechanical work from one or more external sources, the third subsystem consumes Q quantity of heat from one or more external sources, while the second subsystem outputs $W_{out}$ quantity of mechanical work, such that the energy conversion efficiency of the power generation system is given by: $W_{out}/(W_{in}+Q)$.

2. The power generation system according to claim 1, wherein the consumed mechanical work ($W_{in}$) by the first subsystem is supplied by a renewable energy field comprising wind electric generators, solar photovoltaic electricity generators, hydrogen gas generators, and/or fuel cell electric generators; and the output mechanical work ($W_{out}$) of the second subsystem is utilized to generate electric power to an electric network which in turn drives electric loads.

3. The power generation system according to claim 2, wherein a portion of the consumed heat (Q) by the third subsystem is supplied by external heat sources, the external heat sources including solar thermal collectors, geo-thermal sources, and/or any other renewable energy driven process in which heat is liberated as a byproduct.

4. The power generation system according to claim 3, wherein the power generation system exchanges the one or more working fluids with exterior surroundings, and the fourth subsystem dissipates heat to the exterior surroundings by releasing the one or more working fluids to the exterior surroundings, thus operating in an open cycle.

5. The power generation system according to claim 4, wherein the first subsystem comprises one or more compressors which extract atmospheric air, and the one or more compressors compress the atmospheric air to pressures higher than atmospheric pressure; and the at least one expander of the second subsystem comprises one or more rotary or reciprocating expanders configured to expand heated compressed air delivered by the third subsystem, thus forming a low-pressure power cycle.

6. The power generation system according to claim 5, wherein a portion of the consumed heat (Q) in the third subsystem is supplied internally by combusting environmentally-friendly fuels in suitably designed combustion chambers.

7. The power generation system according to claim 6, wherein the power generation system comprises a first set of one or more compressors that form part of the first subsystem, a first set of one or more expanders that form part of the second subsystem, cold-flow passages of a first set of one or more heat regenerators that form part of the third subsystem where the working fluid gains heat, and hot-flow passages of the first set of the one or more heat regenerators that form part of the fourth subsystem where the working fluid rejects heat; and the power generation system further comprises one or more fuel cells which operate at a fuel cell operating pressure, the one or more fuel cells generate direct current (DC) electricity to power electrical motors to drive all the mechanical work-consuming components;

wherein the first set of one or more compressors extract atmospheric air, compress the atmospheric air to produce a compressed air stream, and the one or more compressors deliver the compressed air stream at a pressure just above the fuel operating pressure of the one or more fuel cells.

8. The power generation system according to claim 7, wherein the power generation system comprises a second set of one or more compressors that form part of the first subsystem, a second set of one or more heat regenerators with cold passages and hot passages that form parts of the third and fourth subsystems respectively, a second set of one or more expanders that form part of the second subsystem, and an intercooler device that belongs to the fourth subsystem;

wherein an air stream extracted from an outlet of the first set of compressors is externally cooled as the air stream flows through the intercooler, so the cooled air stream is further compressed to a higher pressure in the second set of one or more compressors, so the compressed air stream is fed to the cold-passages of the second set of heat regenerators so that the air stream flows from the lowest temperature heat regenerator to the highest temperature heat regenerator in the sequence of progressively increasing temperature, so that heated air is allowed to expand in the second set of one or more expanders, the expanded air stream then passing through the hot-passages of the first and the second set of the heat regenerators from the highest temperature heat regenerator to the lowest temperature heat regenerator in the sequence of progressively decreasing temperature, thus forming a second high-pressure power cycle which is integrated to the low-pressure power cycle; and wherein the direct current (DC) electricity generated by the one or more fuel cells drives the first and the second sets of the one or more compressors.

9. The power generation system according to claim 8, wherein the power generation system comprises a third set of heat regenerators, the high-pressure air stream heated by the second set of heat regenerators in the high-pressure cycle is further heated as the high-pressure air stream passes through the cold-passages of the third set of regenerators by low-pressure cycle flue gases passing through hot-passages of the third set of regenerators, thus forming a thermal feed from the low-pressure cycle to the high-pressure cycle.

10. The power generation system according to claim 9, wherein the first set of one or more compressors delivers compressed air to the cold-flow passages of the first set of one or more heat regenerators so that heated compressed air is fed to cathode flow passages of the one or more fuel cells, while a compressed and heated gaseous fuel is fed to anode flow passages of the one or more fuel cells, the one or more fuel cells generate electricity by electrolytic oxidation reaction that takes place in the fuel cell electrolyte layer at a high temperature, between a portion of the fuel fed to the anode flow passages and a portion of the oxygen in the compressed air stream fed to the cathode flow passages; and wherein the hot gas streams expelled by the anode and cathode flow passages are fed to a post-combustor where the unreacted fuel is allowed to complete its oxidation reaction by combining with the oxygen in the hot compressed air stream, the post combustor thus expels a hot flue gas stream comprising the combustion products.

11. The power generation system according to claim 10, wherein the low-pressure flue gas stream expelled by the post-combustor passes through the third set of heat regenerators, thus rejecting heat to the high-pressure cycle;

wherein the low-pressure flue gas stream expelled by the third set of heat regenerators is fed to the first set of the one or more expanders, the first set of the one or more expanders producing mechanical power in turn to drive one or more alternating current (AC) electricity generators, the flue gas expands in the one or more expanders to near-atmospheric pressure;

wherein the expanded flue gases expelled by the first set of one or more expanders pass through the hot passages of the first set of heat regenerators in a series arrangement from the highest temperature regenerator to the lowest temperature regenerator; and wherein the flue gas stream having rejected heat, now at near-atmospheric pressure escapes to the atmosphere, thus forming the low-pressure power cycle.

12. The power generation system according to claim 10, wherein the flue gas stream expelled by the post-combustor is fed to the first set of one or more expanders, the first set of one or more expanders producing mechanical power to drive one or more alternating current (AC) electricity generators, the flue gas expanding in the one or more expanders to near-atmospheric pressure; and wherein the expanded flue gases expelled by the first set of one or more expanders passes through the hot passages of the first set of heat regenerators in a series arrangement from the highest temperature regenerator to the lowest temperature regenerator, the flue gas stream having rejected heat, thus forming the low-pressure power cycle.

13. The power generation system according to claim 11, wherein the first set of heat regenerators comprises two or more heat regenerators placed in series, so that the compressed air supplied by the first set of one or more compressors flows through the lowest temperature heat regenerator to the highest temperature heat regenerator in the sequence of progressively increasing temperature;

wherein a portion of the compressed air is extracted through a first bypass flowline from a port placed in between the first set of heat regenerators so that the bypassed air stream is not fully heated as the non-bypassed stream that flows into the cathode flow passages of the one or more fuel cells;

wherein the partially heated bypassed compressed air stream is mixed with the hot flue gas stream expelled by the post combustor in a mixing chamber; and wherein the flue gas stream which is formed by mixing the hot flue gas stream and the bypassed air stream is fed to the hot passages of the third set of regenerators before the combined flue gas stream is fed to the first set of one or more expanders in the low-pressure cycle, thus forming the thermal feed from the low-pressure power cycle to the high-pressure power cycle.

14. The power generation system according to claim 13, wherein the gas stream that expands in the second set of one or more expanders in the high-pressure cycle expands until the pressure reaches a near-operating pressure of the one or more fuel cells.

15. The power generation system according to claim 13, wherein the gas stream that expands in the second set of one or more expanders in the high-pressure cycle expands until the pressure reaches near-atmospheric pressure.

16. The power generation system according to claim 15, wherein the power generation system comprises a first auxiliary combustor in the low-pressure bypassed compressed air stream in the low-pressure power cycle.

17. The power generation system according to claim 16, wherein the power generation system comprises a second auxiliary combustor in the high-pressure air feed to the second set of one or more expanders.

18. The power generation system according to claim 17, wherein the power generation system comprises a thermal feed to a bottoming cycle placed after the second set of one or more expanders, but prior to the second set of one or more heat regenerators in the high-pressure cycle.

19. The power generation system according to claim 14, wherein the gas expelled by the second set of one or more expanders and the flue gas expelled by the third set of heat regenerators of the s low-pressure cycle are combined to form a single combined flue gas stream, the single combined flue gas stream is fed to the first set of one or more expanders in the low-pressure cycle.

20. The power generation system according to claim 19, wherein the power generation system comprises an auxiliary combustor in the high-pressure air feed to the second set of one or more expanders of the high-pressure cycle.

21. The power generation system according to claim 20, wherein the power generation system comprises a thermal feed to a bottoming cycle placed after the second set of one or more s expanders of the high-pressure cycle.

22. The power generation system according to claim 21, wherein the power generation system comprises a second bypassed low-pressure compressed air stream, the second bypassed air stream starts at the location where the first bypassed compressed air stream started, the second bypassed air stream ends at the inlet of the first set of one or more expanders of the low-pressure cycle, and the power generation system further comprises another auxiliary combustor in the second bypassed air stream.

23. The power generation system according to claim 12, wherein the power generation system further comprises at least one reformer device, a set of fuel compressors comprising at least two-stages to provide a pressurized gaseous fuel at two pressure levels or a set of fuel pumps comprising at least two stages to provide a pressurized liquid fuel at two pressure levels, a fuel/steam mixing device to mix the gaseous fuel with the generated steam, at least two high-pressure and low-pressure combustors, at least two high-pressure fuel preheaters, and at least one alternating current (AC) generator;

wherein the first set of compressors in the low-pressure power cycle delivers low-pressure compressed air to the first set of one or more heat regenerators, so heated low-pressure compressed air stream is split into two streams, one of the low-pressure split streams is fed to the cathode passages of the one or more fuel cells, and the other low-pressure split streams is fed to the low-pressure combustor, where the second split stream is further heated by combusting a certain amount of low-pressure fuel;

wherein the second set of one or more compressors delivers high-pressure compressed air to the third set of one or more heat regenerators, the heated high-pressure compressed air is further heated by a high-pressure combustor by combusting a certain amount of high-pressure fuel, so heated air is fed to the second set of one or more expanders and the one or more expanders produce mechanical power which in turn drives the alternating current (AC) electricity generator;

wherein the fuel/steam mixing device is fed with the preheated gaseous fuel from the low-pressure stage one or more fuel compressors or one or more fuel pumps, the mixing device is also fed with the generated steam;

wherein the reformer is fed with the preheated fuel/steam mixture from the mixing device, the reformer is supplied with heat to commence the reforming reaction by feeding a portion of the constituents expelled by the fuel cell anode outlet;

wherein the fuel cell anode flow passages are fed with the reformed fuel/steam mixture from the reformer, the fuel cell outlet streams are combined in a post-combustor where the fuel oxidation is completed;

wherein the flue gas stream expelled by the fuel cell post-combustor, the second split stream expelled by the low-pressure combustor, and the stream expelled by the second set of one or more high-pressure expanders are combined to form a single combined stream, the combined flue gas stream is fed to the first set of one or more low-pressure expanders, the first set of one or more low-pressure expanders produce mechanical power which in turn drives the alternating current (AC) electricity generator;

wherein the flue gas stream expelled by the first set of one or more low-pressure expanders is fed to the first high-pressure fuel preheater of the high-pressure fuel combustor, thus regenerating a portion of its high-grade heat, the expelled flue gas stream is then fed to the hot-passages of the third set of one or more heat regenerators, thus harnessing the high-grade heat of the flue gas stream to the high-pressure compressed air stream, the expelled flue gas stream is then fed to the one or more first low-pressure fuel preheaters which supply low-pressure fuel to the low-pressure combustor and the fuel cell thus harnessing high-medium grade heat;

wherein the expelled flue gas stream is then fed to the first set of one or more low-pressure heat regenerators to regenerate the medium grade heat of the flue gas stream;

wherein the expelled flue gas stream is further used to regenerate the medium-low grade heat in the second high-pressure fuel preheater and a second low-pressure fuel preheater; and wherein all pumps and compressors in the power generation system are powered by the direct current (DC) electricity generated by the one or more fuel cells.

24. The power generation system according to claim 23, wherein the power generation system further comprises a set of water pumps to provide pressurized water at a pressure slightly above the operating pressure of the one or more fuel cells, and a series of preheating devices to preheat water using the heat of flue gas expelled by the second low-pressure fuel preheater; and wherein the steam fed to the fuel/steam mixer is generated by preheated water.

25. The power generation system according to claim 24, wherein the pressurized water is preheated with low-temperature flue gas, the pressurized water is further heated to vaporize or to superheat in a heat regenerator by the flue gas expelled from the low-pressure one or more expanders, the steam stream so generated is split into two streams, the first portion of the split steam stream is fed to the fuel/steam mixer.

26. The power generation system according to claim 25, wherein the second portion of the split steam stream is fed to the low-pressure first set of the one or more expanders for expansion, thereby enhancing the power output of the low-pressure first set of the one or more expanders.

27. The power generation system according to claim 25, wherein the second portion of the split steam stream is sent through the second set of one or more expanders for the purpose of turbine blade cooling, so heated steam is then fed to the low-pressure first set of the one or more expanders for expansion, thereby enhancing the power output of the low-pressure first set of one or more expanders.

28. The power generation system according to claim 24, wherein the power generation system comprises an advanced Rankine cycle as a bottoming cycle, the advanced Rankine cycle comprises at least one steam generator that is thermally fed by the primary cycle, at least two stages of steam turbines with a first high-pressure turbine stage and a second low-pressure turbine stage, at least one reheater placed in-between the turbine stages, the reheater being thermally fed by the primary cycle, a steam condenser, one or more closed feedwater heaters, one or more open feedwater heaters, and one or more pumps;
wherein the first high-pressure turbine stage has at least one steam-bleed point, each of which is fluidly connected to a closed feedwater heater, one steam-bleed point is placed at the inlet of the steam reheater, which is connected to a closed feedwater heater, and the second low-pressure turbine stage has at least two steam-bleed points, whereas the lowest pressure steam-bleed point is connected to the open feedwater heater, while at least one of the other steam-bleed points are connected to one or more respective ones of the closed feedwater heaters, the feedwater heaters are arranged in the sequence such that the highest-pressure bleed point corresponds to the highest-temperature feedwater heater, and the feedwater heaters are placed in progressively reducing temperature sequence corresponding to the progressively reducing pressure bleed points; and
where the steam reheater acquires heat through a heat regenerator placed in the flue gas stream expelled by the first set of expanders in the primary cycle.

29. The power generation system according to claim 28, wherein the at least one steam generator in the advanced Rankine cycle acquires heat through a heat regenerator from the flue s gas stream expelled by the first set of expanders in the primary cycle.

30. The power generation system according to claim 10, wherein the power generation system comprises the low-pressure cycle comprising the first set of the one or more compressors, the one or more fuel cells, the first set of the one or more expanders, the first set of at least two heat regenerators, and a high-pressure cycle comprising the second set of one or more high-pressure compressors, an auxiliary fuel combustor, the second set of one or more high-pressure expanders, and the second set of at least two heat regenerators;
wherein the low-pressure compressed air feed to the one or more fuel cells is regeneratively heated by the first set of at least two regenerators including a first low-pressure, low-temperature regenerator and a second low-pressure, high-temperature regenerator;
wherein the high-pressure compressed air feed to the high-pressure auxiliary fuel combustor is regeneratively heated by the second set of at least two regenerators including a first high-pressure, low-temperature regenerator and a second high-pressure, high-temperature regenerator;
wherein the hot flue gas stream expelled by the fuel cell post-combustor in the low-pressure cycle is fed to the second high-pressure, high-temperature heat regenerator to harness a portion of its heat, and then is fed to the first set of the one or more low-pressure expanders, and so expanded flue gas stream is fed to the first high-pressure, low-temperature regenerator to further harness a portion of its medium grade heat, the flue gas stream is then fed to the first low-pressure, low-temperature heat regenerator to harness the rest of the medium grade heat, the flue gas rejects its low grade heat to the first low-temperature fuel preheater and then is expelled to the atmosphere;
wherein the hot flue gas stream expelled by the auxiliary combustor in the high-pressure cycle is fed to the second set of one or more high-pressure expanders;
wherein, in the one or more high-pressure expanders, the high-pressure flue gas stream expands to near-atmospheric pressure, the flue gas stream passes through a fuel preheater to preheat the high-pressure fuel feed of the auxiliary combustor, the flue gas stream is fed to the low-pressure, high-temperature heat regenerator to harness a portion of its mid-grade heat, and then is fed to the low-pressure, high-temperature fuel preheater to harness its low-grade heat and then is expelled to the atmosphere.

31. The power generation system according to claim 30, wherein the expanded flue gas stream expelled from the second set of one or more expanders is fed to a thermal feed of a bottoming steam Rankine cycle to harness its high-grade heat, the fuel/steam mixer is fed with steam bled at a suitable bleed-point from the steam turbine in the bottoming Rankine cycle.

32. The power generation system according to claim 30, wherein the expanded flue gas stream expelled from the second set of one or more expanders is fed to a third regenerative heater placed on the high-pressure compressed air feed in the high-pressure cycle in between the high-pressure, high-temperature regenerator and the auxiliary combustor to regenerate its high-grade heat;
wherein a low-pressure water pump supplies pressurized water, low-pressure water is preheated and partially vaporized in a regenerative water heater harnessing the medium-grade heat from the flue gas stream of the high-pressure cycle; and
wherein the low-pressure heated water is fed to a water/steam separator to separate steam and water, so separated steam is fed to the fuel/steam mixer, and the separated water is pumped using a second water pump to blade cooling passages in the second set of the one or more high-pressure expanders.

33. The power generation system according to claim 32, wherein the second water pump is a low-pressure pump, and the low-pressure steam generated by the blade cooling passages is fed to the first set of the one or more expanders where the steam expands mixed with the low-pressure flue gas stream.

* * * * *